(12) United States Patent
Nakamura et al.

(10) Patent No.: US 7,480,459 B2
(45) Date of Patent: Jan. 20, 2009

(54) WAVELENGTH DIVISION MULTIPLEXING TRANSMISSION SYSTEM

(75) Inventors: Kentaro Nakamura, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 485 days.

(21) Appl. No.: 10/883,033

(22) Filed: Jul. 2, 2004

(65) Prior Publication Data
US 2005/0041975 A1 Feb. 24, 2005

(30) Foreign Application Priority Data
Aug. 18, 2003 (JP) ............... 2003-294414

(51) Int. Cl.
*H04B 10/00* (2006.01)
(52) U.S. Cl. ............... 398/83; 398/82; 398/85
(58) Field of Classification Search .............. 398/79–97
See application file for complete search history.

(56) References Cited

U.S. PATENT DOCUMENTS

| | | | |
|---|---|---|---|
| 6,208,444 B1 * | 3/2001 | Wong et al. ............... | 398/9 |
| 6,310,690 B1 * | 10/2001 | Cao et al. ............... | 356/519 |
| 7,003,227 B2 * | 2/2006 | Kim et al. ............... | 398/82 |
| 2003/0215233 A1 | 11/2003 | Tomofuji et al. | |

FOREIGN PATENT DOCUMENTS

| | | |
|---|---|---|
| EP | 1 146 681 | 10/2001 |
| JP | 2001-345784 | 12/2001 |
| JP | 2002-112294 | 4/2002 |

OTHER PUBLICATIONS

Kitoh, Tsutomu et al., "NTT Group's Research and Development Activities", vol. 50, 2001.
Japanese Patent Office Action mailed Aug. 5, 2008, for corresponding Japanese Patent Application No. 2001-345784.
Reference AG (Japanese Laid-Open Patent No. 2001-345784) corresponds to Reference AH (European Patent Application No. 1 146 681).
Reference AM (Japanese Patent Office ACtion) cites Reference AG (Japanese Laid-Open No. 2001-345784) in the IDS filed Aug. 11, 2008.
Japanese Patent Office Action mailed Aug. 5, 2008, for corresponding Japanese Patent Application No. 2003-294414.

* cited by examiner

*Primary Examiner*—Agustin Bello
(74) *Attorney, Agent, or Firm*—Staas & Halsey LLP

(57) ABSTRACT

The present invention provides a wavelength division multiplexing transmission system for separating wavelength division multiplexing signals, where signal lights with different bit rates are wavelength division multiplexed, according to the bit rate, and processing the separated signals individually. The wavelength division multiplexed signals, where a low-speed bit rate signal is disposed in an odd channel group and a high-speed bit rate signal is disposed in an even channel group, are demultiplexed into a low-speed signal group and a high-speed signal group by an unequal bandwidth interleaver. The low-speed signal group is processed (e.g. demultiplexing, dispersion compensation) by an optical device appropriate for the low-speed signals, and the high-speed signal group is processed by an optical device appropriate for the high-speed signals. By this, a relatively expensive and high function optical device can be applied only for the high-speed signal side, so an increase in the device cost can be kept down. Also a device with specifications appropriate for each signal can be used.

36 Claims, 36 Drawing Sheets

Channel Spacing

■ 50GHz  △ 75GHz  ♦ 100GHz

| BIT RATE | WAVELENGTH INTERVAL | SPECTRAL EFFICIENCY |
|---|---|---|
| 10 Gbit/s | 50 GHz | 0.20 |
| 10 Gbit/s | 25 GHz | 0.40 |
| 40 Gbit/s | 100 GHz | 0.40 |
| 10 Gbit/s & 40 Gbit/s | 50 GHz | 0.50 |
| 40 Gbit/s | 75 GHz | 0.53 |

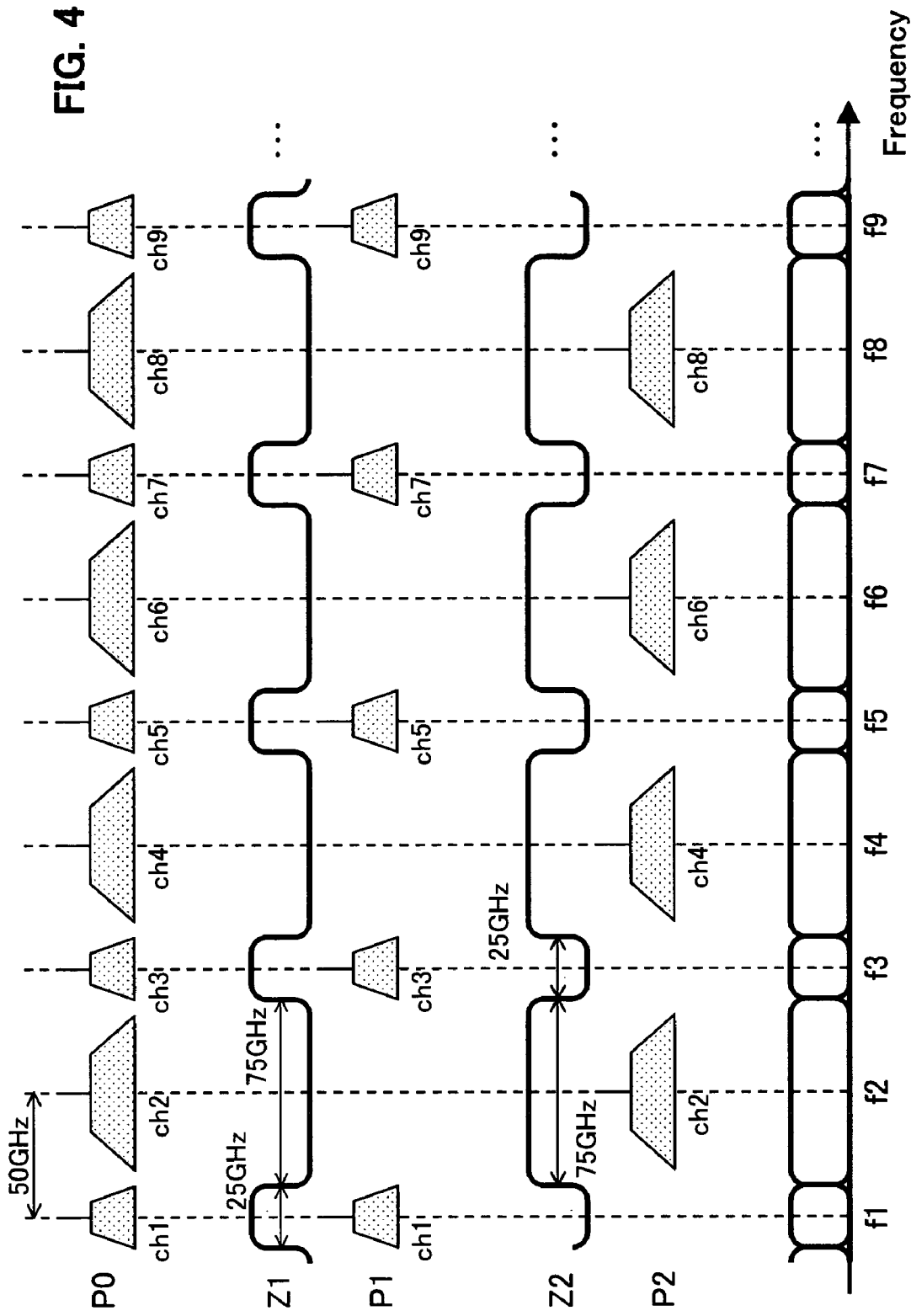

WAVELENGTH DIVISION MULTIPLEXING TRANSMISSION SYSTEM

BACKGROUND OF THE INVENTION

1. Field of the Invention

The present invention relates to a wavelength division multiplexing transmission system for separating wavelength division multiplexing signals, where signal lights with different signal bandwidths (e.g. bit rates) are wavelength-division multiplexed, according to the signal bandwidth (bit rate), and processing separated signals individually and the relay node (compensating node) thereof.

2. Description of the Related Art

Recently the capacity of Wavelength Division Multiplexing (WDM) transmission systems is expanding. Methods used for increasing capacity are increasing the number of wavelengths to be multiplexed and are increasing the transmission speed (bit rate) of signals with each wavelength. Concerning the bit rate, WDM transmission systems with 10 Gbit/s have already been commercialized, and research and development of optical transmission systems with 40 Gbit/s are on-going.

To install 40 Gbit/s WDM transmission systems, however, a partial upgrade must be considered in terms of installation cost and upgrade of in-service, such as switching the bit rate of a part of the wavelengths of a conventional 10 Gbit/s WDM transmission system from 10 Gbit/s to 40 Gbit/s, or adding 40 Gbit/s bit rate signal lights to an open channel of the conventional 10 Gbit/s WDM transmission system, rather than switching all of the wavelengths to be multiplexed to a 40 Gbit/s bit rate at one time. In other words, upgrading to a system where 10 Gbit/s and 40 Gbit/s are mixed is under consideration.

As the number of wavelengths to be multiplexed increases, the wavelength interval of signal lights becomes dense, and in the current 10 Gbit/s systems, systems of which the wavelength interval (frequency interval) of adjacent signal lights is 50 GHz have been commercialized, and the use of a 100 GHz wavelength interval (frequency interval) is under consideration for 40 Gbit/s systems.

For this increase in density, a method often used is multiplexing/demultiplexing lights in the 1:N channel optical multiplex/demultiplex module using an arrayed waveguide grating (AWG) filter or multi-layer film filter, and further multiplexing/demultiplexing these lights using an interleaver. As an index of this density, spectral efficiency, which indicates the bit rate per unit frequency, is used. In the case of a WDM transmission system of which the bit rate is 10 Gbit/s and the frequency interval is 50 GHz, the spectral efficiency is 0.2 bit/s/Hz (=10 Gbit/s÷50 GHz), and in the case of a WDM transmission system of which the bit rate is 40 Gbit/s and the frequency interval is 100 GHz, the spectral efficiency is 0.4 bit/s/Hz (=40 Gbit/s÷100 GHz).

The interleaver is an optical multiplexer/demultiplexer which has a function to demultiplex a signal group with a certain wavelength interval into an odd channel and even channel so as to create a signal group with a double wavelength interval, or to multiplex the odd channel and even channel so as to create a signal group with a ½ wavelength interval (e.g. Kito, et al: PLC filter synthesis theory and application to the interleaver filter, NTT R&D, Vol. 50, No. 4, pp. 281-287, 2001).

In a system before upgrade, that is a system which wavelength-division multiplexes and transmits 10 Gbit/s signal lights with a 50 GHz interval, if an arbitrary channel is changed from 10 Gbit/s to 40 Gbit/s, and these wavelength-division multiplexing signals (WDM) are multiplexed/demultiplexed by an ordinary interleaver with a 50 GHz/100 GHz interval, the transmission quality deteriorates. This is because the spectrum width (bandwidth) of 40 Gbit/s signal lights is wider than that of 10 Gbit/s signal lights (e.g. four times wider), so the 40 Gbit/s signal components leak into an adjacent channel (cross-talk), and the spectrum of the 40 Gbit/s signals is also restricted, depending on the band, by the interleaver. Therefore it is difficult to upgrade an arbitrary channel to 40 Gbit/s.

If the interleaver with a 100 GHz/200 GHz interval, which is used for 40 Gbit/s transmission, is used, cross-talk and transmission quality problems do not occur, but the spectral efficiency decreases to 0.25 bit/s/Hz, since 10 Gbit/s signal lights are also transmitted with a 100 GHz interval, which means that an upgrade has no effect.

Also upgrading an arbitrary channel to 40 Gbit/s requires installing devices for 40 Gbit/s (e.g. multiplexer/demultiplexer, interleaver, wavelength distribution compensator, polarization dispersion compensator) for all the channels anyway, including the 10 Gbit/s channels, regardless which channel is upgraded to 40 Gbit/s, so that sufficient signal quality is insured.

For these devices, the signal spectrum of 40 Gbit/s normally spreads to four times that of 10 Gbit/s, so the required specifications (e.g. transmission characteristics, distribution characteristics) are stricter in a device for 40 Gbit/s than in a device for 10 Gbit/s. Therefore the device for 40 Gbit/s requires higher performance and higher specifications, which increases cost.

For example, FIG. 34A shows the transmission characteristics of a multiplexer/demultiplexer for high-speed 40 Gbit/s, and a multiplexer/demultiplexer for low-speed 10 Gbit/s, and since the multiplexer/demultiplexer for high-speed requires a higher flatness and more vertical edges than the multiplexer/demultiplexer for low-speed, price becomes higher. FIG. 34B shows the Q factor deterioration with respect to the shift of the central wavelength when the 40 Gbit/s signal (high-speed signal) is input to both the multiplexer/demultiplexer for high-speed and the multiplexer/demultiplexer for low-speed, where the Q factor deterioration is smaller in the multiplexer/demultiplexer for high-speed than in the multiplexer/demultiplexer for low-speed. In other words, the multiplexer/demultiplexer for high-speed has high performance using high specifications to decrease the Q factor deterioration, so the device cost is higher in the multiplexer/demultiplexer for high-speed.

Therefore it is not desirable to install a device for 40 Gbit/s for all the channels in terms of cost, and using a 40 Gbit/s device for 10 Gbit/s signals exceeds specifications, which also generates an unnecessary cost.

SUMMARY OF THE INVENTION

It is an object of the present invention to provide a wavelength division multiplexing transmission system where signal lights with different bit rates are mixed, which can suppress the increase in cost caused by using high function devices. It is another object of the present invention to provide a wavelength division multiplexing transmission system where signal lights with different bit rates are mixed, which can suppress the increase in cost caused by using high function devices and various compensation devices. It is still another object of the present invention to provide a wavelength division multiplexing transmission system where signal lights with different bit rates are mixed, which can apply an optimum wavelength and polarization mode dispersion compensation method for each bit rate.

The present invention provides a wavelength division multiplexing transmission system which separates the wavelength division multiplexing signals, where signal lights with different signal bandwidths (e.g. bit rates) are wavelength-division multiplexed, according to the signal bandwidth (bit rate), and processes the separated signals individually.

The wavelength division multiplexing transmission system according to the present invention is a wavelength division multiplexing transmission system for transmitting wavelength division multiplexing signals comprising a first channel group, that is one of an even channel group and an odd channel group, and a second channel group, that is the other thereof, wherein a first signal light of which the signal bandwidth is relatively large can be allocated to each channel of the first channel group, a second signal light of which the signal bandwidth is relatively small can be allocated to each channel of the second channel group, the first signal light or the second signal light is allocated to the even channel group, and the second signal light is allocated to the second channel group, and this wavelength division multiplexing transmission system further comprises at least one of a demultiplexing module unit and a multiplexing module unit, wherein the demultiplexing module unit further comprises a first interleave filter unit for demultiplexing the wavelength division multiplexing signal that is input, into a signal light of the first channel group and a signal light of the second channel group and outputting these signal lights, and a first demultiplexing unit for demultiplexing the signal light of the first channel group from the first interleave filter unit and outputting these signal lights, and the multiplexing module unit further comprises a first multiplexing unit for multiplexing a plurality of the first signal lights or the second signal lights that are input into a signal light of the first channel group and outputting the signal, and a second interleave filter unit for inputting a signal light of the first channel group from the first multiplexing unit and a signal light where a plurality of the second signal lights are disposed in the second channel group, multiplexing these two signal lights to generate the wavelength division multiplexing signal, and outputting the signal.

The relay node according to the present invention is a relay node for transmitting wavelength division multiplexing signals comprising a first channel group that is one of an even channel group and an odd channel group, and a second channel group, that is the other thereof, wherein a first signal light of which the signal bandwidth is relatively large can be allocated to each channel of the first channel group, and a second signal light of which the signal bandwidth is relatively small can be allocated to each channel of the second channel group, the first signal light or the second signal light is allocated to the even channel group, and the second signal light is allocated to the second channel group, and this relay node further comprises a demultiplexing module unit and a multiplexing module unit, wherein the demultiplexing module unit further comprises a first interleave filter unit for demultiplexing the wavelength division multiplexing signal that is input, into a signal light of the first channel group and a signal light of the second channel group, and outputting these signals, and a first demultiplexing unit for demultiplexing the signal light of the first channel group from the first interleave filter unit, and outputting these signals, and the multiplexing module unit further comprises a first multiplexing unit for multiplexing the signal light from the first demultiplexing unit with the signal light of the first channel group, and outputting the signal, and a second interleave filter unit for inputting a signal light of the first channel group from the first multiplexing unit and a signal light where the plurality of second signal lights are disposed in the second channel group, multiplexing these two signal lights to generate the wavelength division multiplexing signals, and outputting the signal.

According to the present invention, the first signal light, that has a relatively large signal bandwidth, or a second signal light, that has a relatively small signal bandwidth, is allocated to the first channel group. For example, the first signal light is a signal that has a higher speed bit rate than the second signal light. The second signal light is allocated to the second channel group. The signal light of the first channel group and the signal light of the second channel group are separated by the first interleave filter unit, and the signal light of the first channel group is demultiplexed by the first demultiplexing unit.

Therefore, in the first demultiplexing unit or in the first demultiplexing, a high performance and high function device can be used for the device which is appropriate for processing the first signal lights (e.g. signal band is large (bit rate is high)), only in the portion where the first signal light is included in the first channel group, and in the portion where the second channel group (second signal lights included in the first channel) is processed, a device which is appropriate for processing the second signal lights, which is different from the first signal lights, can be used. By this, a wavelength division multiplexing transmission system where signal lights with different bit rates are mixed, keeping cost down, can be provided. Also a wavelength division multiplexing transmission system where signal lights with different bit rates are mixed, keeping a cost increase caused by high function devices and various compensation devices down, can be provided. Since the first signal light and the second signal light can be individually processed, a wavelength and polarization mode dispersion compensation method, which are optimum for the respective bit rate, can be applied.

BRIEF DESCRIPTION OF THE DRAWINGS

FIG. 4 is a diagram depicting the transmission characteristics of the unequal bandwidth interleaver and the status when the WDM signal is filtered by the unequal bandwidth interleaver;

DESCRIPTION OF THE PREFERRED EMBODIMENTS

Embodiments of the present invention will now be described with reference to the drawings. The embodiments to be shown below are for understanding the present invention, and application of the present invention shall not be limited by these embodiments.

Embodiment 1

Figure 1:
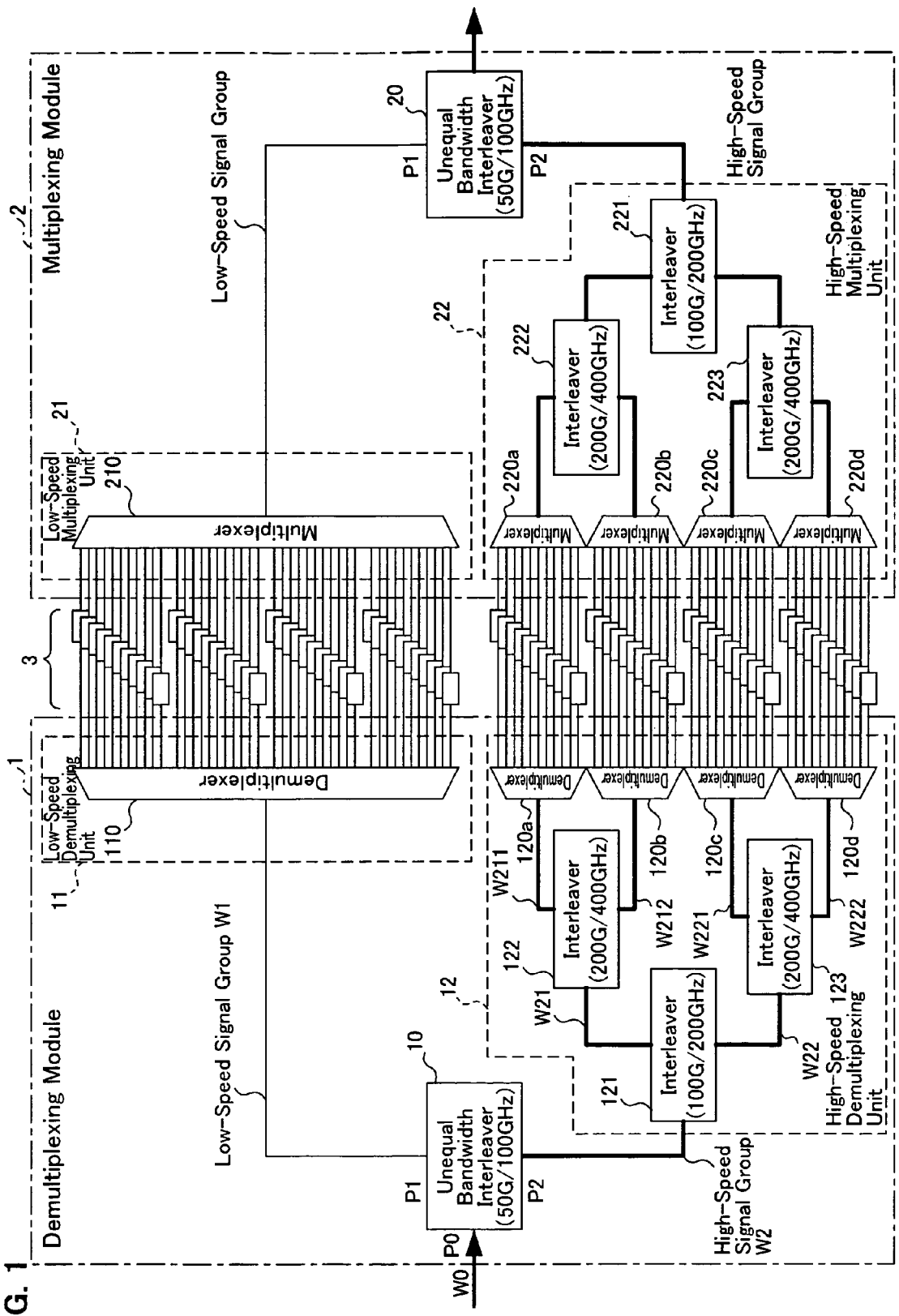
FIG. 1 is a block diagram depicting the configuration of an optical transmission node according to the first embodiment of the present invention.

FIG. 1 is a block diagram depicting the configuration of the optical transmission node according to the first embodiment of the present invention. This optical transmission node is a relay node which is installed in the wavelength division multiplexing (WDM) transmission system, and is comprised of a demultiplexing module 1 and a multiplexing module 2. In the present embodiment, the relay node will be described as an example, but the present invention can be applied not only to the relay node of the WDM transmission system but also to the transmission terminal or the reception terminal of the WDM transmission system. For example, in the transmission terminal, only the multiplexing module 2 is installed, and in the reception terminal, only the demultiplexing module 1 is installed. The present invention can be applied to the transmission terminal or the reception terminal in this way, which is the same for the second to twelfth embodiments herein below.

The demultiplexing module 1 is comprised of an unequal bandwidth interleaver (interleave filter) 10, low-speed demultiplexing unit 11 and high-speed demultiplexing unit 12. The low-speed demultiplexing unit 11 has a demultiplexer for low-speed signals 110. The high-speed demultiplexing unit 12 has interleavers for high-speed signals (interleave filters) 121 through 123, and demultiplexers for high-speed signals 120a through 120d. The multiplexing module 2 is comprised of an unequal bandwidth interleaver (interleave filter) 20, low-speed multiplexing unit 21 and high-speed multiplexing unit 22. The low-speed multiplexing unit 21 has a multiplexer for low-speed signals 210. The high-speed multiplexing unit 22 has interleavers for high-speed signals (interleave filters) 221 through 223, and multiplexers for high-speed signals 220a through 220d.

Before examining each of these composing elements in detail, WDM signal W0 will be described as an example of a wavelength-division multiplexed signal light which is input to the demultiplexing module 1, and is output from the multiplexing module 2 (hereafter called "WDM signal").

Figure 2:
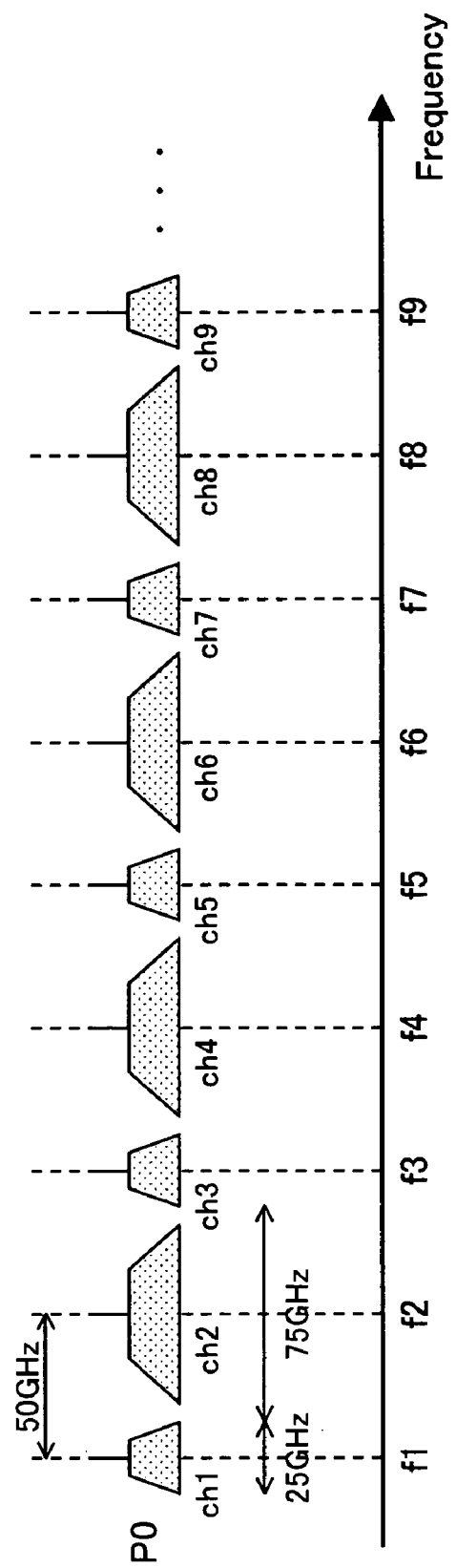
FIG. 2 is a diagram depicting the arrangement of signal lights with each wavelength that constitute the WDM signal W0.

FIG. 2 shows the arrangement of signal lights with each wavelength that constitutes the WDM signal W0. The abscissa indicates the frequencies. Frequencies f1, f2 . . . is a grid with a frequency interval of 50 GHz (F=50 GHz) specified by an ITU-T recommendation (hereafter called "ITU-T grid").

The WDM signal W0 is a WDM signal where a 10 Gbit/s signal, as an example of a low-speed signal (narrowband signal), and a 40 Gbit/s signal, as an example of a high-speed signal (wideband signal), are mixed. The 10 Gbit/s signal is disposed in an odd channel and the 40 Gbit/s signal is disposed in an even channel. In the present embodiment, 44 channels are disposed for both the even channel and the odd channel as an example. The signal light of the channel ch1 is disposed in the frequency f1, and the signal light of the channel ch2 is disposed in the frequency f2 respectively. The channels of ch3 and later are also sequentially disposed on the ITU-T grid from f3.

Here the low-speed signals are allocated to an odd channel and the high-speed signals are allocated to an even channel, but high-speed signals may be allocated to an odd channel and low-speed signals may be allocated to an even channel.

In this WDM signal WO, the transmission bandwidth (spectrum width) F1 of the 10 Gbit/s signal is set to 25 GHz, and the transmission bandwidth (spectrum width) F2 of the 40 Gbit/s signal is set to 75 GHz so that the adjacent 10 Gbit/s signal and the 40 Gbit/s signal do not overlap.

As described in the section on the description of prior art, the transmission bandwidth of a 10 Gbit/s signal is generally 50 GHz in the current commercialized 10 Gbit/s WDM transmission systems. In the case of 40 Gbit/s WDM transmission systems, for which research and development is on-going, 100 GHz is being considered as the transmission bandwidth of the 40 Gbit/s signals.

Whereas in the present embodiment, a narrower bandwidth is assigned, such as 25 GHz for 10 Gbit/s signals and 75 GHz for 40 Gbit/s signals. Due to the following (1) through (3) reasons, signal lights with sufficient quality can be transmitted even with such a bandwidth.

(1) The spectrum width (bandwidth) of the signals of a 40 Gbit/s NRZ (Non-Return to Zero) modulation system is approximately 60 GHz, and that of 10 Gbit/s NRZ signals is approximately 15 GHz. Therefore even if the bandwidth of 40 Gbit/s signal lights is set to 75 GHz and the bandwidth of 10 Gbit/s signal lights is set to 25 GHz, these signals can be sufficiently transmitted in a status without much quality deterioration.

Figures 3A, 3B:
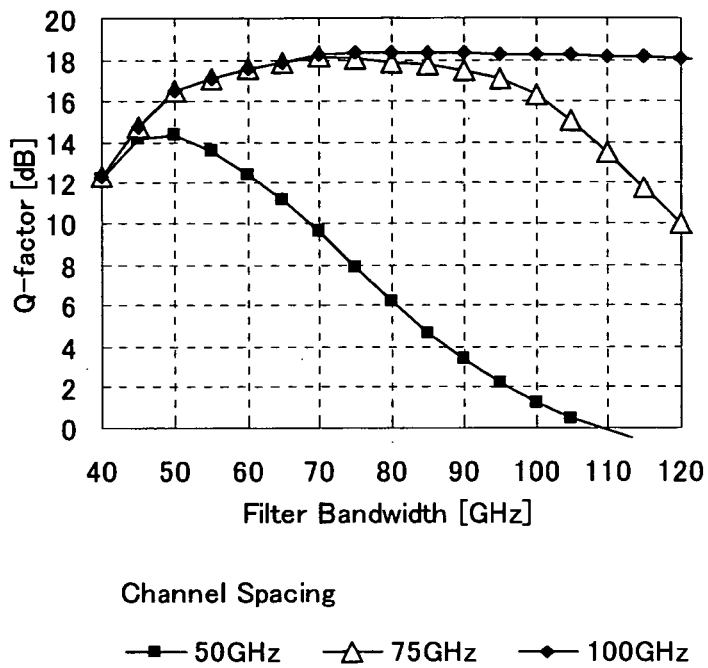
FIG. 3A is a graph depicting the relationship between the filter bandwidth and the Q factor (Quality factor) when the frequency interval between signal lights is changed as 50 GHz, 75 GHz and 100 GHz in the 40 Gbit/s WDM transmission system.
FIG. 3B is a table showing the relationship of the bit rate, wavelength interval and spectral efficiency.

(2) FIG. 3A is a graph showing the relationship between the filter bandwidth and the Q factor (Quality factor) in a 40 Gbit/s WDM transmission system when the frequency interval (wavelength interval) between signal lights is changed as 50 GHz, 75 GHz and 100 GHz. As this graph shows, the deterioration of the Q factor, due to the cross-talk of adjacent channels and the band restrictions of the filter, is 0.3 dB or less with respect to the 100 GHz frequency interval when the wavelength interval and the filter bandwidth are both 75 GHz. Therefore even if the frequency interval is 75 GHz, signals can be transmitted with a quality equivalent to that of the case of 100 GHz.

(3) In the paper by Akira Miura, et al, "25 GHz—spaced 10 Gbps×160 channels, 3000 km E-LEAF transmission experiment by using dispersion management to mitigate XPM-induced waveform distortion" (WA2, OAA2003), the transmission of 10 Gbit/s NRZ type WDM signals with a 25 GHz interval has been implemented.

Therefore in the present embodiment, 10 Gbit/s signal lights and 40 Gbit/s signal lights are transmitted with a 25 GHz and 75 GHz bandwidth respectively.

According to the signal arrangement, each signal light can be arranged on an ITU-T grid and can be transmitted, which is an advantage. Also in the WDM signal W0, the spectral efficiency becomes 0.5 Gbit/s/Hz by mixing 10 Gbit/s and 40 Gbit/s, as shown in FIG. 3B, and a spectral efficiency, that is higher than the spectral efficiency 0.4 Gbit/s/Hz when 40 Gbit/s signals are transmitted with a 100 GHz bandwidth, can be achieved.

Since the relationship of the ITU-T grid interval (F=50 GHz)≧{transmission bandwidth of 10 Gbit/s signal (F1=25 GHz)+transmission bandwidth of 40 Gbit/s signal (F2=75 GHz)}÷2, the cross-talk problem is minor even if the signals are arranged on an ITU-T grid where the 10 Gbit/s signals and 40 Gbit/s signals are next to each other.

Also as FIG. 2 shows, 10 Gbit/s signals may be disposed in the even channels where the 40 Gbit/s signals are disposed. In other words, in the even channels, signal lights which have a signal bandwidth smaller than the signal bandwidth of the 40 Gbit/s signals may be disposed. Therefore it is not necessary that 40 Gbit/s signals are disposed in all the even channels, but in the transition stage of upgrading, 40 Gbit/s signals may be disposed in a part of the even channels and 10 Gbit/s signals may be disposed in the rest of the even channels.

In FIG. 1, the unequal bandwidth interleaver 10 is a demultiplexer for demultiplexing the signal light group (e.g. WDM signals W0) arranged with a 50 GHz frequency interval into even channels and odd channels, so as to be demultiplexed into two signal light groups arranged with a double frequency interval, that is 100 GHz, where the transmission bandwidth and the non-transmission bandwidth of the output ports P1 and P2 are not the same respectively (that is, unequal bandwidths). In a general interleaver, the transmission bandwidth and the non-transmission bandwidth are the same, but the transmission bandwidth and the non-transmission bandwidth of the unequal bandwidth interleaver 10 are not the same.

FIG. 4 shows the transmission characteristics of the unequal bandwidth interleaver 10 and the status when the WDM signal is filtered by the unequal bandwidth interleaver 10. The convex portions of the graph of the transmission characteristics in FIG. 4 indicate the frequency band where light transmits (transmission band), and the concave portions of the graph indicate the frequency band where light does not transmit (non-transmission band, filtered band).

In the output port P1, the transmission band has a 25 GHz bandwidth and the non-transmission band has a 75 GHz bandwidth, and both are repeated alternately with a 100 GHz period. The central frequency of the transmission band is set (adjusted) so as to match with the frequency of the odd channels. In the output port P2, the transmission band has a 75 GHz bandwidth and the non-transmission band has a 25 GHz bandwidth, and both are repeated alternately with a 100 GHz period. The central frequency of the transmission band is set (adjusted) so as to match with the frequency of the even channels.

By the unequal bandwidth interleaver 10 which has such transmission characteristics, low-speed signal group W1, which is comprised of 10 Gbit/s signals in odd channels, out of the WDM signals W0, is output from the output port P1, and high-speed signal group W2, which is comprised of 40 Gbit/s signals in even channels, out of the WDM signals W0, is output from the output port P2. In other words, the WDM signals W0 are demultiplexed into the low-speed signal group W1 and the high-speed signal group W2. Each signal light of the low-speed signal group W1 and each signal light of the high-speed signal group W2 both have a 100 GHz frequency interval after demultiplexing.

The low-speed signal group W1 is input to the demultiplexer for low-speed signals 110 of the low-speed demultiplexing unit 11. The demultiplexer 110 is a 1:44 channel demultiplexer with a 100 GHz frequency interval, for which a known AWG (Arrayed Waveguide Grating) filter and a multi-layer film filter, for example, can be used. By the demultiplexer 110, the low-speed signal group W1 is demultiplexed into 10 Gbit/s signal lights with each wavelength, and the signal lights are output.

The high-speed signal group W2 is input to the interleaver for high-speed signals 121 of the high-speed demultiplexing unit 12. For the interleaver 121, a known 100 GHz/200 GHz interleaver can be used, which demultiplexes the high-speed signals W2 with a 100 GHz frequency interval that are input, into the signal group of odd channels W21 and the signal group of even channels W22 with a 200 GHz frequency interval. Here the odd channels are channels ch2, ch6, ch10 . . . (that is channel ch [4$i$–2] if i is 1 or higher integer), and the even channels are channels ch4, ch8, ch12 . . . (that is channel ch [4$i$]). The signal group W21 is input to the interleaver 122 and the signal group W22 is input to the interleaver 123.

For both the interleavers for high-speed 122 and 123, a known 200 GHz/400 GHz interleaver can be used. The interleaver 122 demultiplexes the signal group W21 with a 200 GHz frequency interval which is input, into the signal group W211 in the odd channel and the signal group W212 in the even channel with a 400 GHz frequency interval. Here the odd channel is channel ch [8$i$–6] in FIG. 4, and the even channel is channel ch [8$i$–2].

The interleaver 123 as well demultiplexes the signal group W22 with a 200 GHz frequency interval which is input, into the signal group W221 of the odd channel and the signal group W222 of the even channel with a 400 GHz frequency interval. Here the odd channel is channel ch [8$i$–4] in FIG. 4, and the even channel is channel ch [8$i$].

The high-speed signal groups W211, W212, W221 and W222 are input to the demultiplexers 120$a$, 120$b$, 120$c$ and 120$d$ respectively. The demultiplexers 120$a$ through 120$d$ are 1:11 channel demultiplexers with a 400 GHz frequency interval, for which a known AWG (Arrayed Waveguide Grating) filter and a multi-layer film filter can be used. By the demultiplexers 120$a$ through 120$d$, the high-speed signal groups W211, W212, W221 and W222 are demultiplexed into 40 Gbit/s signal lights with each wavelength in 11 channels respectively, and the signal lights are output.

The high-speed demultiplexing unit 12 can be constructed as one demultiplexer for high-speed (frequency interval 100 GHz), just like the low-speed demultiplexing unit 11, but it is preferable to be constructed with a plurality of interleavers as shown in FIG. 1, in order to implement good transmission characteristics so as to demultiplex with less deterioration of each signal light.

For the 10 Gbit/s and 40 Gbit/s signal lights with each wavelength which are output from the demultiplexing module 1, add or drop processing of the signal lights is executed, and then the signal lights are input to the multiplexing module 2 if this relay node is an optical ADM (optical Add Drop Multiplexer) node.

10 Gbit/s signal light with each wavelength from the demultiplexer 110 are input to the multiplexer for low-speed signals 210 of the low-speed multiplexing unit 21. The multiplexer 210 is a 44:1 channel multiplexer, and a same device as the demultiplexer 110 can be used since only the input/output relationship is reversed from the demultiplexer 110. The multiplexer 210 multiplexes the signal lights with each wavelength, and the low-speed signal group W10 is input to one input port P1 of the unequal bandwidth interleaver 20 after multiplexing.

40 Gbit/s signal lights with each wavelength from the demultiplexers 120$a$ through 120$d$ are input to the multiplexers for high-speed signals 220$a$ through 200$d$ of the high-speed multiplexing unit 22. For the multiplexers 220$a$ through 220$d$, a same device as the demultiplexers 120$a$ through 120$d$ can be used since only the input/output relationship is reversed from the demultiplexers 120$a$ through 120$d$. The signal light groups multiplexed by the multiplexers 220$a$ and 220$b$ respectively are input to the two input ports of the interleaver 222 respectively. The signal light groups multiplexed by the multiplexers 220$c$ and 220$d$ respectively are input to the two input ports of the interleaver 223 respectively.

For the interleaver 222, a same device as the interleaver 122 can be used since only the input/output relationship is reversed. Therefore the interleaver 222 multiplexes the two signal light groups, that is the signal light group, which is input from the multiplexer 220$a$, as the odd channel, and the signal light group, which is input from the multiplexer 220$b$, as the even channel, and outputs the multiplexed signal light groups as one signal light group. The signal light group which is output is input to one of the input ports of the interleaver 221.

In the same way, for the interleaver 223, a same device as the interleaver 123 can be used since only the input/output relationship is reversed. Therefore the interleaver 223 multiplexes the two signal light groups, that is, the signal light group which is input from the multiplexer 220$c$, as the odd channel, and the signal light group, which is input from the multiplexer 220$d$, as the even channel, and outputs the multiplexed signal light groups as one signal light group. The signal light group which is output is input to the other input port of the interleaver 221.

For the interleaver 221, a same device as the interleaver 121 can be used since only the input/output relationship is reversed. Therefore the interleaver 221 multiplexes the two signal light groups, that is, the signal light group which is input from the interleaver 222, as the odd channel, and the signal light group which is input from the interleaver 223, as the even channel, and outputs the multiplexed signal light groups as one high-speed signal light group W20. The high-speed signal light group W20 which is output is input to the other input port P2 of the unequal bandwidth interleaver 20.

The unequal bandwidth interleaver 20 has the same multiplexing/demultiplexing characteristics as the unequal bandwidth interleaver 10, since only the input/output relationship is reversed. In other words, as FIG. 4 shows, the transmission bandwidth and the non-transmission bandwidth of the input port P1 and the transmission bandwidth and the non-transmission bandwidth of the input port P2 have unequal intervals respectively, and the input port P1 filters the 10 Gbit/s signal component with each wavelength of the low-speed signal group W10, and the input port P2 filters the 40 Gbit/s signal component with each wavelength of the high-speed signal group W20. And the unequal bandwidth interleaver 20 multiplexes these signal groups into a signal group similar to the signal group W0, and outputs it.

In this way, according to the present embodiment, the WDM signals are separated into the low-speed signal group and the high-speed signal group, and are multiplexed and demultiplexed respectively, so a device for low-speed signals, which is appropriate for low-speed signals, can be used for the low-speed signal group, and a device for high-speed signals, which is appropriate for high-speed signals, can be used for the high-speed signal group. Because of this, it is unnecessary to install an expensive device for high-speed signals for all the signals with each wavelength, however an expensive device can be installed only for high-speed signals, so optical transmission systems where 10 Gbit/s and 40 Gbit/s are mixed can be implemented keeping device cost down. Also the use of a device that exceeds specifications for low-speed signals can be avoided.

Also even when a 10 Gbit/s optical transmission system with a 100 GHz interval is initially installed and this system is extended to a 50 GHz interval, and when it is not determined which one of 10 Gbit/s and 40 Gbit/s will be extended at the time of initial installation, this configuration allows using an optical multiplexer/demultiplexer for low-speed if 10 Gbit/s is extended, and using a high performance optical multiplexer/demultiplexer for high-speed only when 40 Gbit/s is extended, so extendability is good.

Embodiment 2

Figure 5:
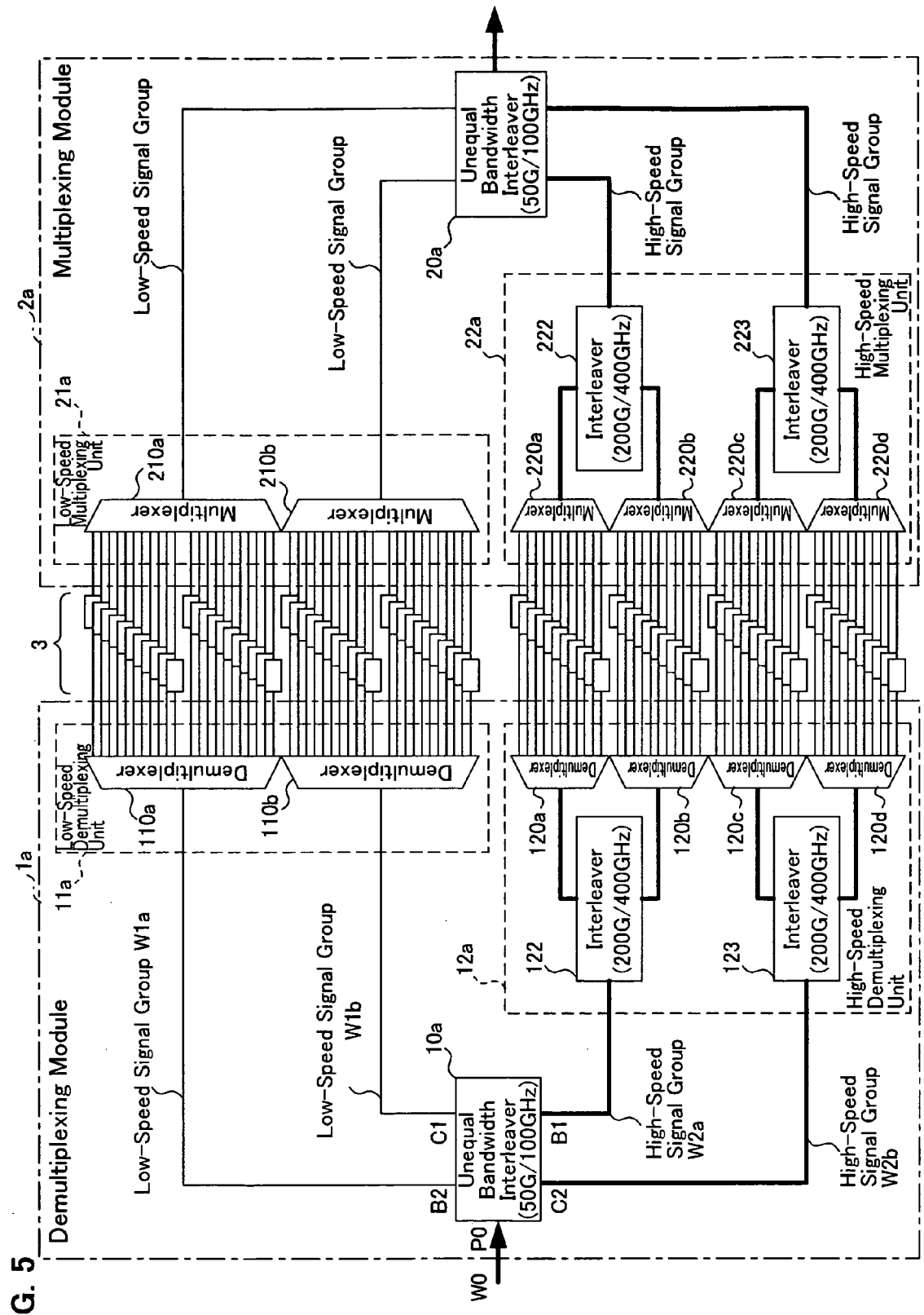
FIG. 5 is a block diagram depicting the configuration of the optical transmission node according to the second embodiment of the present invention.

FIG. 5 is a block diagram depicting the configuration of the optical transmission node according to the second embodiment of the present invention. This optical transmission node comprises a demultiplexing module 1a and a multiplexing module 2a.

The demultiplexing module 1a is comprised of an unequal bandwidth interleaver 10a, low-speed demultiplexing unit 11a, and high-speed demultiplexing unit 12a. The low-speed demultiplexing unit 11a is further comprised of multiplexers for low-speed signals 110a and 110b. The high-speed demultiplexing unit 12a is further comprised of interleavers for highs-speed signals 122 and 123, and demultiplexers for high-speed signals 120a through 120d. The interleavers 122 and 123 and the demultiplexers 120a through 120d are the same as those denoted with the same reference symbols in FIG. 1.

The multiplexing module 2a is comprised of an unequal bandwidth interleaver 20a, low-speed multiplexing unit 21a and high-speed multiplexing unit 22a. The low-speed multiplexing unit 21a is further comprised of the multiplexers for low-speed signals 210a and 210b. The high-speed multiplexing unit 22a is further comprised of the interleavers for high-speed signals 222 and 223, and the multiplexers for high-speed signals 220a through 220d. The interleavers 222 and 223 and the multiplexers 220a through 220d are the same as those denoted with the same reference symbols in FIG. 1.

The WDM signal to be input to the unequal bandwidth interleaver 10a of the demultiplexing module 1a is the same as that in the first embodiment, and has the signal arrangement shown in FIG. 2.

Figure 6A:
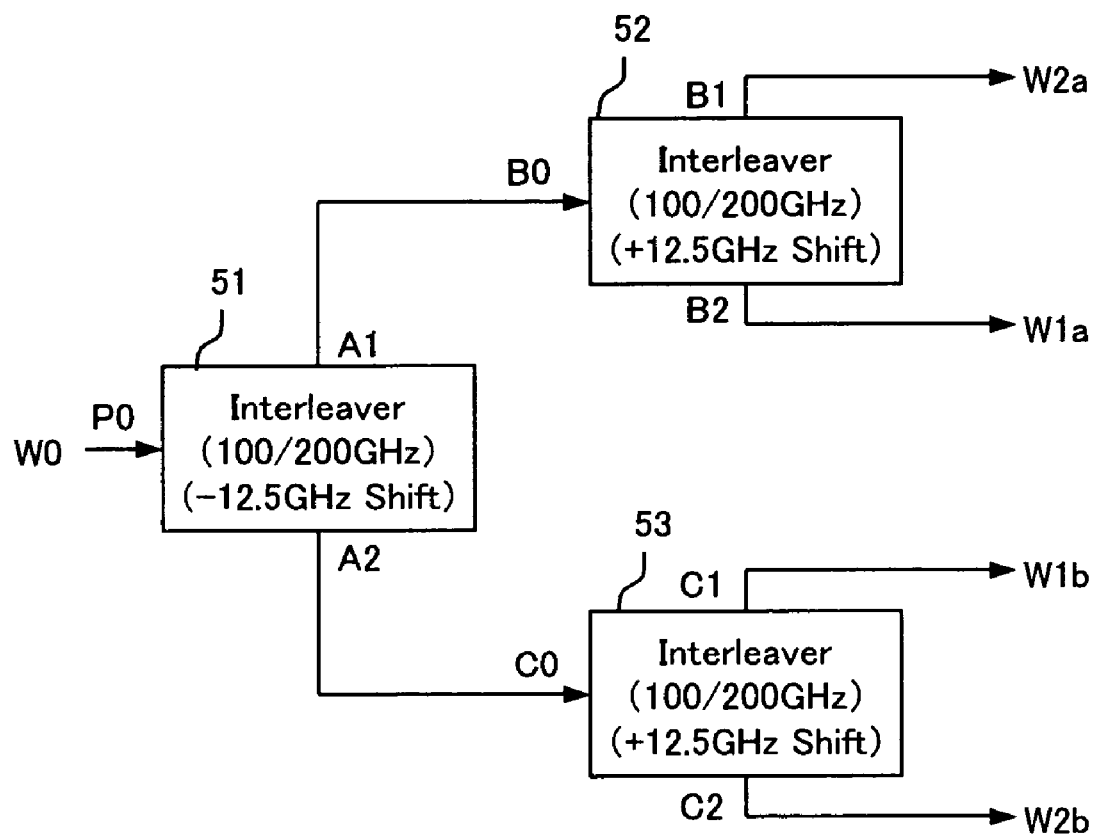
FIG. 6A is a block diagram depicting a configuration example of the unequal bandwidth interleaver of the demultiplexing module.
Figure 6B:
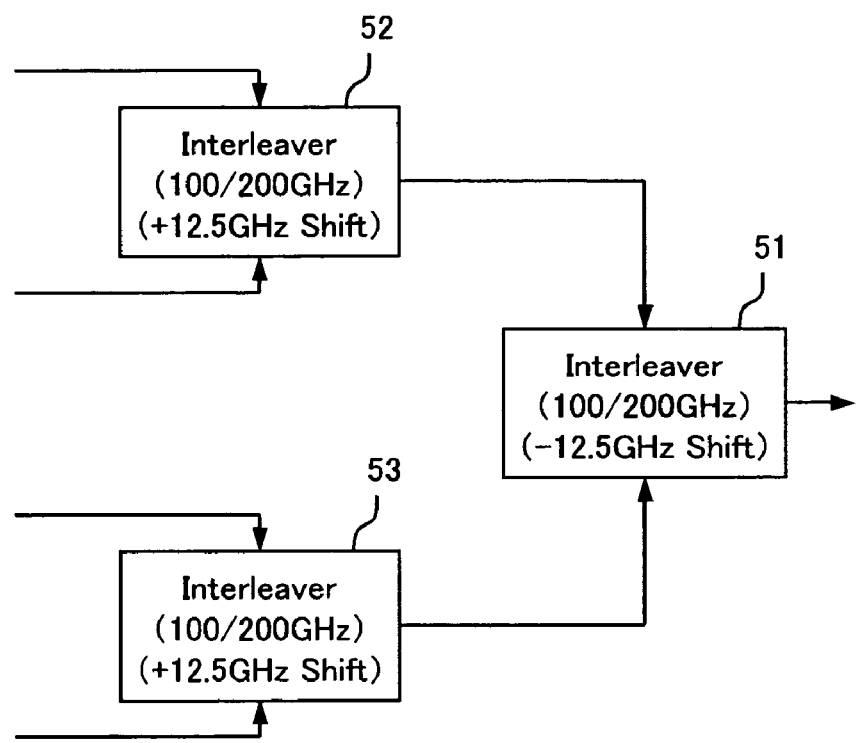
FIG. 6B is a block diagram depicting a configuration example of the unequal bandwidth interleaver of the multiplexing module.

In the unequal bandwidth interleaver 10a, the respective transmission bandwidth and non-transmission bandwidth of the output ports P1a to P2b are different, just like the above mentioned unequal bandwidth interleaver 10. FIG. 6A is a block diagram depicting a configuration example of the unequal bandwidth interleaver 10a of the demultiplexing module 1a. FIG. 6B is a block diagram depicting a configuration example of the unequal bandwidth interleaver 20a of the multiplexing module 2a.

As the comparison of FIG. 6A and FIG. 6B clearly shows, the unequal bandwidth interleaver 10a of the demultiplexing module 1a and the unequal bandwidth interleaver 20a of the multiplexing module 2a can be considered in the same way, where only the input/output relationship is reversed. Therefore in the following description, the configuration of the unequal bandwidth interleaver 10a of the demultiplexing module 1a will be explained in detail, and the explanation for the unequal bandwidth interleaver 20a of the multiplexing module 2a will be omitted.

The unequal bandwidth interleaver 10a is comprised of the interleavers 51 through 53. The interleavers 51 through 53, for which a known interleaver can be used, are optical multiplexers/demultiplexers having a function of demultiplexing the WDM signals with a 100 GHz interval which are input, into the signal light group in the even channels and the signal light group in the odd channels with a 200 GHz interval (or multiplexing the signal light group in the even channels and the signal lights group in the odd channels with a 200 GHz interval into WDM signals with a 100 GHz interval, by reversing the input/output relationship).

Figure 7:
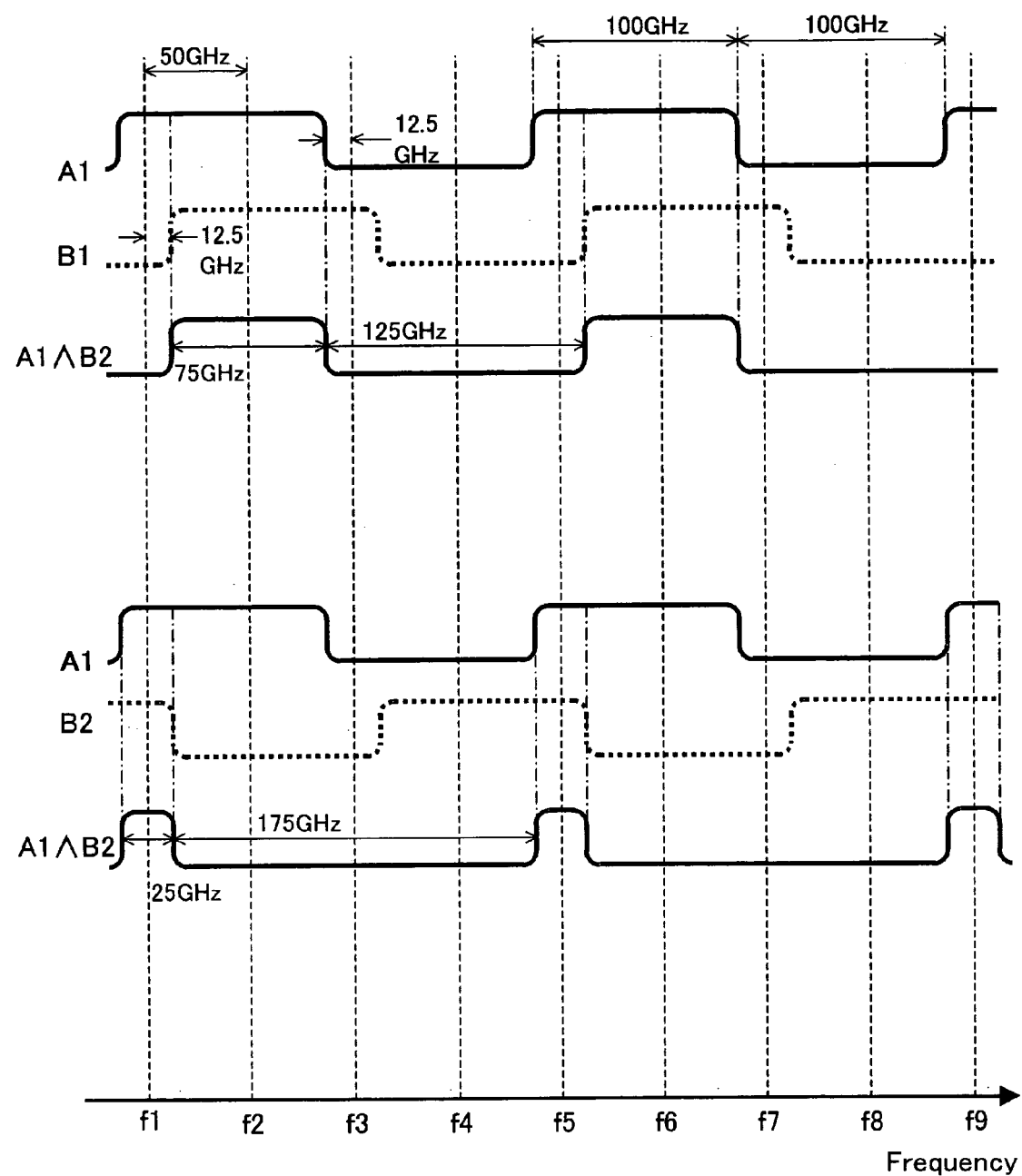
FIG. 7 is a diagram depicting the transmission characteristics of the unequal bandwidth interleaver and the status when the WDM signal is filtered by the unequal bandwidth interleaver.

FIG. 7 shows the transmission characteristics at the port (output port) A1 side when the interleaver 51 is used standalone (graph A1), the transmission characteristics at the port B1 side when the interleaver 52 is used standalone (graph B1), the transmission characteristics at the port B2 side when the interleaver 2 is used standalone (graph B2), the transmission characteristics at the port B1 side of the interleaver 2 when the port A1 of the interleaver 1 is connected to the port B0 of the interleaver 2 and is used (graph A1∧B1), and the transmission characteristics at the port B2 side of the interleaver 2 when the port A1 of the interleaver 1 is connected to the port B0 of the interleaver 2 and is used (graph A1∧B2). In each graph, the abscissa indicates the frequency and the ordinate indicates the light transmittance.

The interleaver 53 also has the same transmission characteristics as the interleaver 52, although this is not shown in FIG. 7.

The transmission band and the non-transmission band of the interleavers 51 through 53 both have a 100 GHz bandwidth, and are alternately repeated with a 200 GHz period.

As the graphs B1 and B2 show, the two ports (output ports) B1 and B2 of the interleaver 52 have opposite transmission characteristics from each other. In the same way, the ports (output ports) A1 sand A2 of the interleaver 51 have opposite transmission characteristics from each other, and the ports C1 and C2 of the interleaver 53 have opposite transmission characteristics from each other.

As graph A1 shows, the central frequency of the transmission band at the port A1 side of the interleaver 51 is shifted 12.5 GHz to the lower frequency side (that is, −12.5 GHz) from the frequencies f2, f6, . . . (200 GHz interval) of the ITU-T grid (in other words, shifted 37.5 GHz to the higher frequency side (that is +37.5 GHz) from the frequencies f1, f5, . . . ). Here it is assumed that the shift amount is −50 GHz<S<50 GHz.

In the same way, the central frequency of the non-transmission band at the port A1 side of the interleaver 51 is shifted −12.5 GHz from the frequencies f4, f8, . . . (200 GHz interval) (in other words, shifted 37.5 GHz to the higher frequency side (that is +37.5 GHz) from the frequencies f3, f7, . . . ).

On the other hand, as graph B1 shows, the central frequency of the transmission band at the port B1 side of the interleaver 52 is shifted +12.5 GHz from the frequencies f2, f6, . . . of the ITU-T grid. The central frequency of the non-transmission band at the port B1 side of the interleaver 52 is shifted +12.5 GHz from the frequencies f4, f8, . . . of the ITU-T grid.

Such a positioning of the central frequency can be performed by adjusting the temperature of the interleavers 51 through 53. For the temperature adjustment of the interleavers 51 through 53, a thermostat, for example, can be used.

As graph A1∧B1 shows, by connecting the output port A1 of the interleaver 51 to the input port B0 of the interleaver 52, the transmission band of the output port B1 becomes the overlapping portion of the transmission bands of the interleavers 51 and 52, and the non-transmission band of the output port B1 becomes the portion of the non-transmission band of at least one of the interleavers 51 and 52.

Therefore the transmission bandwidth of the graph A1∧B1 becomes 75 GHz, and the non-transmission bandwidth becomes 125 GHz, and the start frequency (rise edge) of the transmission band shifts +12.5 GHz from the frequencies f1, f5, . . . (200 GHz interval) of the ITU-T grid.

Also as graph A1∧B2 shows, by connecting the output port A1 of the interleaver 51 to the input port B0 of the interleaver 52, the transmission bandwidth of the output port B2 becomes 25 GHz and the non-transmission bandwidth becomes 175 GHz, and the start frequency (rise edge) of the transmission band shifts −12.5 GHz from the frequencies f1, f5, . . . (200 GHz interval) of the ITU-T grid.

By connecting two interleavers, of which the central frequency of the transmission bandwidth (non-transmission bandwidth) is shifted from the ITU-T grid, in a series, a filter (interleaver), which has an arbitrary start frequency and an arbitrary transmission bandwidth, can be constructed. As a result, an unequal bandwidth interleaver (filter), where the transmission bandwidth and the non-transmission bandwidth are not the same, can be constructed.

Figure 8:
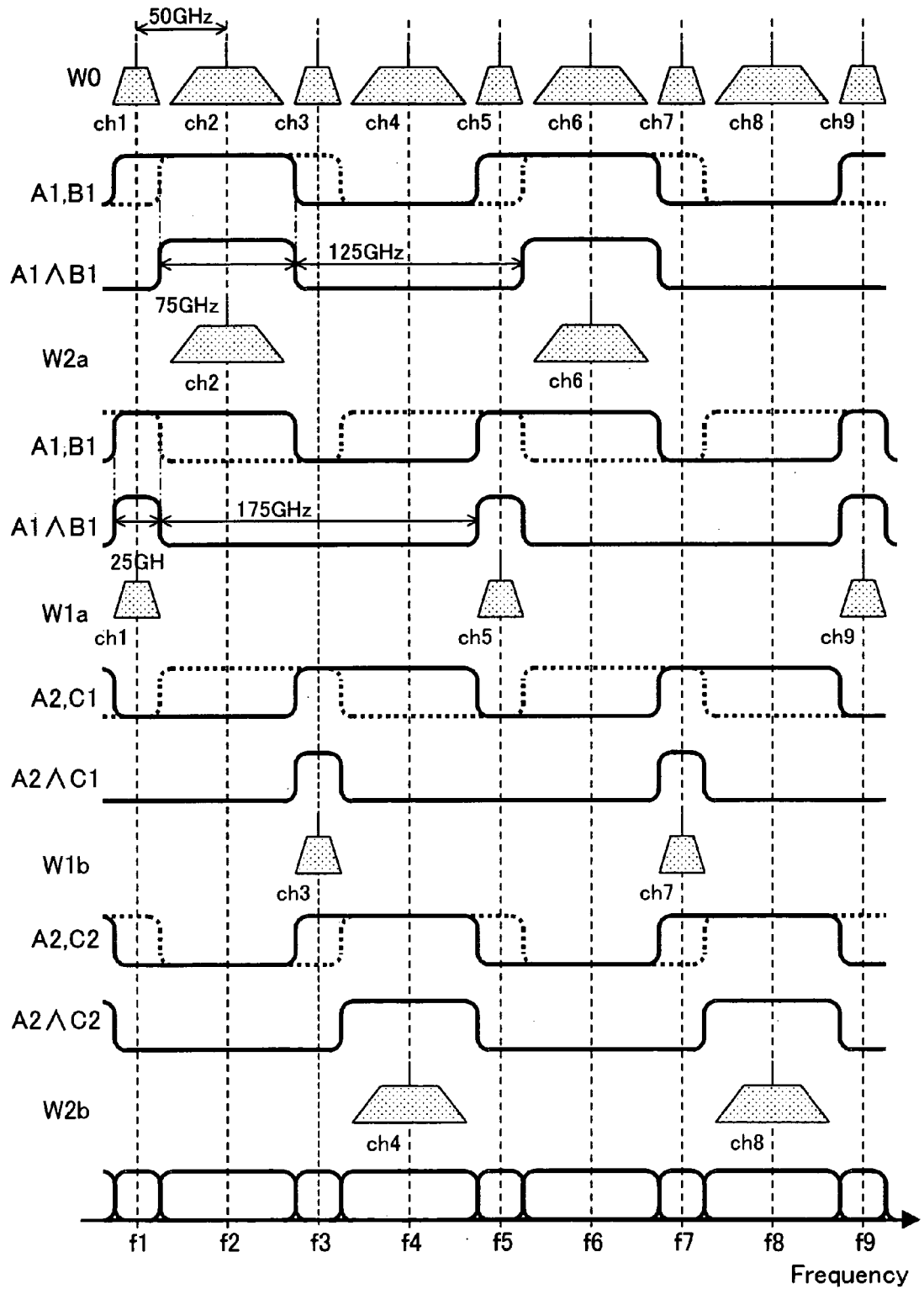
FIG. 8 is a diagram depicting the transmission characteristics of interleaver combinations and the status when the WDM signal is filtered by the unequal bandwidth interleaver.

FIG. 8 shows the transmission characteristics of the interleavers 51 through 53 and the combinations of these interleavers, and the status when the WDM signal W0 to be input to the input, port P0 of the interleaver 51 are filtered by the interleavers 51 through 53. In FIG. 8, the abscissa indicates the frequency.

The WDM signal W0 is shown at the very top level of FIG. 8.

In the graph for A1 and B1 at the second level in FIG. 8, the transmission characteristics at the output port A1 side of the interleaver 51 is shown by a solid line, and the transmission characteristics at the port B1 side of the interleaver 52 is shown by a broken line. The graph for A1∧B1 at the third level shows the transmission characteristics at the output port B1 side of the interleaver 52 when the port A1 of the interleaver 51 is connected to the input port B0 of the interleaver 52, as described with reference to FIG. 7. This is the same in the graph A1 and B2 at the fifth level and the graph A1∧B2 at the sixth level.

The transmission band of the graph A1∧B1 has a 75 GHz bandwidth with the ITU-T grid (frequencies f2, f6, . . . ), where 40 Gbit/s channels ch2, ch6, . . . (channel ch [4$i$−2]) with a 75 GHz bandwidth are arrayed, at the center. The transmission band of the graph A1∧B2 has a 25 GHz bandwidth with the ITU-T grid (frequencies f1, f5, . . . where 10 Gbit/s channels ch1, ch5, . . . (channel ch [4$i$−3]) with a 25 GHz bandwidth are arrayed, at the center.

Therefore when the WDM signal W0 passes through the interleavers 51 and 52, only the signal lights in the 40 Gbit/s channels ch [4$i$−2] are output from the output port B1 of the interleaver 52, as the WDM signal W2$a$ in FIG. 8 shows, and only the signal lights in the 10 Gbit/s channels ch [4$i$−3] are output from the output port B2 of the interleaver 52, as the WDM signal W1$a$ shows.

The transmission band of the graph A2∧C1 has a 25 GHz bandwidth with the ITU-T grid (frequencies f3, f7, . . . where 10 Gbit/s channels ch3, ch7, . . . (channel ch [4$i$−1]) with a 25 GHz transmission bandwidth are arrayed, at the center. The transmission band of the graph A2∧C2 has a 75 GHz bandwidth with the ITU-T grid (frequencies f4, f8, . . . ), where 40 Gbit/s channels ch4, ch8, . . . (channel ch [4$i$]), with a 75 GHz transmission bandwidth are arrayed, at the center.

Therefore when the WDM signal W0 passes through the interleavers 1 and 3, only the lights signals in the 10 Gbit/s channels ch [4$i$−1] are output from the output port C1 of the interleaver 3, as the WDM signal W1$b$ shows, and only the signal lights in the 40 Gbit/s channels ch [4$i$] are output from the output port C2 of the interleaver 53, as the WDM signal W2$b$ shows.

In this way, 40 Gbit/s signal lights are filtered by the unequal interval interleavers with a 75 GHz transmission bandwidth, which is comprised of two interleavers of which the central frequencies are shifted. 10 Gbit/s signal lights are filtered by the unequal interval interleavers with a 25 GHz transmission bandwidth, which is comprised of a combination of two interleavers of which the central frequencies are shifted. Therefore signals in each channel, 40 Gbit/s and 10 Gbit/s, are output in a status without much cross-talk and quality deterioration, such as loss of signal components.

At the lowest level in FIG. 8, a graph when A1∧B1, A1∧B2, A2∧C1 and A2∧C2 are combined, is shown.

In this way, a 10 Gbit/s and 40 Gbit/s mixed system can be flexibly supported by adjusting the central frequency (central wavelength) of the interleaver. Even a change in the bit rate of the signal lights can be flexibly supported by adjusting the central frequency of the interleaver.

Even for the case when the modulation system (e.g. NRZ system, RZ system, CSRZ system) of signal lights is changed, where the bandwidth of the signal lights changes, this can be flexibly supported in the same way as the case of the bit rate being changed.

In FIG. 5, the high-speed signal groups W2$a$ and W2$b$, which are output from the port B1 (port B1 of the interleaver 52) and port C2 (port C2 of the interleaver 53) of the unequal bandwidth interleaver 10$a$ respectively, are input to the interleavers 122 and 123 respectively. The low-speed signal groups W1$a$ and W1$b$, which were output from the port B2 (port B2 of the interleaver 52) and port C1 (port C1 of the interleaver 53) of the unequal bandwidth interleaver 10$a$ respectively, are input to the demultiplexers 110$a$ and 110$b$ respectively.

The demultiplexers 110$a$ and 110$b$ are 1:N1 (N1=22) demultiplexers with a 200 GHz frequency interval, for which a known AWG (Arrayed Waveguide Grating) filter and a multi-layer film filter can be used. By the multiplexers 110$a$ and 110$b$, the low-speed signal groups W1$a$ and W1$b$ are demultiplexed into signal lights with each 10 Gbit/s wavelength, and are input to the multiplexing module 2 via the module 3 when necessary.

The high-speed signal groups W2$a$ and W2$b$ are demultiplexed into an odd channel and an even channel by the interleavers 122 and 123 respectively, then are input to the demultiplexers 120$a$ through 120$d$ to be further demultiplexed into 40 Gbit/s signal lights with each wavelength. The 40 Gbit/s signal lights with each wavelength are input to the multiplexing module 2 via the module 3 when necessary.

In the multiplexing module 2, processing, of which the input/output relationship is reversed from that of the demultiplexing module 1, is executed, and the low-speed signals and the high-speed signals are multiplexed respectively, then multiplexed into WDM signals, where low-speed signals and high-speed signals are mixed, by the unequal bandwidth interleaver 20a, and the WDM signals are output.

According to the present embodiment as well, a device for low-speed signals, which is appropriate for low-speed signals, can be used for the low-speed signal group, and a device for high-speed signals, which is appropriate for high-speed signals, can be used for the high-speed signal group, just like the first embodiment. Because of this, it is unnecessary to install an expensive device for high-speed signals for all the signals with each wavelength, however an expensive device can be installed only for the high-speed signal side, so an optical transmission system where 10 Gbit/s and 40 Gbit/s are mixed can be implemented keeping the device cost down. Also using a device which exceeds specifications for low-speed signals can be avoided.

Also even when a 10 Gbit/s optical transmission system with a 100 GHz interval is initially installed and this system is extended to be a 50 GHz interval, and when it is not determined which one of the 10 Gbit/s and 40 Gbit/s will be extended at the time of the initial installation, this configuration allows using an optical multiplexer/demultiplexer for low-speed if 10 Gbit/s is extended, and using a high performance optical multiplexer/demultiplexer for high-speed only when 40 Gbit/s is extended, so extendability is good.

The high-speed demultiplexing unit 12 may be comprised of two 1:N1 (N1=22 in this case) demultiplexers with a 200 GHz frequency interval.

Figure 9A:
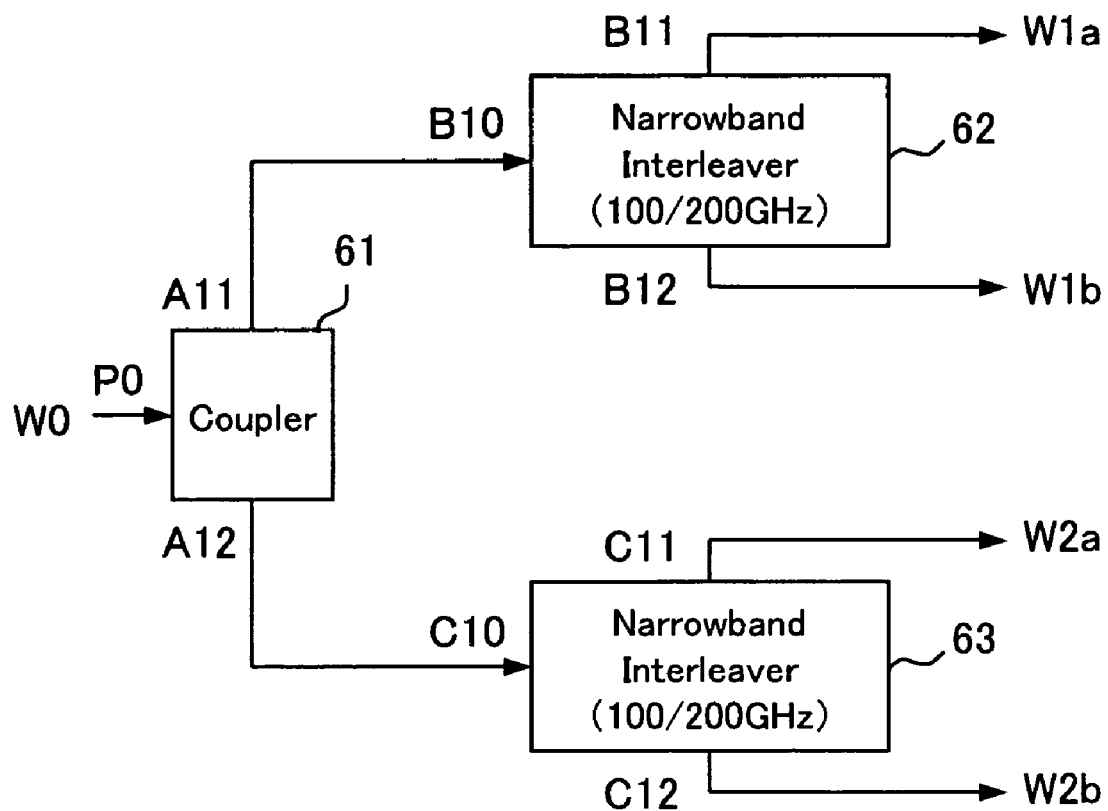
FIG. 9A is a block diagram depicting a configuration example of the unequal bandwidth interleaver of the demultiplexing module.

The unequal bandwidth interleaver 10a (20a) may be comprised of a coupler 61 and narrowband interleavers 62 and 63, as shown in FIG. 9A (9B).

The coupler 61 outputs the WDM signals W0, which are input to the input port P0, directly to the two output ports A11 and A12. The WDM signals W0, which were output, are input to the input port B10 of the narrowband interleaver 62 and to the input port C10 of the narrowband interleaver 63.

The narrowband interleavers 62 and 63 are interleavers for demultiplexing the signal lights with a 100 GHz interval into even channels and odd channels to generate WDM signals with a 200 GHz interval, allowing only signal components with a predetermined bandwidth to pass by the internally installed narrowband filter (or allowing only signal components with a predetermined bandwidth to pass by the narrowband filter with reversing the input/output relationship, and multiplexing the WDM signals in even channels and odd channels with a 200 GHz interval to generate signal lights with a 100 GHz interval).

Such a narrowband interleaver can be constructed by integrating a narrowband filter, for filtering each signal light constituting the WDM signals to be light with a predetermined transmission bandwidth, into a known interleaver, for example.

Figure 10:
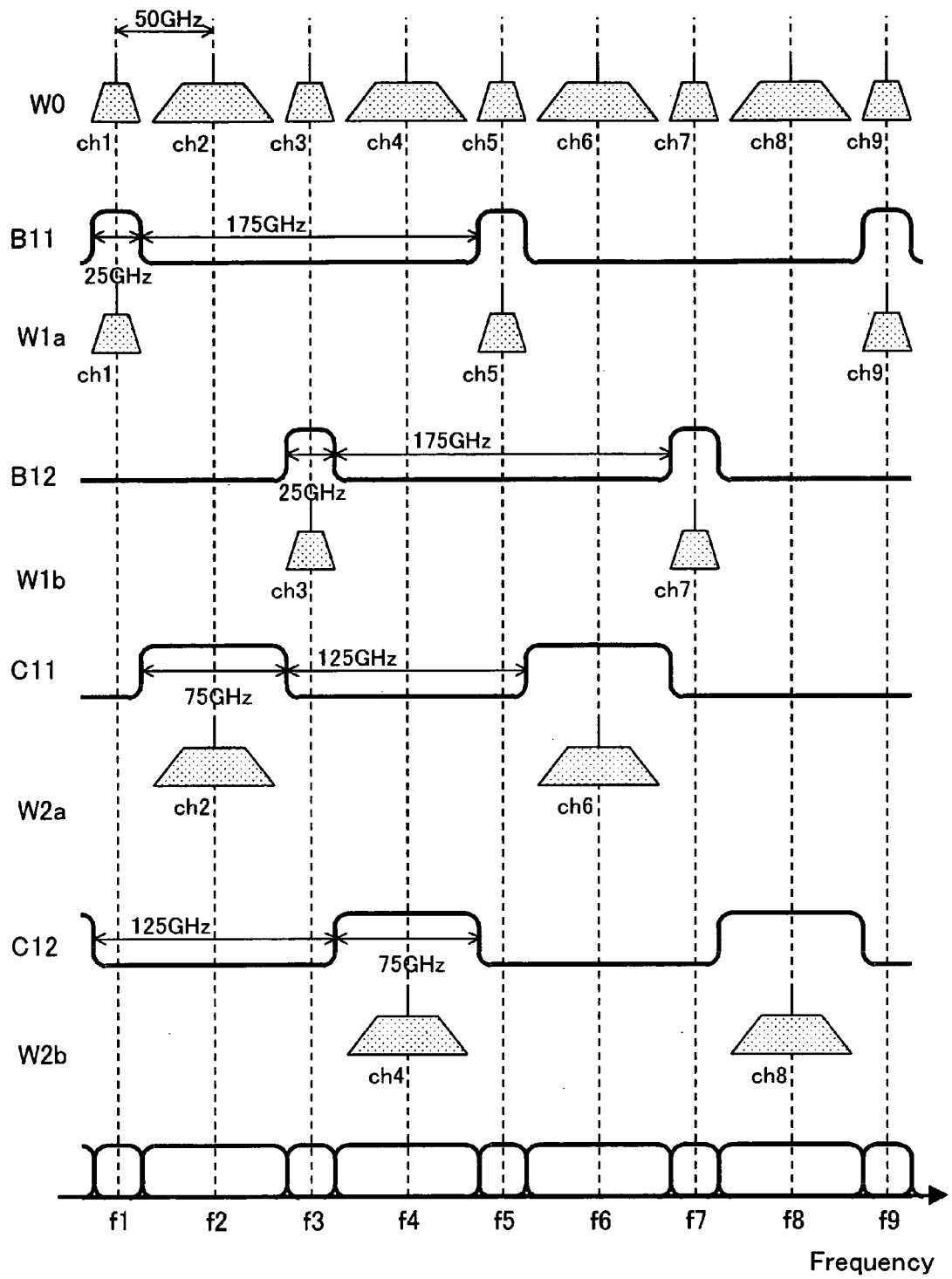
FIG. 10 is a diagram depicting the transmission characteristics of the two interleavers shown in FIG. 9A and the status when the WDM signal is filtered by the two interleavers.

FIG. 10 shows the transmission characteristics of the interleavers 62 and 63, and the status when the WDM signals W0 are filtered by the interleavers 62 and 63.

The graph B11 shows the transmission characteristics of the narrowband interleaver 62 at the output port B11 side, and the graph B12 shows the transmission characteristics of the narrowband interleaver 62 at the output port B12 side. By the internally installed narrowband filter, the bandwidth of the transmission band of the narrowband interleaver 62 is reduced from 100 GHz to 25 GHz, and the bandwidth of the non-transmission band is expanded from 100 GHz to 175 GHz.

The central frequency of the transmission band at the port B11 side is set to the frequencies f1, f5, . . . of the ITU-T grid. The central frequency of the transmission band at the port B12 side is set to the frequencies f3, f7, . . . of the ITU-T grid.

The graph C11 shows the transmission characteristics of the narrowband interleaver 63 at the output port C11 side, and the graph C12 shows the transmission characteristics of the narrowband interleaver 63 at the output port C12 side. For the narrowband interleaver 63 as well, the bandwidth of the transmission band at the output port C11 side and the C12 side is reduced from 100 GHz to 75 GHz, and the bandwidth of the non-transmission band is expanded from 100 GHz to 125 GHz by the internal narrowband filter. The central frequency of the transmission band at the port C11 side is set to the frequencies f2, f6, . . . of the ITU-T grid. The central frequency of the transmission band at the port C12 side is set to the frequencies f4, f8, . . . of the ITU-T grid.

By using such interleavers 62 and 63 as well, the unequal bandwidth interleaver can be constructed. And only the WDM signals W1a in the channel ch [4$i$−3] are output from the output port B11 (port B2 in FIG. 5), and only the WDM signals W1b in the channel ch [4$i$−1] are output from the output port B12 (port C1 in FIG. 5). Also only the WDM signals W2a in the channel ch [4$i$−2] are output from the output port C11 (port B1 in FIG. 5), and only the WDM signals W2b in the channel ch [4$i$] are output from the output port C12 (port C2 in FIG. 5).

Embodiment 3

Figure 11:
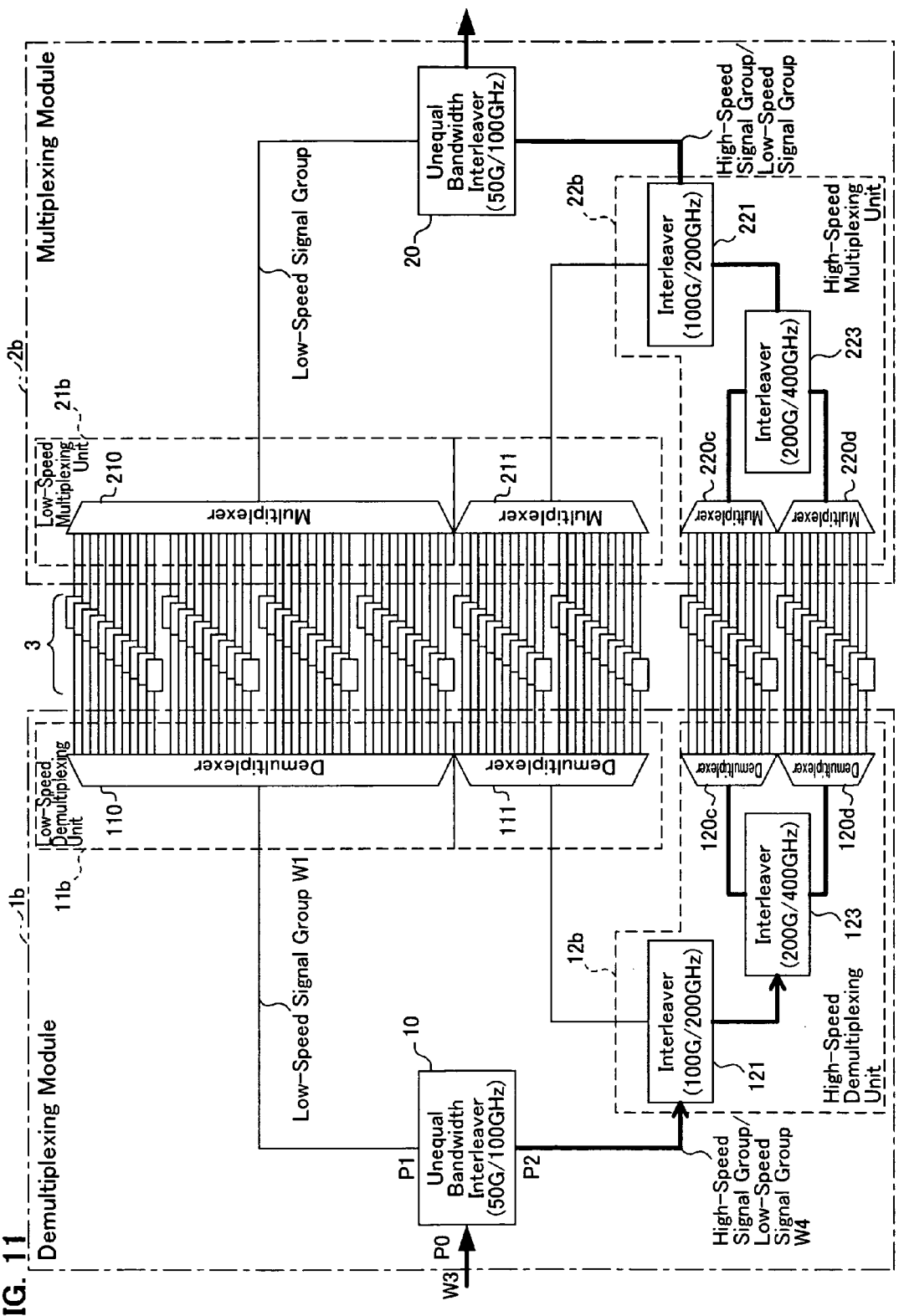
FIG. 11 is a block diagram depicting the configuration of an optical transmission node according to the third embodiment of the present invention.

FIG. 11 is a block diagram depicting the configuration of the optical transmission node according to the third embodiment of the present invention. This optical transmission node comprises a demultiplexing module 1b and a multiplexing module 2b.

The demultiplexing module 1b is comprised of an unequal bandwidth interleaver 10, low-speed demultiplexing unit 11b, and high-speed demultiplexing unit 12b. The low-speed demultiplexing unit 11b is further comprised of demultiplexers for low-speed signals 110 and 111. The high-speed demultiplexing unit 12b is further comprised of interleavers for high-speed signals 121 and 123, and demultiplexers for high-speed signals 120c and 120d. The multiplexing module 2b is comprised of an unequal bandwidth interleaver 20, low-speed multiplexing unit 21b, and high speed multiplexing unit 22b. The low-speed multiplexing unit 21b is further comprised of the multiplexers for low-speed signals 210 and 211. The high-speed multiplexing unit 22b is further comprised of the interleavers for high-speed signals 221 and 223, and multiplexers for high-speed signals 220c and 220d.

Here the unequal bandwidth interleavers 10 and 20, interleavers 121, 123, 221 and 223, demultiplexers 110, 120c and 120d, and multiplexers 210, 220c and 220d are the same as those in FIG. 1 and are denoted with the same reference symbols, so a detailed explanation thereof will be omitted.

Figure 12:
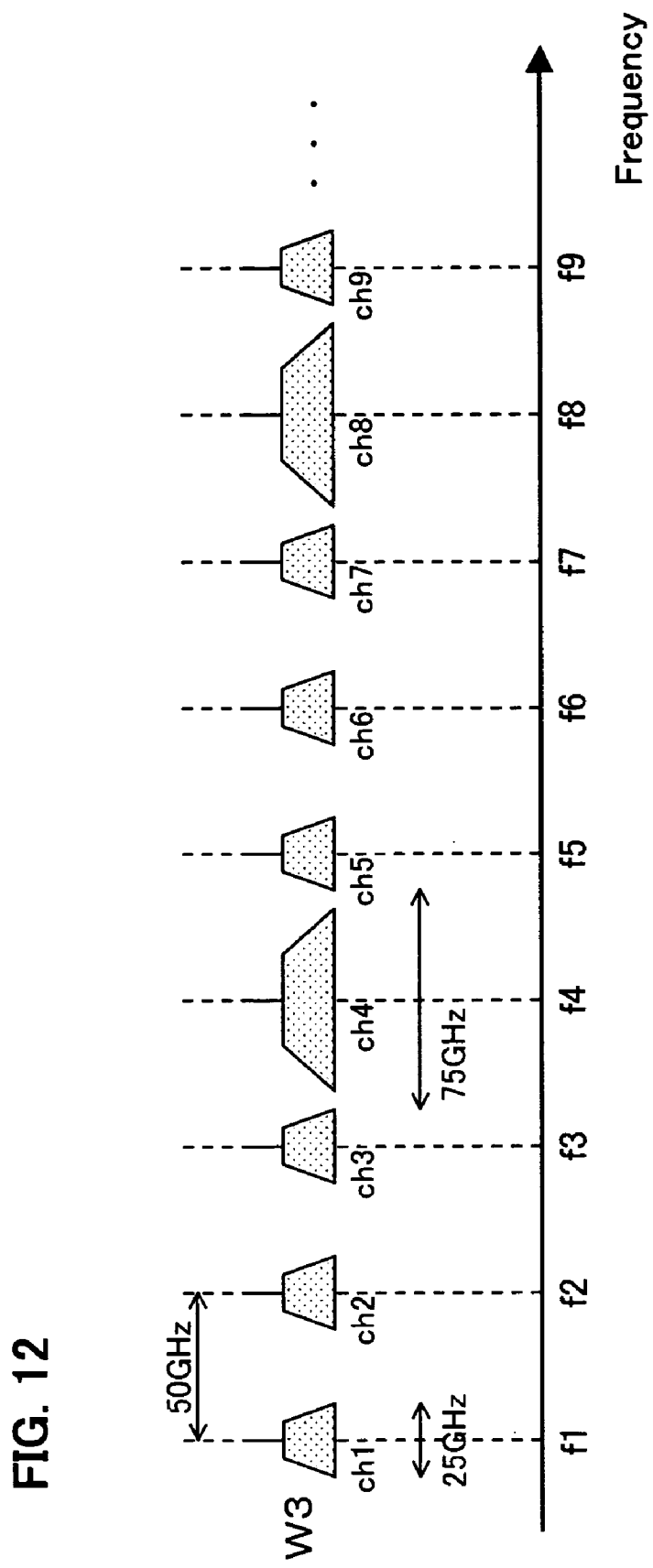
FIG. 12 is a diagram depicting a signal arrangement example of the WDM signal that is input to the demultiplexing module of the third embodiment.

FIG. 12 shows an example of the signal arrangement of the WDM signal W3 which is input to the demultiplexing module 1b (unequal bandwidth interleaver 10). The meanings of the abscissa and the frequencies f1, f2, . . . are the same as those in FIG. 2. The difference of the WDM signal W3 from the WDM signal W0 in FIG. 2 is that ¾ thereof are 10 Gbit/s signals and ¼ thereof are 40 Gbit/s signals. In these WDM signal W3, 40 Gbit/s signals are disposed in the channel ch [4$i$] and 10 Gbit/s signals are disposed in the other channels. As described in the first embodiment, it is not necessary that 40 Gbit/s signals are disposed in all the even channels ch [2$i$], but 10 Gbit/s signals may be disposed in a part of the even channels, as shown in FIG. 12.

When the WDM signal W3 is input to the port P0 of the unequal bandwidth interleaver 10 of the demultiplexing module 1b, 10 Gbit/s signals in the odd channel ch [2i−1], that is the low-speed signal group W1 (same as the signal group denoted with the same reference numeral in FIG. 1) is output from the port P1, and is input to the demultiplexer for low-speed signals 110 of the low-speed demultiplexing unit 11b. The demultiplexer 110 demultiplexes the low-speed signal group W1 into signal lights with each wavelength, and outputs the signal lights.

From the port P2, on the other hand, the signal group W4 in the even channel ch [2i] is output. This signal group W4 in the even channel is a signal group where high-speed signals and low-speed signals are mixed, and includes the 10 Gbit/s signals in the channel ch [4i−2] and the 40 Gbit/s signals in the channel ch [4i]. Since the transmission bandwidth of the port P2 of the unequal bandwidth interleaver is 75 GHz, signals of which the transmission bandwidth is less than this bandwidth are output from the port P2. Therefore the mixed signals of 40 Gbit/s signals and 10 Gbit/s signals can be output from the port P2.

The signal group W4 is input to the interleaver for high-speed signals of the high-speed demultiplexing unit 12b, and is demultiplexed into the signal group in the odd channel ch [4i−2] which is comprised of only 10 Gbit/s signals, and the signal group in the even channel ch [4i] which is comprised of only 40 Gbit/s signals.

The signal group in the odd channel ch [4i−2] is input to the demultiplexer for low-speed signals 111 of the low-speed demultiplexing unit 11b, demultiplexed into signal lights with each wavelength, and the signal lights are output. The signal group in the even channel ch [4i] is input to the interleaver 123, and is demultiplexed into the signal groups in the odd channel [8i−4] and even channel ch [8i]. These signal groups in the odd channel and even channel are input to the demultiplexers for high-speed signals 120c and 120d respectively. In the demultiplexers 120c and 120d, the signal group which is input is demultiplexed into the signal lights with each wavelength, and the signal lights are output.

The 10 Gbit/s signals with each wavelength which are output from the demultiplexers 110 and 111, and the 40 Gbit/s signals with each wavelength which are output from the demultiplexers 120c and 120d are input to the multiplexing module 2b via the module 3 when necessary. In the multiplexing module 2b, multiplexing processing, of which the input/output relationship is reversed from the demultiplexing module 1b, is executed, and the signal lights with each wavelength are multiplexed and output as one WDM signal.

When a maximum of ¼ of all the channels are upgraded to 40 Gbit/s signals, or when a maximum of ¼ of all the channels are extended for 40 Gbit/s signals, the configuration of the present embodiment allows the high performance optical multiplexer/demultiplexer for high-speed signals to be applied only to the multiplexing/demultiplexing units for 40 Gbit/s signals, therefore a 10 Gbit/s and 40 Gbit/s mixed transmission system can be implemented keeping cost down.

Embodiment 4

The fourth embodiment of the present invention is an embodiment of the optical transmission node when the unequal bandwidth interleavers 10a and 20a (FIG. 5, 6A, 6B, 9A, 9B) described in the second embodiment are used for the unequal bandwidth interleavers 10 and 20 of the third embodiment respectively.

Figure 13:
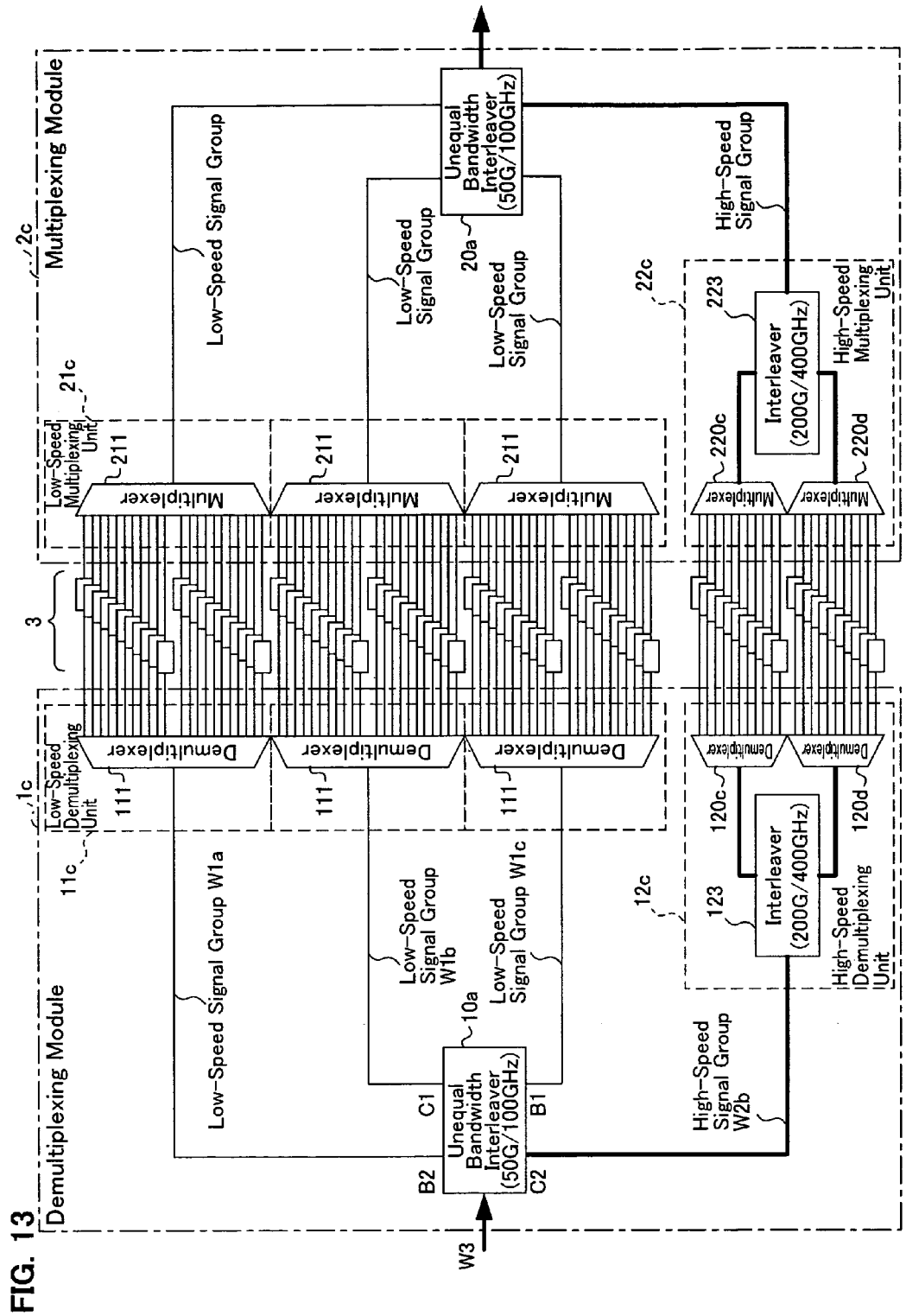
FIG. 13 is a block diagram depicting the configuration of an optical transmission node according to the fourth embodiment of the present invention.

FIG. 13 is a block diagram depicting the configuration of the optical transmission node according to the fourth embodiment of the present invention. This transmission node comprises a demultiplexing module 1c and a multiplexing module 2c.

The demultiplexing module 1c is comprised of an unequal bandwidth interleaver 10a, low-speed demultiplexing unit 11c, and high-speed demultiplexing unit 12c. The low-speed demultiplexing unit 11c is further comprised of three demultiplexers for low-speed signals 111. The high-speed demultiplexing unit 12c is further comprised of an interleaver for high-speed signals 123 and demultiplexers for high-speed signals 120c and 120d. The multiplexing module 2c is comprised of an unequal bandwidth interleaver 20a, low-speed multiplexing unit 21c and high-speed multiplexing unit 22c. The low-speed multiplexing unit 21c is further comprised of three multiplexers for low-speed signals 211. The high-speed multiplexing unit 22c is further comprised of the interleaver for high-speed signals 223 and multiplexers for high-speed signals 220c and 220d.

Figure 9B:
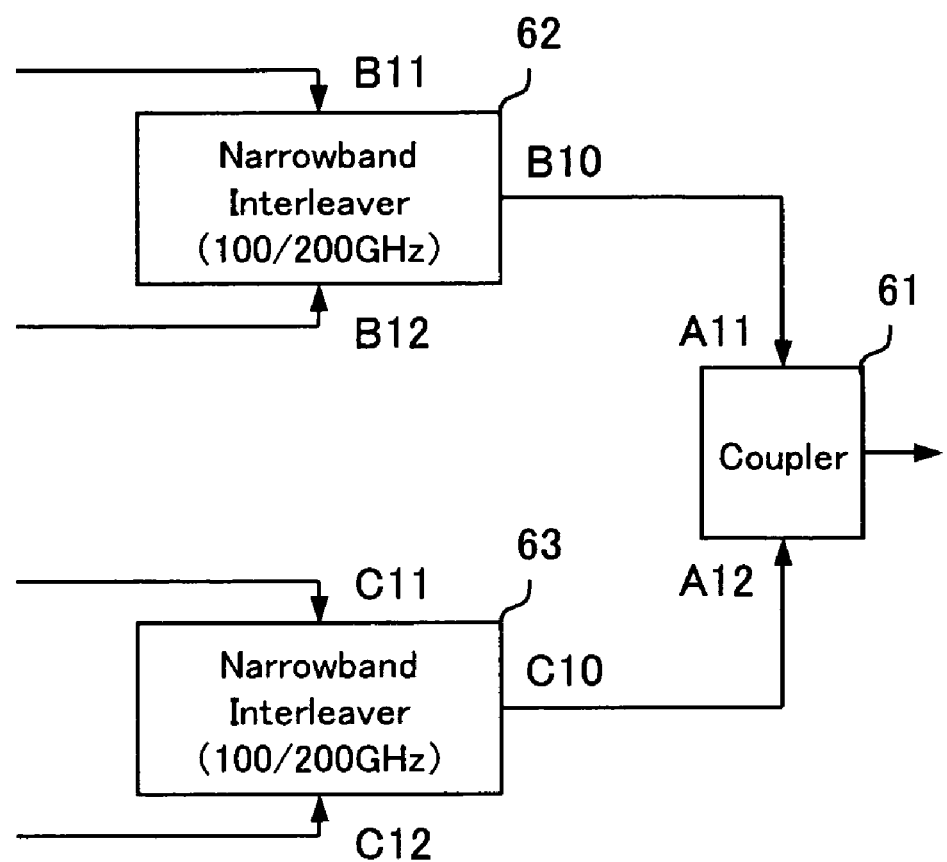
FIG. 9B is a block diagram depicting a configuration example of the unequal bandwidth interleaver of the multiplexing module.

The unequal bandwidth interleavers 10a and 20a are the same as those in FIG. 5, and are denoted with the same reference symbols, so the interleavers shown in FIGS. 6A and 6B or in FIGS. 9A and 9B can be used. The interleavers 123 and 223, demultiplexers 120c and 120d, and multiplexers 220c and 220d are the same as those in FIG. 1 (FIG. 5, FIG. 11) and are denoted with the same reference symbols, and the multiplexer 111 is denoted with the same reference symbols as in FIG. 11. Therefore a detailed explanation thereof will be omitted here.

The WDM signal W3 shown in FIG. 12 is input to the unequal bandwidth interleaver 10a of this demodulating module 1c, just like the third embodiment. From the output port B2 of the unequal bandwidth interleaver 10a, the low-speed signal group W1a, which is comprised of the 10 Gbit/s signals in the channel ch [4i−3], is output, and from the output port C1, the low-speed signal group W1b, which is comprised of the 10 Gbit/s signals in the channel ch [4i−1], is output respectively. From the output port B1, the low-speed signal group W1c, which is comprised of the 10 Gbit/s signals in channel ch [4i−2], is output. These three low-speed signal groups W1a through W1c are demodulated into signal lights with each wavelength by the three demultiplexers for low speed signals 111 of the low speed demultiplexing unit 11c.

From the output port C2, the high-speed signal group W2b, which is comprised of the 40 Gbit/s signals in the channel ch [4i], is output. This high-speed signal group W2b is demultiplexed into the odd channel and even channel by the interleaver for high-speed signals 123 of the high-speed demultiplexing unit 12c, and then demultiplexed into signal lights with each wavelength by the demultiplexers for high-speed signals 120c and 120d.

The signal lights, which are output from the demultiplexer 111, demultiplexer 120c and demultiplexer 120d, are input to the multiplexing module 2c via the module 3 when necessary. In the multiplexing module 2c, the multiplexing processing, of which the input/output relationship is reversed from the demultiplexing module 1c, is executed, and the signal lights with each wavelength are multiplexed into one WDM signal, and output.

In this way, by using the unequal bandwidth interleavers 10a and 20a as well, the signals are separated into the low-speed group and the high-speed signal group, and each signal group can be multiplexed/demultiplexed using the respective device which is appropriate. As a result, an effect the same as the third embodiment can be implemented.

Embodiment 5

Figure 14:
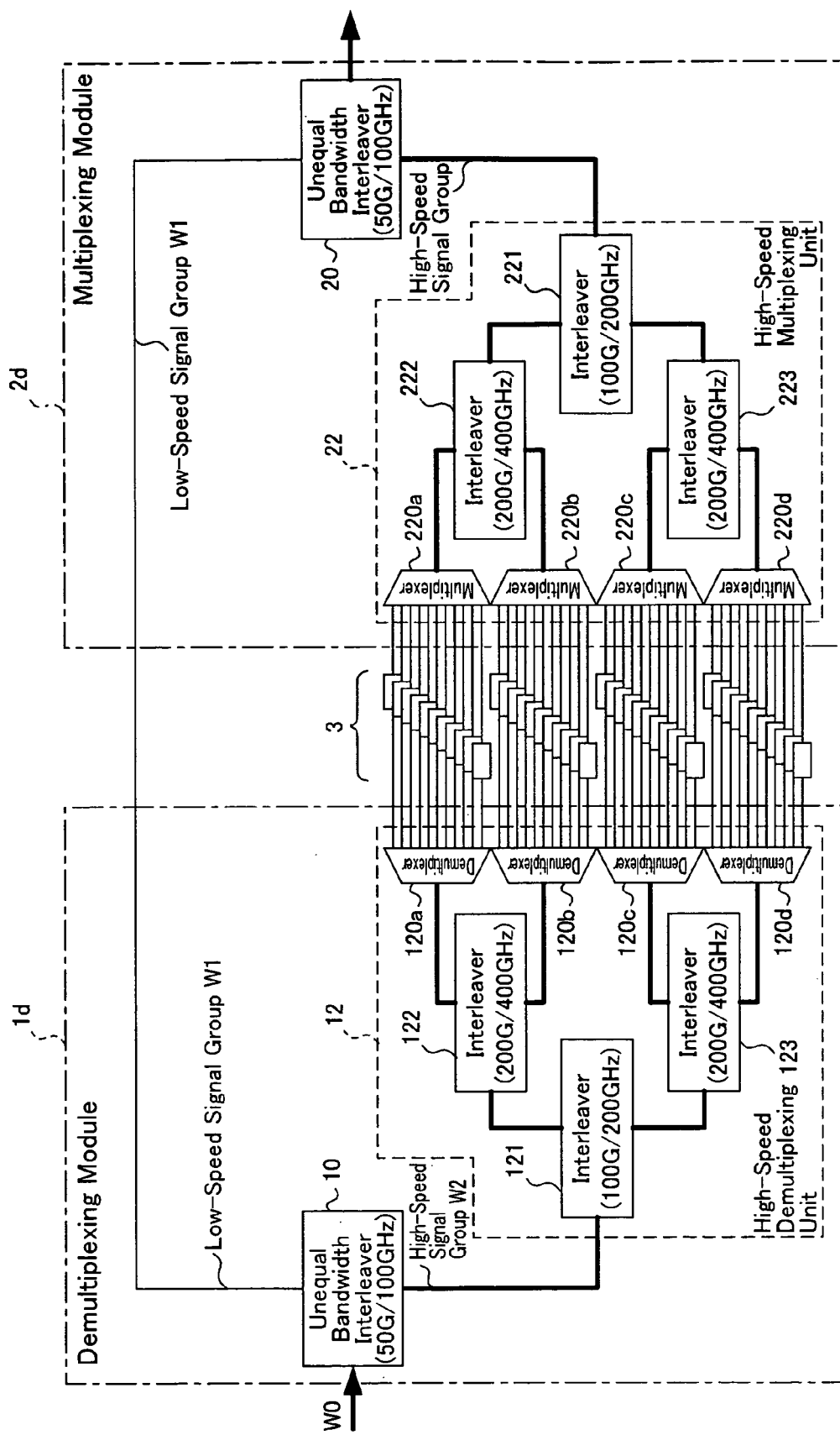
FIG. 14 is a block diagram depicting the configuration of an optical transmission node according to the fifth embodiment of the present invention.

FIG. 14 is a block diagram depicting the configuration of the optical transmission node according to the fifth embodiment. As a comparison of FIG. 14 and FIG. 1 shows, the difference is that the fifth embodiment does not comprise the low-speed demultiplexing unit 11 and the low-speed multiplexing unit 21 at the low-speed signal group side shown in FIG. 1, the rest of the configuration is the same as FIG. 1.

The optical transmission node of the present embodiment can be used when 40 Gbit/s signals are added/dropped while 10 Gbit/s signals are transmitted long distance, or when a compensation node is necessary only for 40 Gbit/s signals.

In the present embodiment, WDM signals W0 (see FIG. 2), the same as FIG. 1, are input to the unequal bandwidth interleaver 10 of the demultiplexing module 1d in FIG. 14. Therefore in the present embodiment, the WDM signals W0 are demultiplexed into the low-speed signal group W1 and the high-speed signal group W2 by the unequal bandwidth interleaver 10, then only the high-speed signal group W2 is demultiplexed into signal lights with each wavelength by the high-seed demultiplexing unit 12, which are multiplexed by the high-speed multiplexing unit 22 via the module 3 when necessary. And the low-speed signal group and the high-speed signal group are multiplexed again by the unequal bandwidth interleaver 20 of the multiplexing module 2d, and output as one WDM signal.

By this embodiment, which demultiplexes the high-speed signal group and the low-speed signal group as well, a high performance device appropriate for high-speed signals can be used only for the high-speed signal group, so a 10 Gbit/s and 40 Gbit/s mixed transmission system can be implemented keeping cost down.

Embodiment 6

Figure 15:
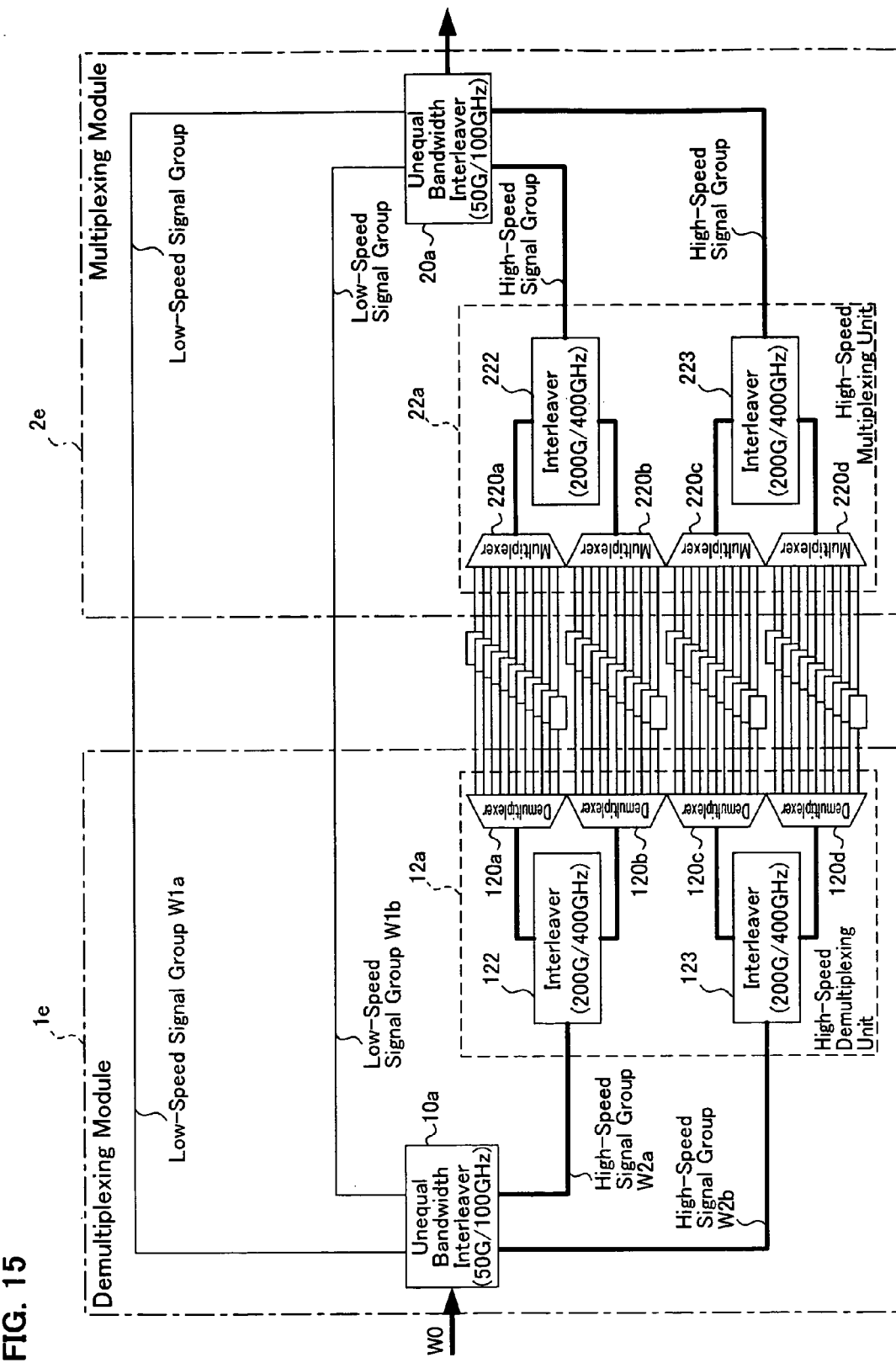
FIG. 15 is a block diagram depicting the configuration of an optical transmission node according to the sixth embodiment of the present invention.

FIG. 15 is a block diagram depicting the configuration of the optical transmission node according to the sixth embodiment of the present invention. This sixth embodiment is the same as the fifth embodiment where the unequal bandwidth interleavers 10 and 20 are replaced with the unequal bandwidth interleavers 10a and 20a in the second embodiment (FIG. 5, FIGS. 6A, 6B, FIGS. 9A, 9B) respectively.

Therefore the only difference in the sixth embodiment is that the low-speed demultiplexing unit 11a and the low-speed multiplexing unit 21a at the low-speed signal group side in the second embodiment shown in FIG. 5 are not installed, and the rest is the same as FIG. 5.

In this optical transmission node, the signal lights are demultiplexed into the low-speed signal groups W1a and W1b, and the high-speed signal groups W2a and W2b by the unequal bandwidth interleaver 10a of the demultiplexing module 1e, then only the high-speed signal groups W2a and W2b are demultiplexed into the signal lights with each wavelength by the high-speed demultiplexing unit 12a, which are multiplexed by the high-speed multiplexing unit 22a via the module 3 when necessary. And the low-speed signal group and the high-speed signal group are multiplexed again by the unequal bandwidth interleaver 20a of the multiplexing module 2e, and output as one WDM signal.

By this embodiment as well, the same effect as the fifth embodiment can be implemented.

Embodiment 7

Figure 16:
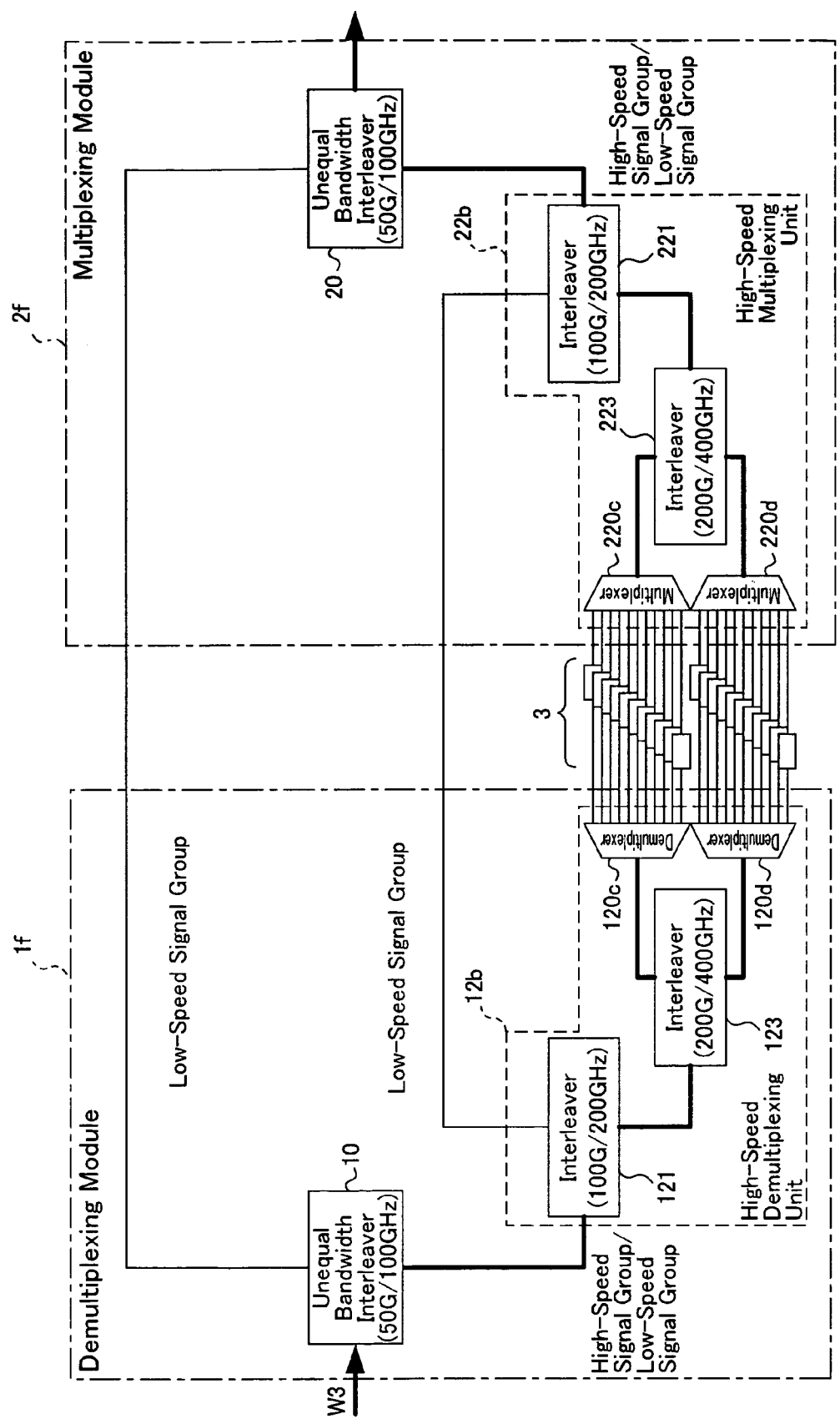
FIG. 16 is a block diagram depicting the configuration of an optical transmission node according to the seventh embodiment of the present invention.

For the third embodiment (see FIG. 11) as well, the multiplexer/demultiplexer at the low-speed signal side can be omitted, just like the fifth and sixth embodiments. FIG. 16 is a block diagram depicting the configuration of the optical transmission node according to the seventh embodiment, where the multiplexer/demultiplexer at the low-speed signal side in the third embodiment is omitted. The difference of this embodiment is that the low-speed demultiplexing unit 11b in FIG. 11 is not installed in the demultiplexing module 1f, and the low-speed multiplexing unit 21b in FIG. 11 is not installed in the multiplexing module 2f, and the rest is the same as FIG. 11.

Just like the fifth and sixth embodiments, in the present embodiment as well, the WDM signals W3 (see FIG. 12) are demultiplexed into the low-speed signal group and the high-speed signal group by the unequal bandwidth interleaver 10 of the demultiplexing module 1f, then only the high-speed signal group is demultiplexed into signal lights with each wavelength by the high-speed demultiplexing unit 12b, which are multiplexed again by the high-speed multiplexing unit 22b via the module 3 when necessary. And the low-speed signal group and the high-speed signal group are multiplexed again by the unequal bandwidth interleaver 20 of the multiplexing module 2f, and output as one WDM signal.

By this embodiment as well, a high performance device for high-speed signals can be applied only to a multiplexing/demultiplexing unit (transmission unit) for 40 Gbit/s signals, which is ¼ of all the WDM signals, so a 10 Gbit/s and 40 Gbit/s mixed transmission system can be implemented keeping cost down.

Embodiment 8

Figure 17:
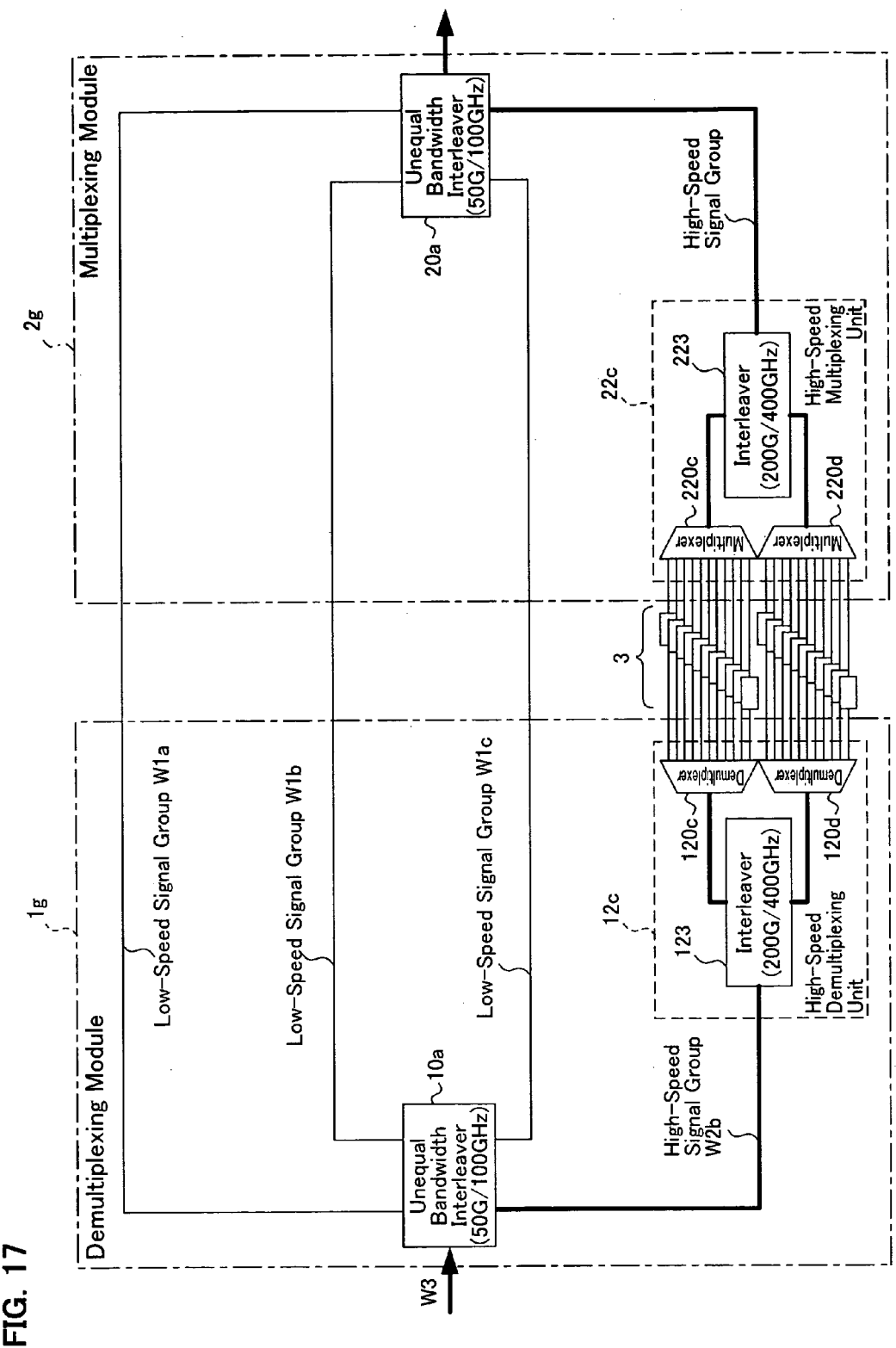
FIG. 17 is a block diagram depicting the configuration of an optical transmission node according to the eighth embodiment of the present invention.

For the fourth embodiment (see FIG. 13) as well, the multiplexer/demultiplexer at the low-speed signal side can be omitted. FIG. 17 is a block diagram depicting the configuration of the optical transmission node according to the eighth embodiment, where the multiplexer/demultiplexer at the low-speed signal side is omitted in the fourth embodiment. The difference of this embodiment is that the low-speed demultiplexing unit 11c in FIG. 13 is not installed in the demultiplexing module 1g, and the low-speed multiplexing unit 21c in FIG. 13 is not installed in the multiplexing unit 2g, and the rest is the same as FIG. 13.

In the present embodiment as well, the WDM signals W3 (see FIG. 12) are demultiplexed into the low-speed signal groups W1a through W1c and the high-speed signal group W2b by the unequal bandwidth interleaver 10a of the demultiplexing module 1g, then only the high-speed signal group W2b is demultiplexed into signal lights with each wavelength by the high-speed demultiplexing unit 12c, which are multiplexed by the high-speed multiplexing unit 22c via the module 3 when necessary. And the low-speed signal groups W1a through W1c and the high-speed signal group are multiplexed again by the unequal bandwidth interleaver 20a of the multiplexing module 2g, and are output as one WDM signal.

By this embodiment as well, a high performance optical multiplexer/demultiplexer for high-speed signals can be applied only to the multiplexing/demultiplexing unit (transmission unit) for 40 Gbit/s signals, which is ¼ of all the WDM signals, so a 10 Gbit/s and 40 Gbit/s mixed transmission system can be implemented keeping cost down.

Embodiment 9

In the ninth embodiment of the present invention, the WDM signals are demultiplexed into the high-speed signal group and the low-speed signal group, and a variable dispersion compensator is disposed at the high-speed signal side.

The dispersion tolerance of a 40 Gbit/s signal is much smaller than that of 10 Gbit/s signals, 1/16, and depending on irregularities in the manufacture of transmission lines and the dispersion compensator fibers and/or the temperature change, the dispersion of a 40 Gbit/s signal may exceed the dispersion tolerance thereof. Therefore a variable dispersion compensator is required at the high-speed signal side.

FIG. 18 to FIG. 22 are block diagrams depicting the configuration of the optical transmission node according to the ninth embodiment of the present invention, where a variable dispersion compensator is applied at the high-speed signal side.

Figure 18:
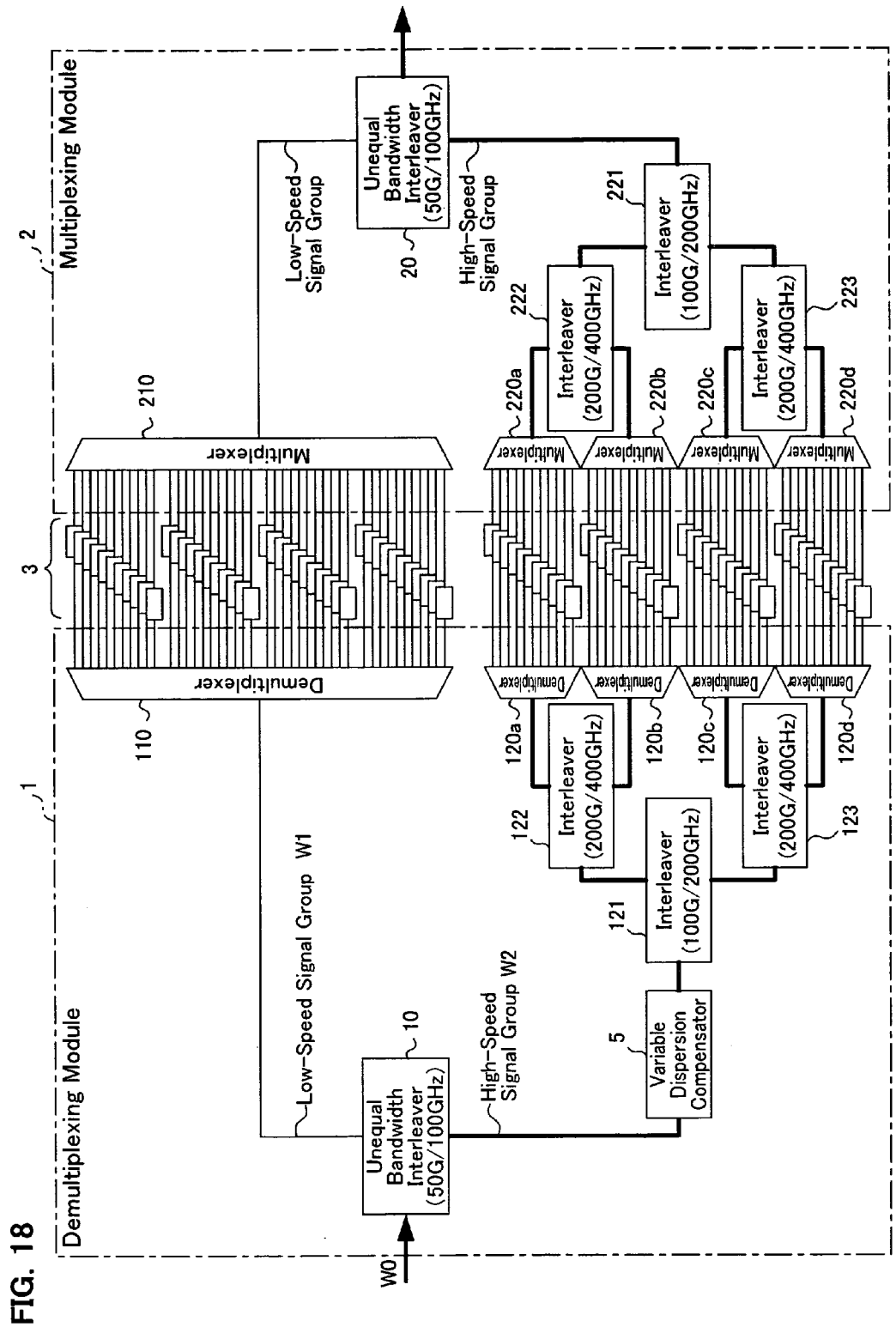
FIG. 18 is a block diagram depicting an optical transmission node according to the ninth embodiment of the present invention where a variable dispersion compensator is applied at the high-speed signals side.
Figure 19:
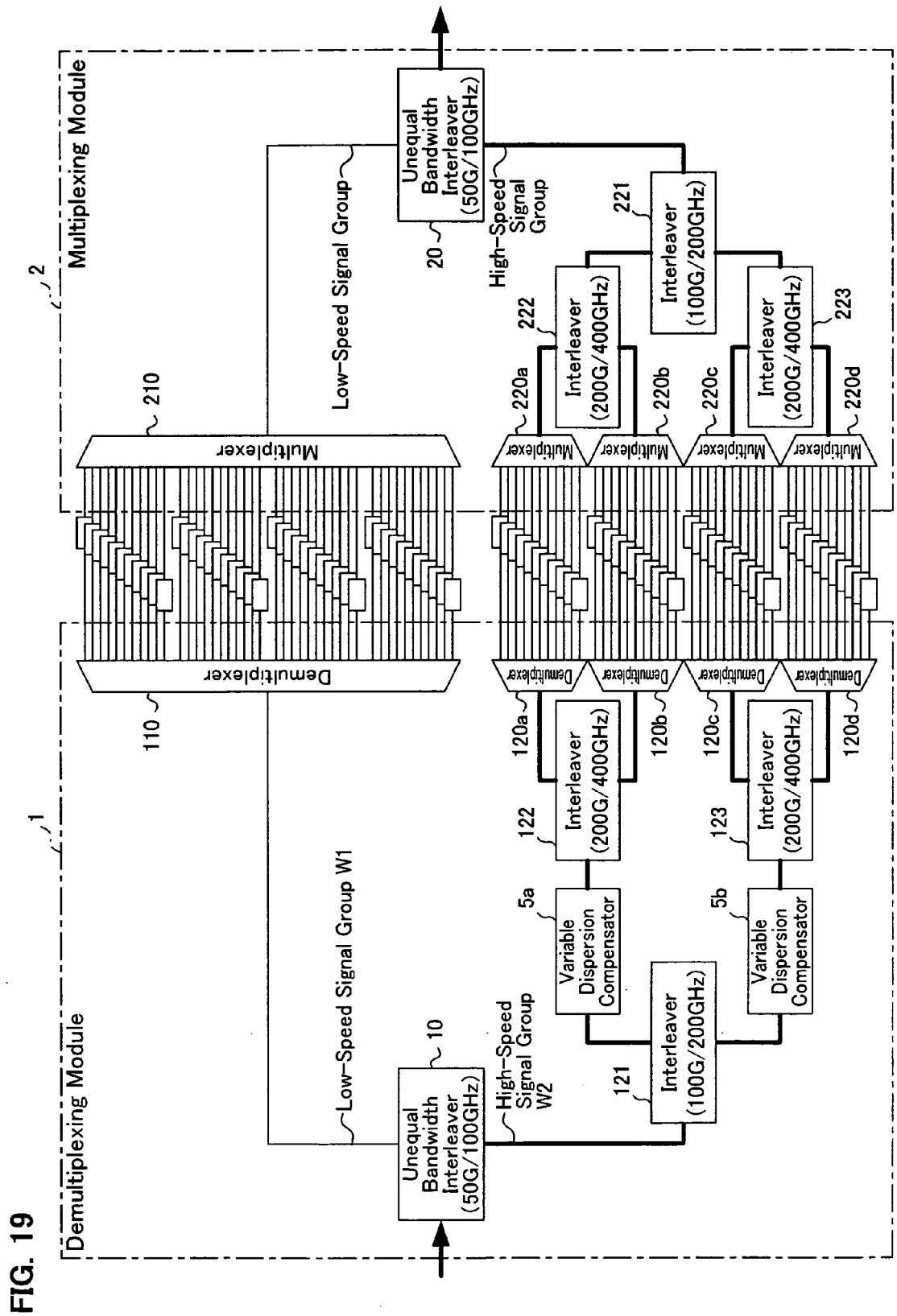
FIG. 19 is a block diagram depicting an optical transmission node according to the ninth embodiment of the present invention where a variable dispersion compensator is applied at the high-speed signals side.
Figure 20:
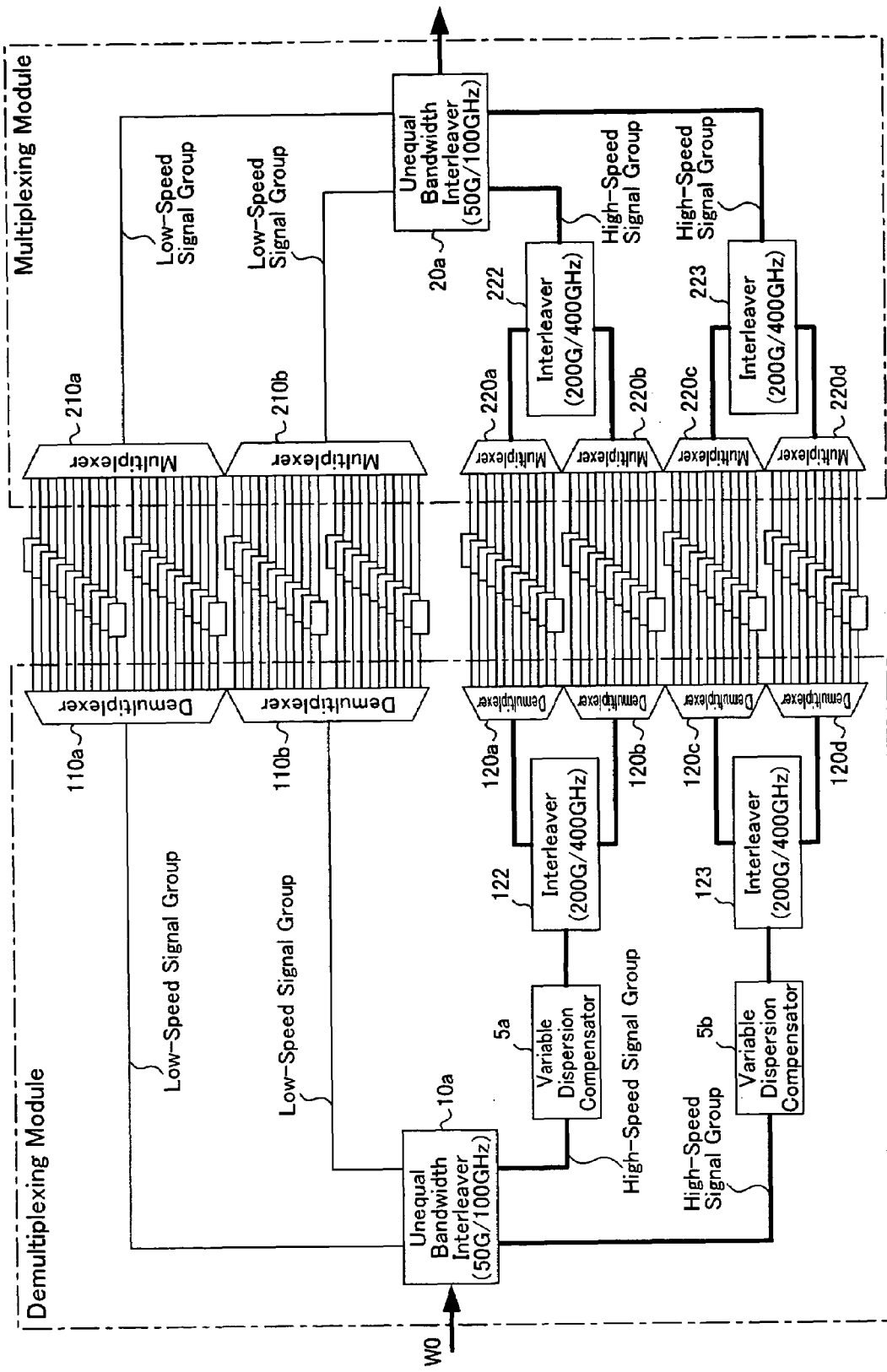
FIG. 20 is a block diagram depicting an optical transmission node according to the ninth embodiment of the present invention where a variable dispersion compensator is applied at the high-speed signals side.
Figure 21:
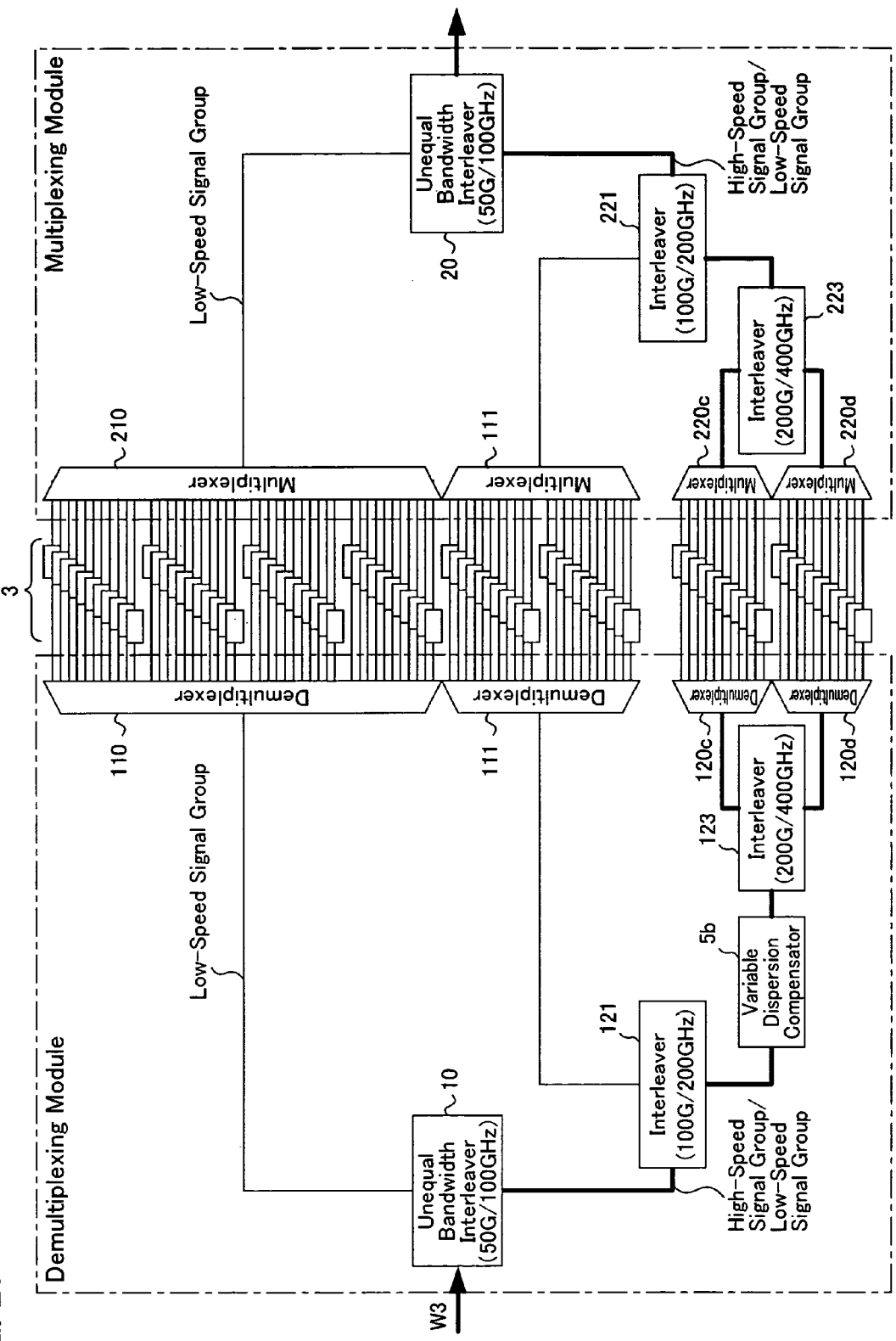
FIG. 21 is a block diagram depicting an optical transmission node according to the ninth embodiment of the present invention where a variable dispersion compensator is applied at the high-speed signals side.
Figure 22:
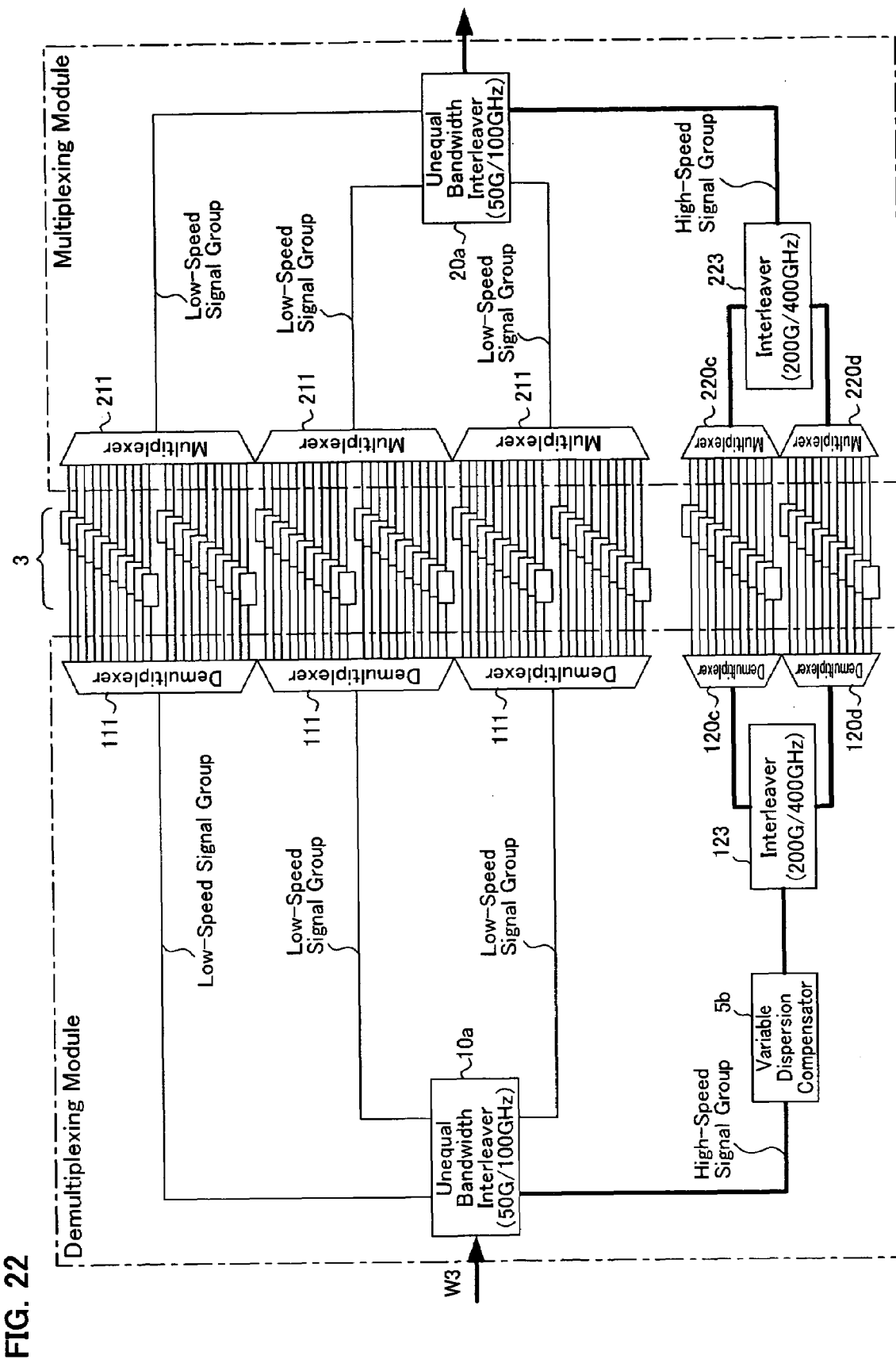
FIG. 22 is a block diagram depicting an optical transmission node according to the ninth embodiment of the present invention where a variable dispersion compensator is applied at the high-speed signals side.

As a comparison with FIG. 1 clearly shows, the only difference in FIG. 18 is that the variable dispersion compensator 5 is disposed at the high-speed signal side, the rest is the same as FIG. 1. As a comparison with FIG. 1 clearly shows, the only difference in FIG. 19 is that the variable dispersion compensators 5a and 5b are disposed at the high-speed signal side, and the rest is the same as FIG. 1. As a comparison with FIG. 5 clearly shows, the only difference in FIG. 20 is that the variable dispersion compensators 5a and 5b are disposed at the high-speed signal side, and the rest is the same as FIG. 5. As a comparison with FIG. 11 clearly shows, the only difference in FIG. 21 is that the variable dispersion compensator 5b is disposed at the high-speed signal side, and the rest is the same as FIG. 11. As a comparison with FIG. 13 clearly shows, the only difference in FIG. 22 is that the variable dispersion compensator 5b is disposed at the high-speed side, and the rest is the same as FIG. 13. Therefore description on these same portions in FIG. 18 to FIG. 22 will be omitted.

As FIG. 18 shows, in the present embodiment, the WDM signals W0 are demultiplexed into the low-speed signal group W1 and the high-speed signal group W2 by the unequal bandwidth interleaver 10, then the high-speed signal group W2 is input to the variable dispersion compensator 5. The variable dispersion compensator 5 compensates the dispersion of the high-speed signal group W2 in batch. The high-speed signal group W2, after dispersion compensation, is demultiplexed by the interleaver 121, and then sent to the multiplexing unit 2.

By using the configuration in FIG. 18, the variable dispersion compensator can be applied only for 40 Gbit/s signals, so a 10 Gbit/s and 40 Gbit/s mixed transmission system can be implemented keeping cost down.

In FIG. 19, the high-speed signal group W2 is demultiplexed into the odd channel and the even channel by the interleaver 121, then dispersion is compensated by the variable dispersion compensators 5a and 5b respectively. By this configuration as well, a function effect similar to that of the configuration of FIG. 18 can be implemented. With this configuration, more variable dispersion compensators are required than FIG. 18, but the variable dispersion compensators 5a and 5b can have a larger frequency interval than the variable dispersion compensator 5, so the manufacturing cost can be decreased accordingly.

In FIG. 20 to FIG. 22 as well, the variable dispersion compensator is applied only for 40 Gbit/s signals, just like FIG. 18 and FIG. 19, therefore a 10 Gbit/s and 40 Gbit/s mixed transmission system can be implemented keeping cost down.

For the configuration in FIG. 14 to FIG. 17 as well, a variable dispersion compensator can be applied for the high-speed signal side, although that illustration is omitted.

Embodiment 10

In the above embodiments, a general relay node was described, but a compensation node will be described in the tenth embodiment. FIG. 23 to FIG. 27 are block diagrams depicting the configuration of the compensation node according to the tenth embodiment of the present invention.

Figure 23:
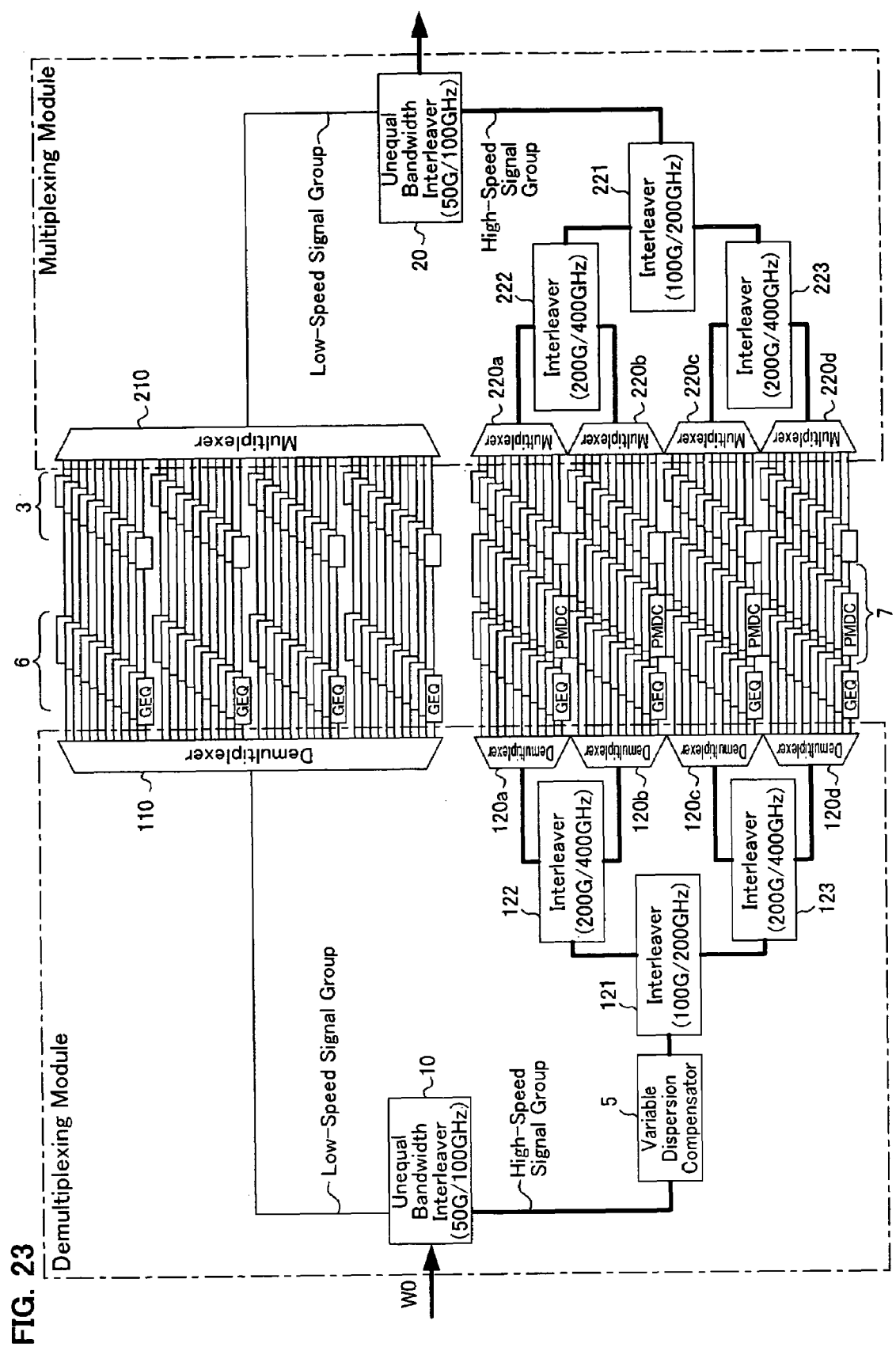
FIG. 23 is a block diagram depicting a compensation node according to the tenth embodiment of the present invention.
Figure 24:
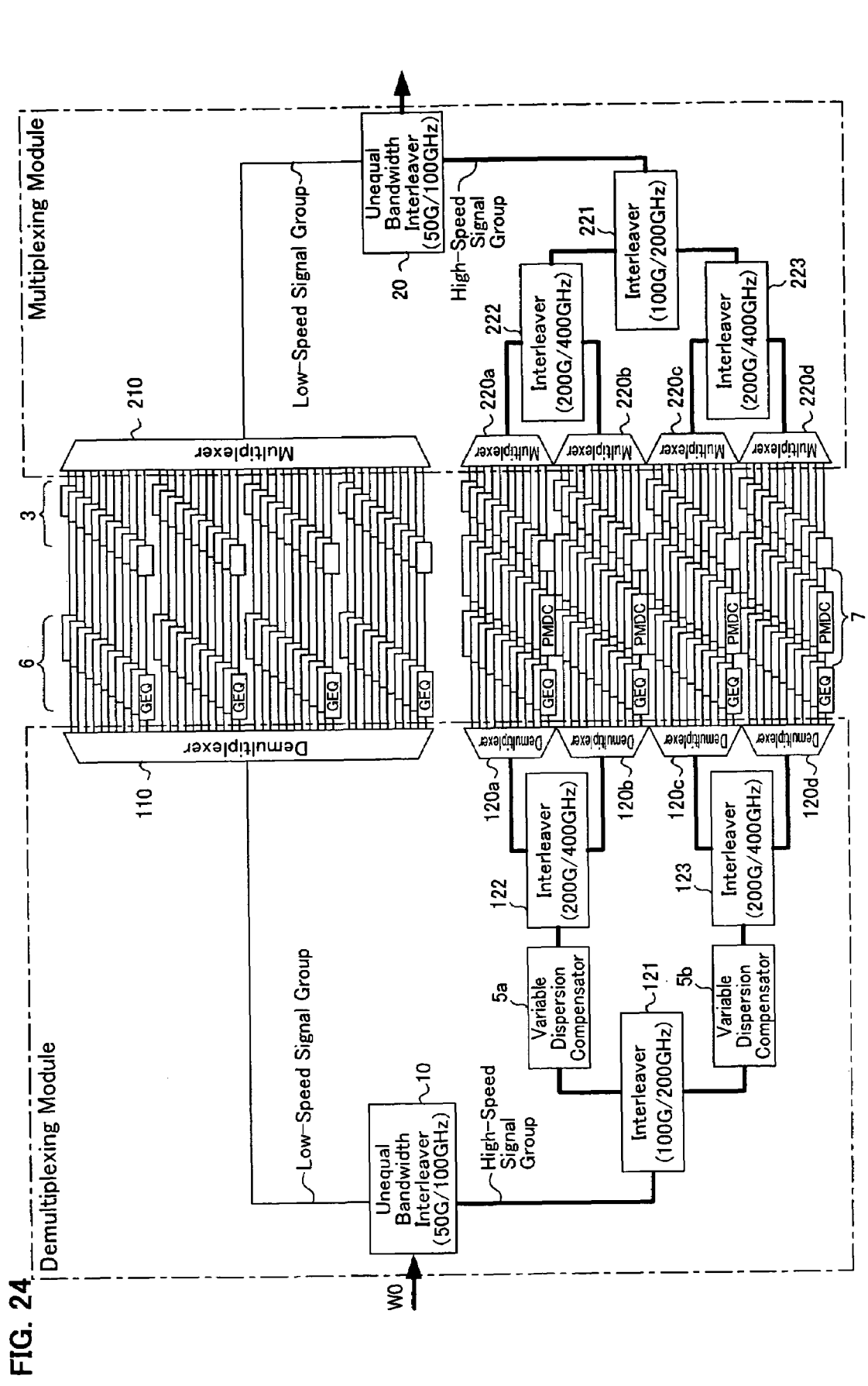
FIG. 24 is a block diagram depicting a compensation node according to the tenth embodiment of the present invention.
Figure 25:
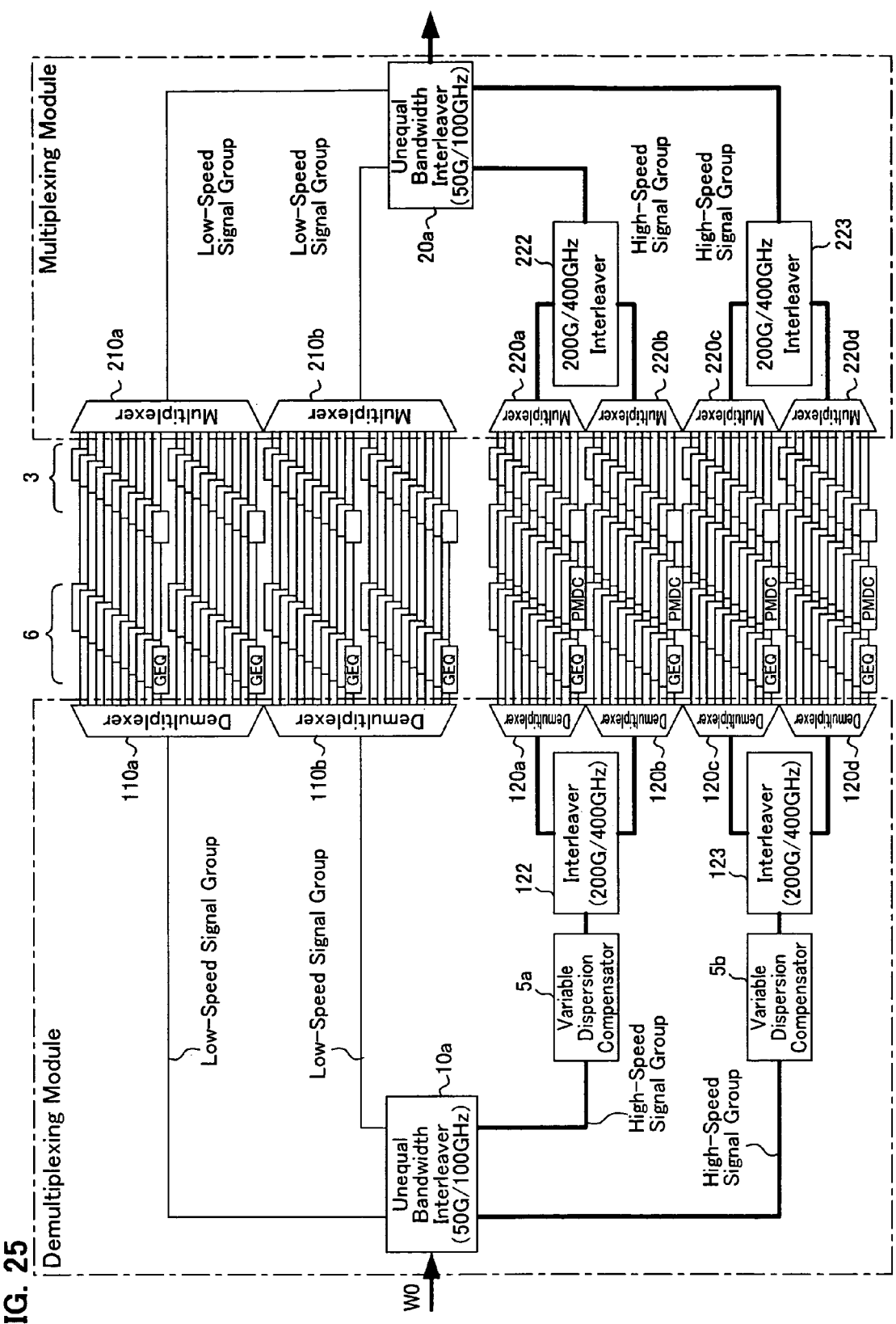
FIG. 25 is a block diagram depicting a compensation node according to the tenth embodiment of the present invention.
Figure 26:
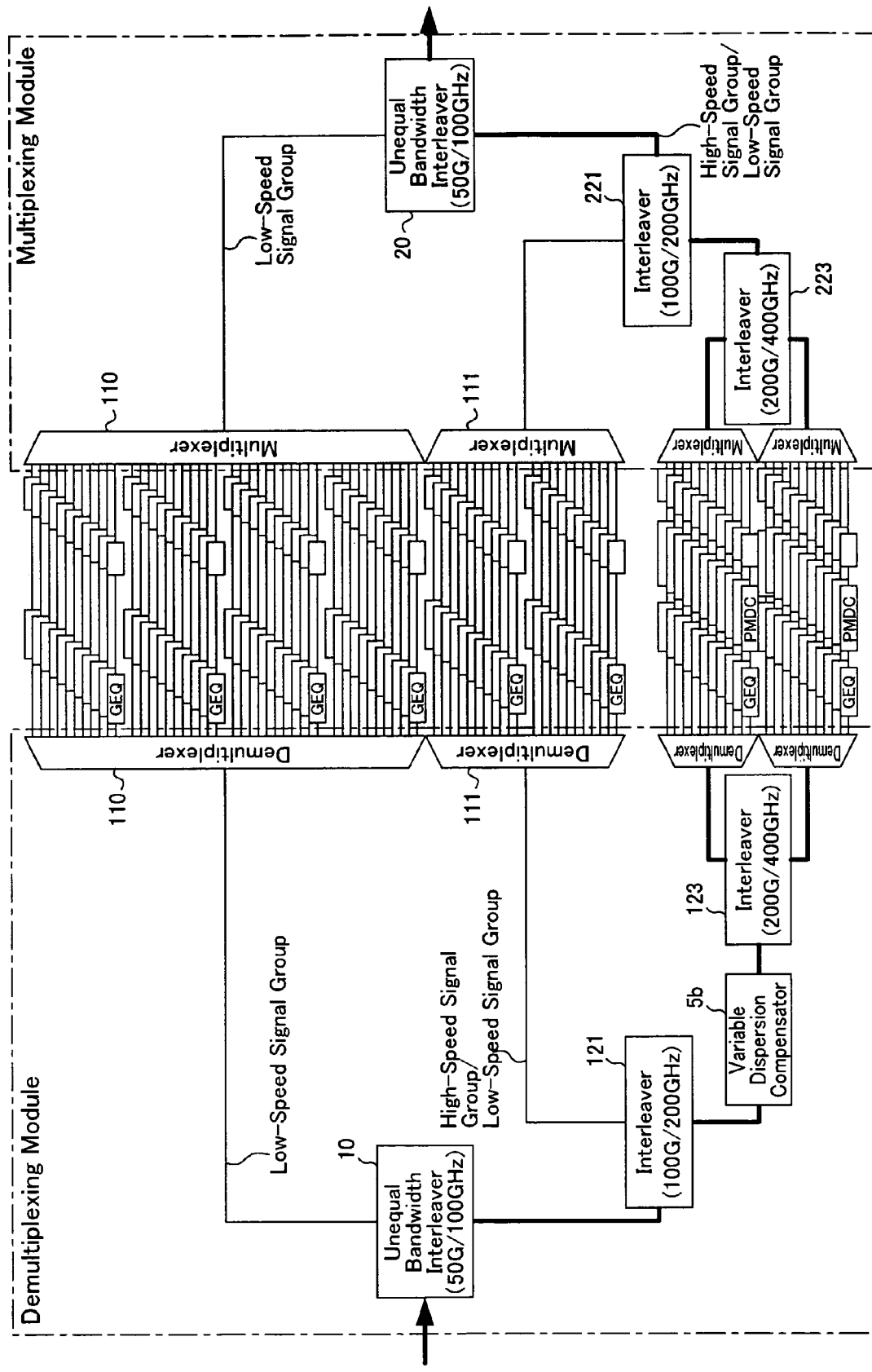
FIG. 26 is a block diagram depicting a compensation node according to the tenth embodiment of the present invention.
Figure 27:
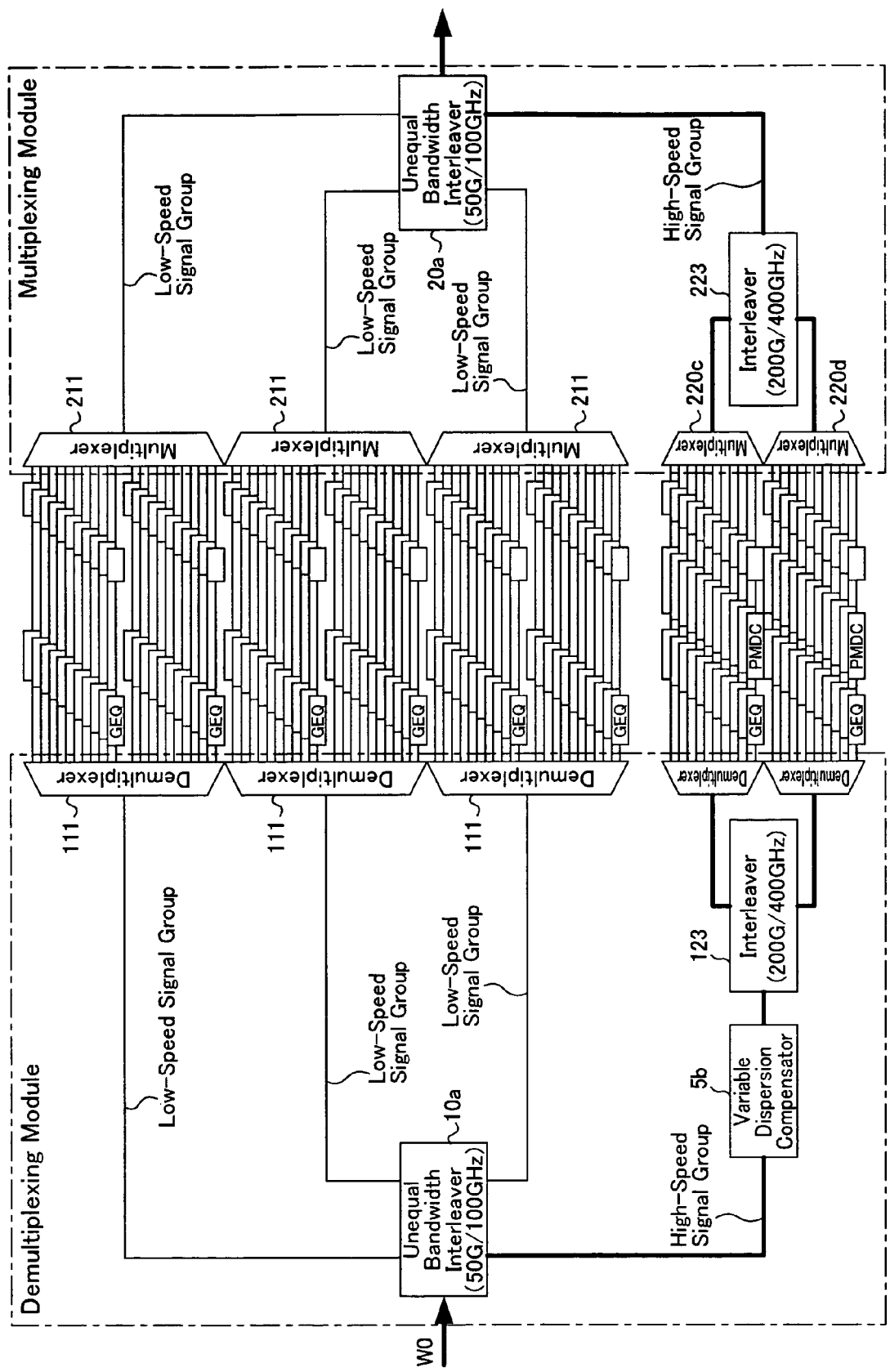
FIG. 27 is a block diagram depicting a compensation node according to the tenth embodiment of the present invention.

FIG. 23 corresponds to FIG. 18 in the ninth embodiment, and FIG. 24 to FIG. 27 correspond to FIG. 19 to FIG. 22 in the ninth embodiment respectively. Therefore the same composing elements in the corresponding drawings are denoted with the same reference symbols, for which description is omitted.

In FIG. 23 to FIG. 27, the reference number 6 indicates a gain equalizer (GEQ), which is disposed for low-speed signals with each wavelength (each channel), and high-speed signals with each wavelength (each channel). The reference number 7 indicates a polarization mode dispersion compensator (PMDC), which is disposed only for 40 Gbit/s signals in the present embodiment. The PMDC 7 must be disposed for each wavelength (each channel), so the PMDC 7 is applied to the high-speed signals demultiplexed into each wavelength by the demultiplexer, between the demultiplexing module and the multiplexing module.

According to the present embodiment, the variable dispersion compensator and the polarization mode dispersion compensator are applied only for 40 Gbit/s signals, so a 10 Gbit/s and 40 Gbit/s mixed transmission system can be implemented keeping cost down.

The variable dispersion compensator may be omitted. For the GEQ 6 as well, a device for high-speed signals may be used for 40 Gbit/s signals and a device for low-speed signals for 10 Gbit/s signals may be used. By this, a device appropriate for the respective bit rate can be used, which contributes to keeping cost down.

Embodiment 11

The eleventh embodiment is same as the ninth embodiment, wherein the variable dispersion compensator is also disposed at the low-speed signal side.

The dispersion tolerance of 10 Gbit/s signals is larger than that of 40 Gbit/s signals, but in the case of long distance transmission, 10 Gbit/s signals may be influenced by irregularities in the manufacture of transmission fibers and the dispersion compensation fibers, and/or temperature change. Therefore in some cases, a variable dispersion compensator is required for 10 Gbit/s signals as well. However, the characteristics to be required for a variable dispersion compensator for low-speed signals are less strict than those required for high-speed signals, so an inexpensive variable dispersion compensator can be used by decreasing the wavelength interval, or if the wavelength interval is the same as that of the high-speed signals, a more inexpensive variable dispersion compensator than that used for high-speed signals can be used.

Figure 28:
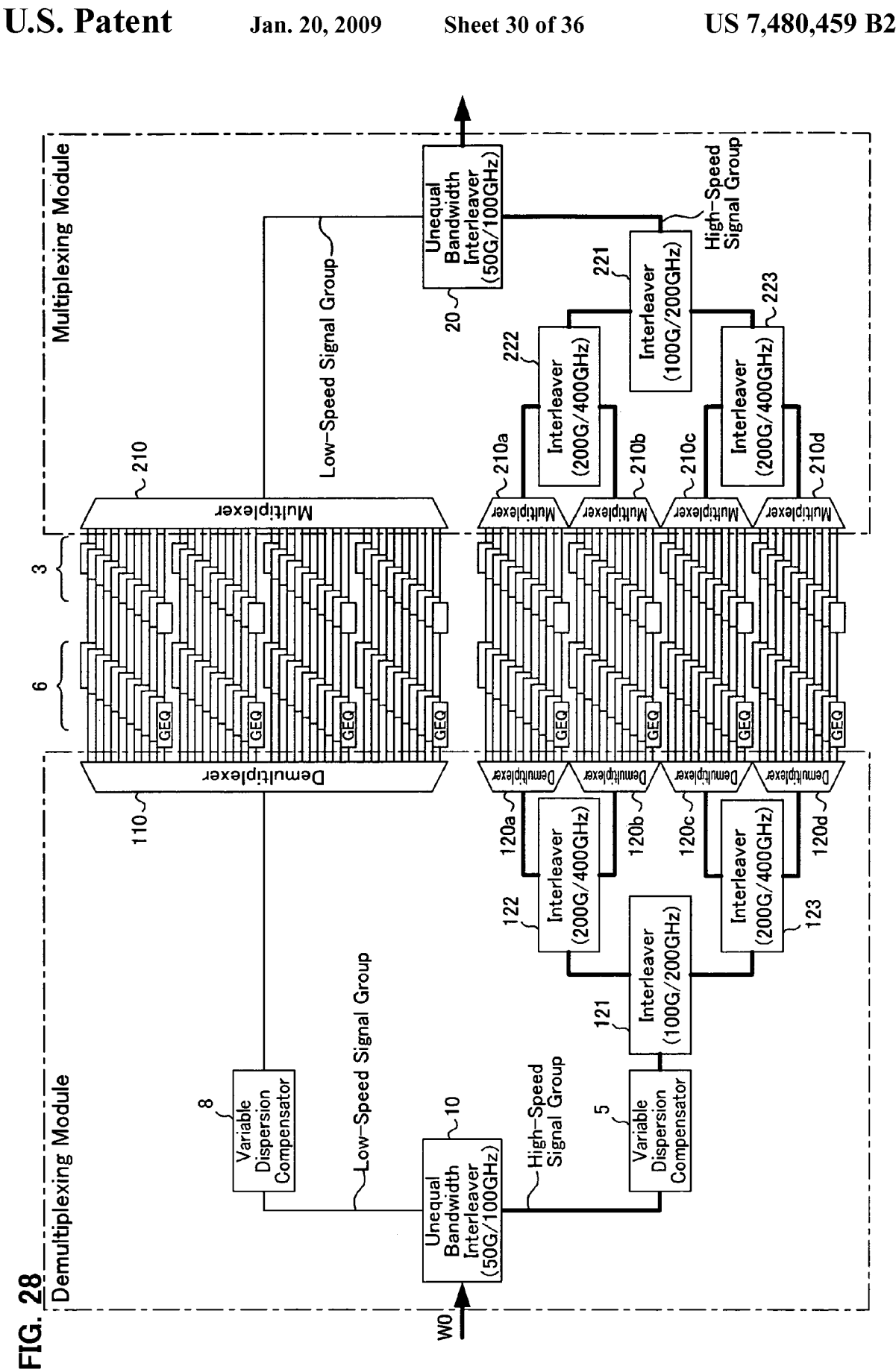
FIG. 28 is a block diagram depicting the configuration of an optical transmission node according to the eleventh embodiment of the present invention.
Figure 29:
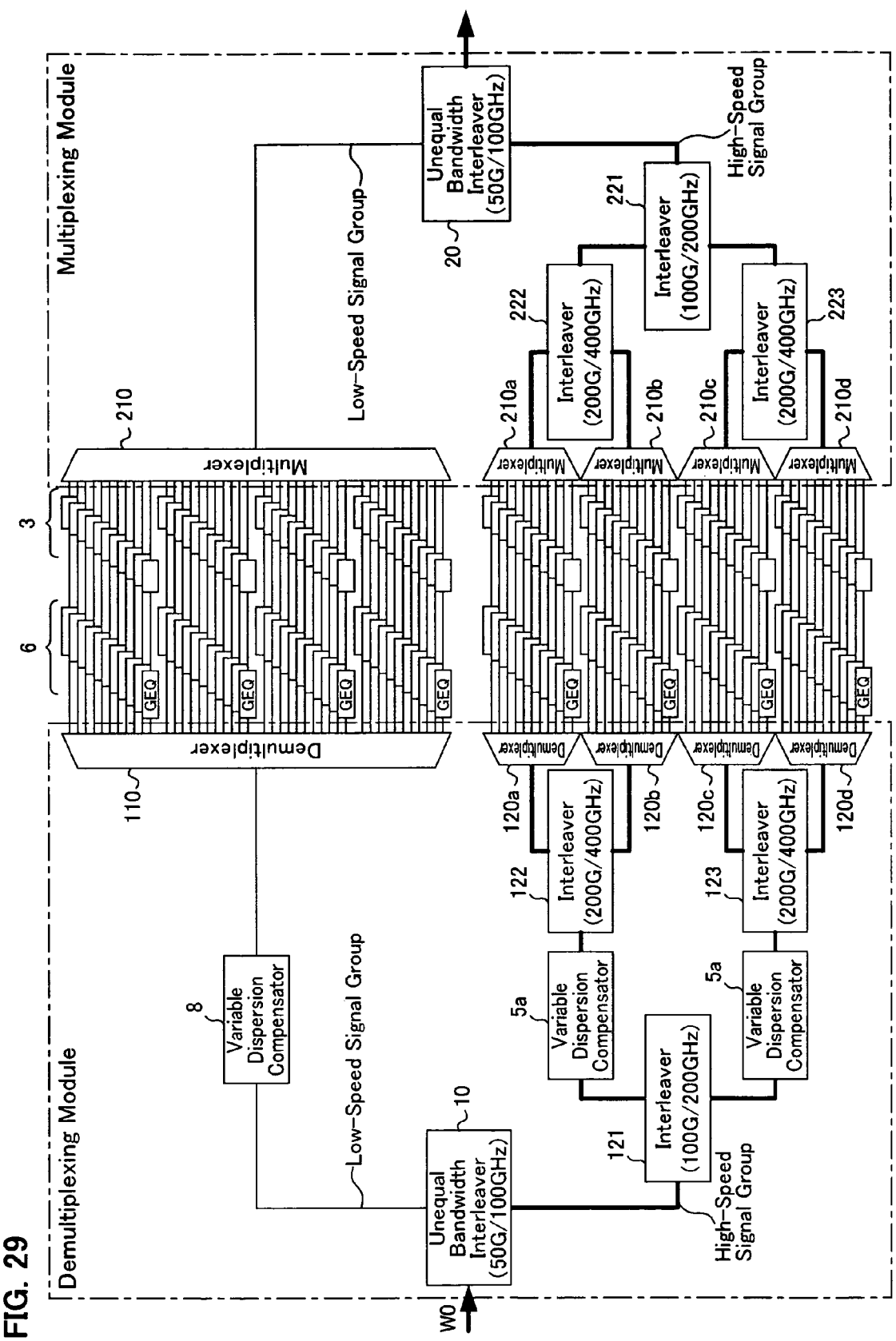
FIG. 29 is a block diagram depicting the configuration of an optical transmission node according to the eleventh embodiment of the present invention.
Figure 30:
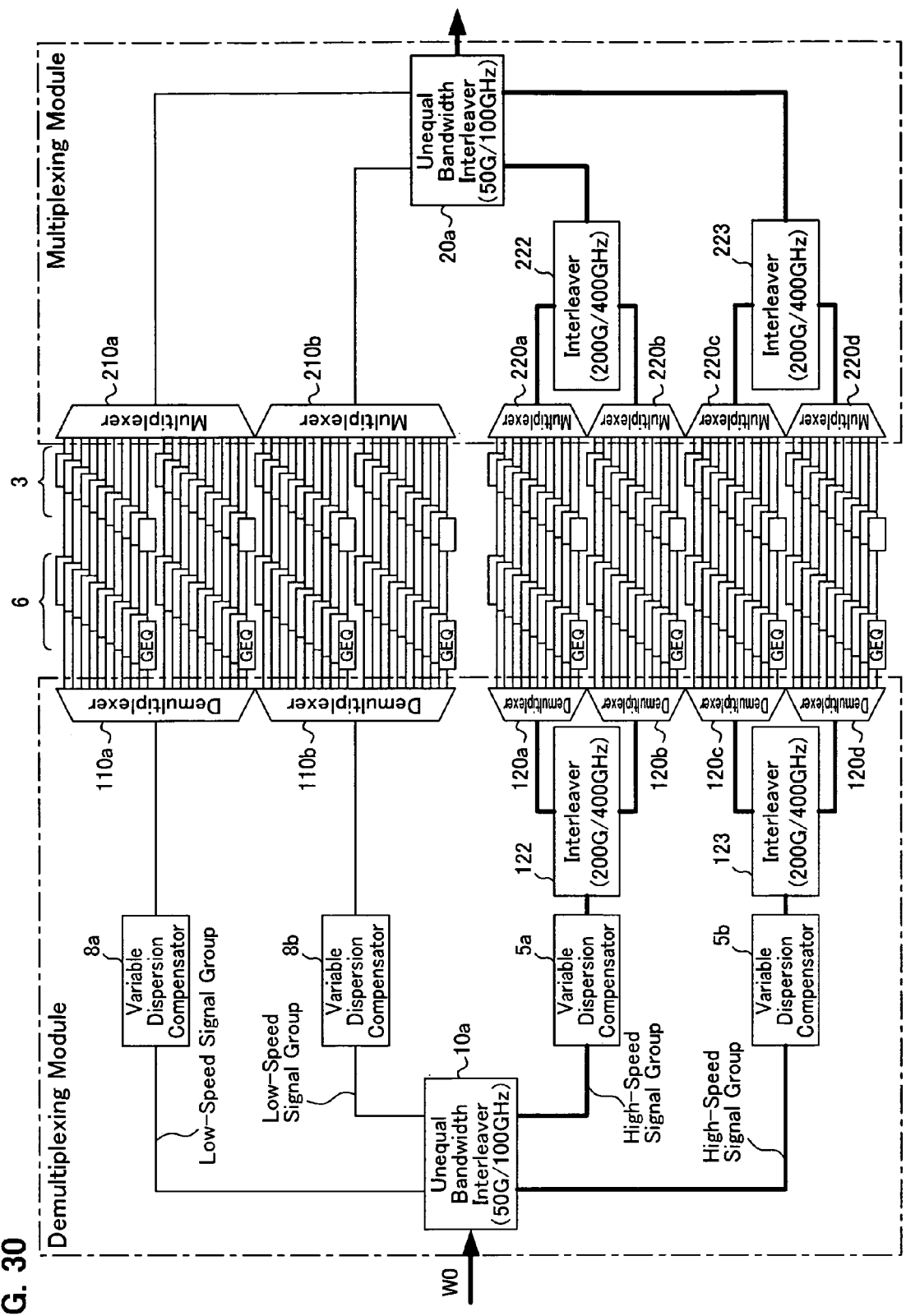
FIG. 30 is a block diagram depicting the configuration of an optical transmission node according to the eleventh embodiment of the present invention.

FIG. 28 to FIG. 30 are block diagrams depicting the configuration of the optical transmission node according to the eleventh embodiment of the present invention. In FIG. 28, the variable dispersion compensator 8 is disposed at the low-speed signal side in FIG. 18. In FIG. 29, the variable dispersion compensator 8 is disposed at the low-speed signal side in FIG. 19. In FIG. 30, the variable dispersion compensators 8a and 8b are disposed at the low-speed signal side in FIG. 20.

The variable dispersion compensator may be disposed at the low-speed signal side in FIG. 21 to FIG. 23 as well.

By the present embodiment, a 10 Gbit/s and 40 Gbit/s mixed optical transmission system, keeping cost down, while selecting the optimum dispersion compensation for both 10 Gbit/s signals and 40 Gbit/s signals, can be implemented.

In FIG. 28 to FIG. 30, the GEQ 6 is disposed, but GEQ 6 may be omitted.

Embodiment 12

In the twelfth embodiment, the PMDC for compensating the polarization mode dispersion is disposed at the low-speed signal side as well.

Compensating the polarization mode dispersion is not overly necessary if the transmission distance of 10 Gbit/s signals is short, but in order to transmit 10 Gbit/s signals for a long distance, PMDC is required to compensate the polarization mode dispersion. However, the characteristics required for PMDC for 10 Gbit/s signals are not strict compared with those for 40 Gbit/s signals, so the PMDC is less expensive than one for 40 Gbit/s.

Figure 31:
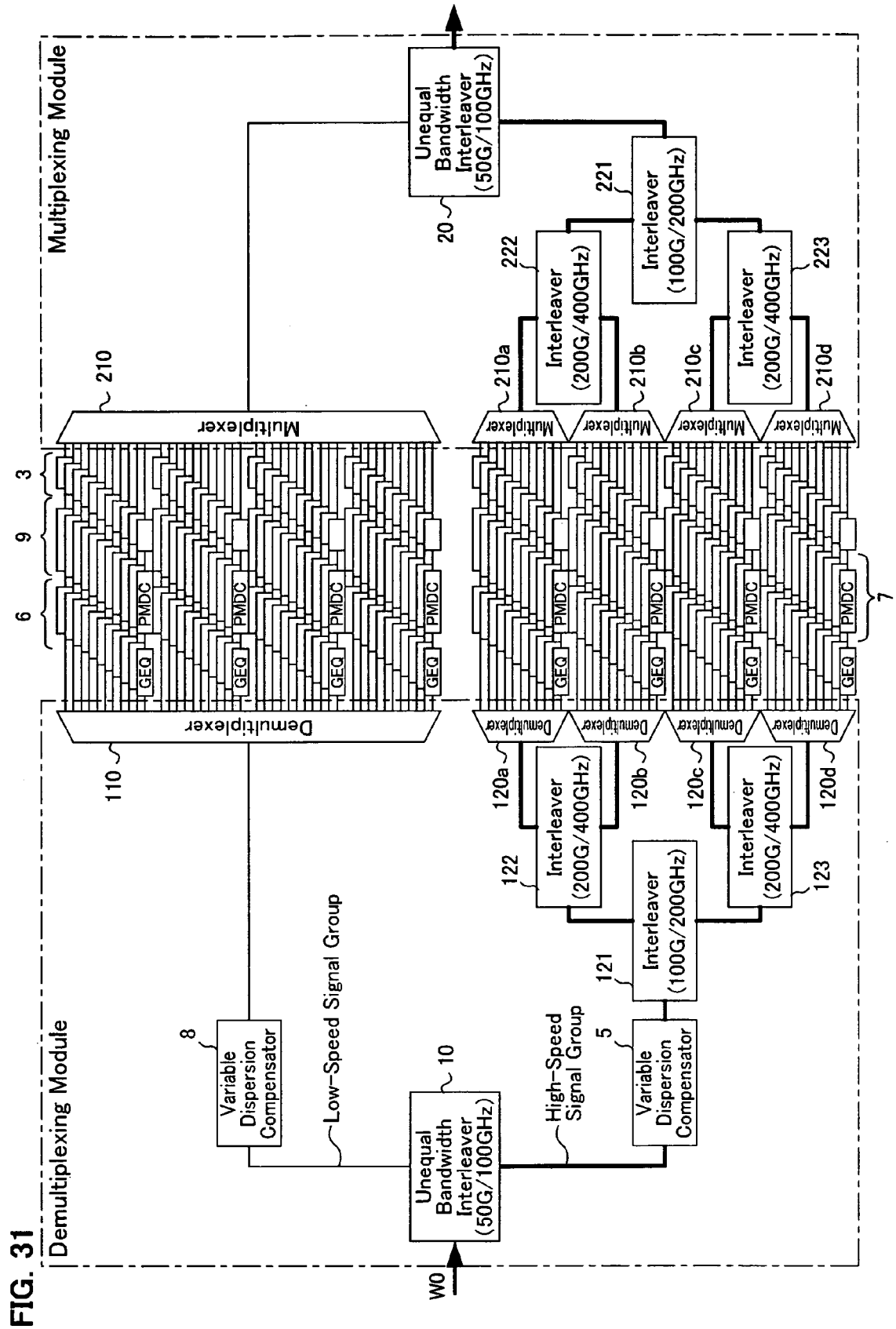
FIG. 31 is a block diagram depicting the configuration of an optical transmission node according to the twelfth embodiment of the present invention.
Figure 32:
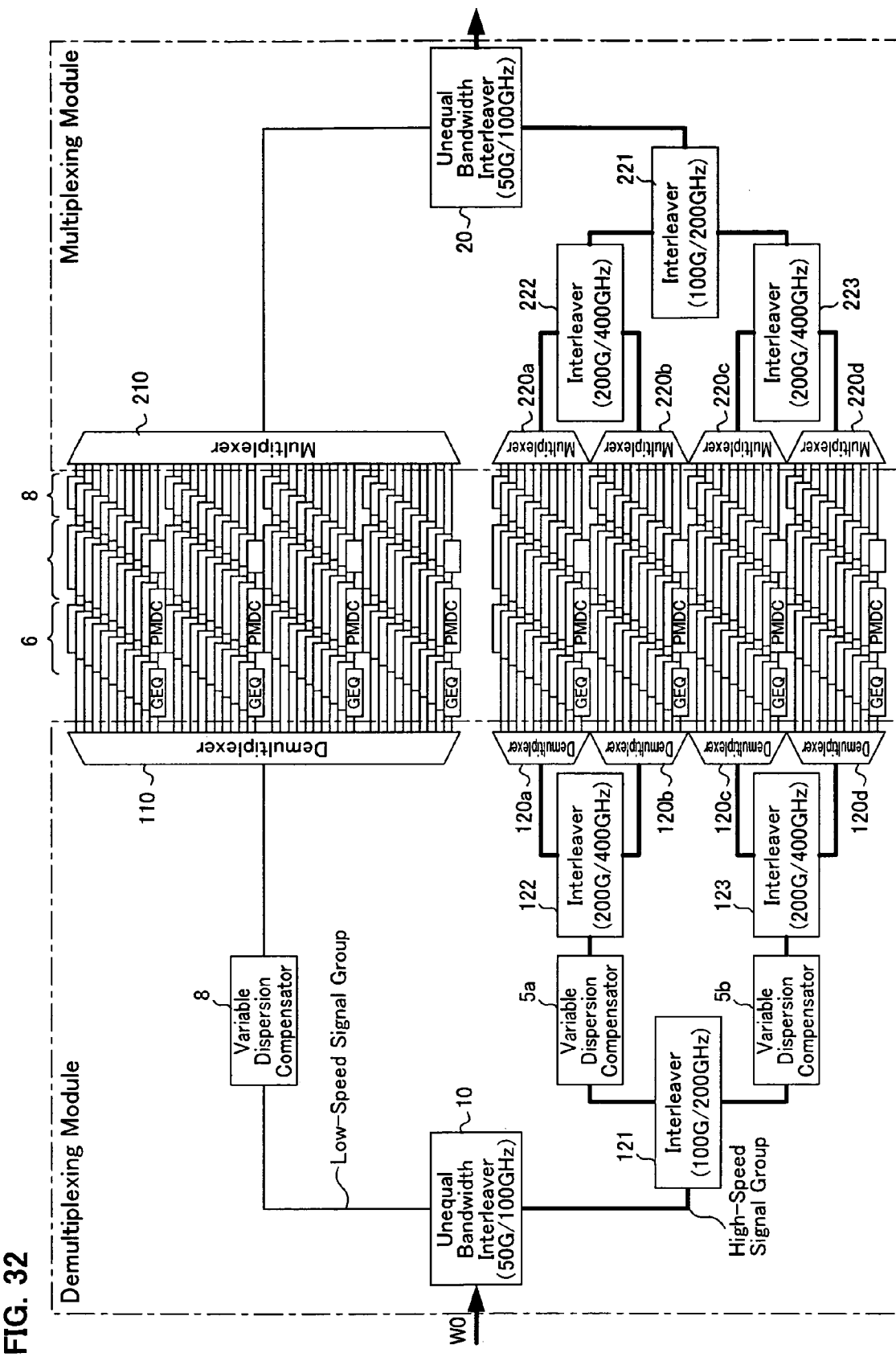
FIG. 32 is a block diagram depicting the configuration of an optical transmission node according to the twelfth embodiment of the present invention.
Figure 33:
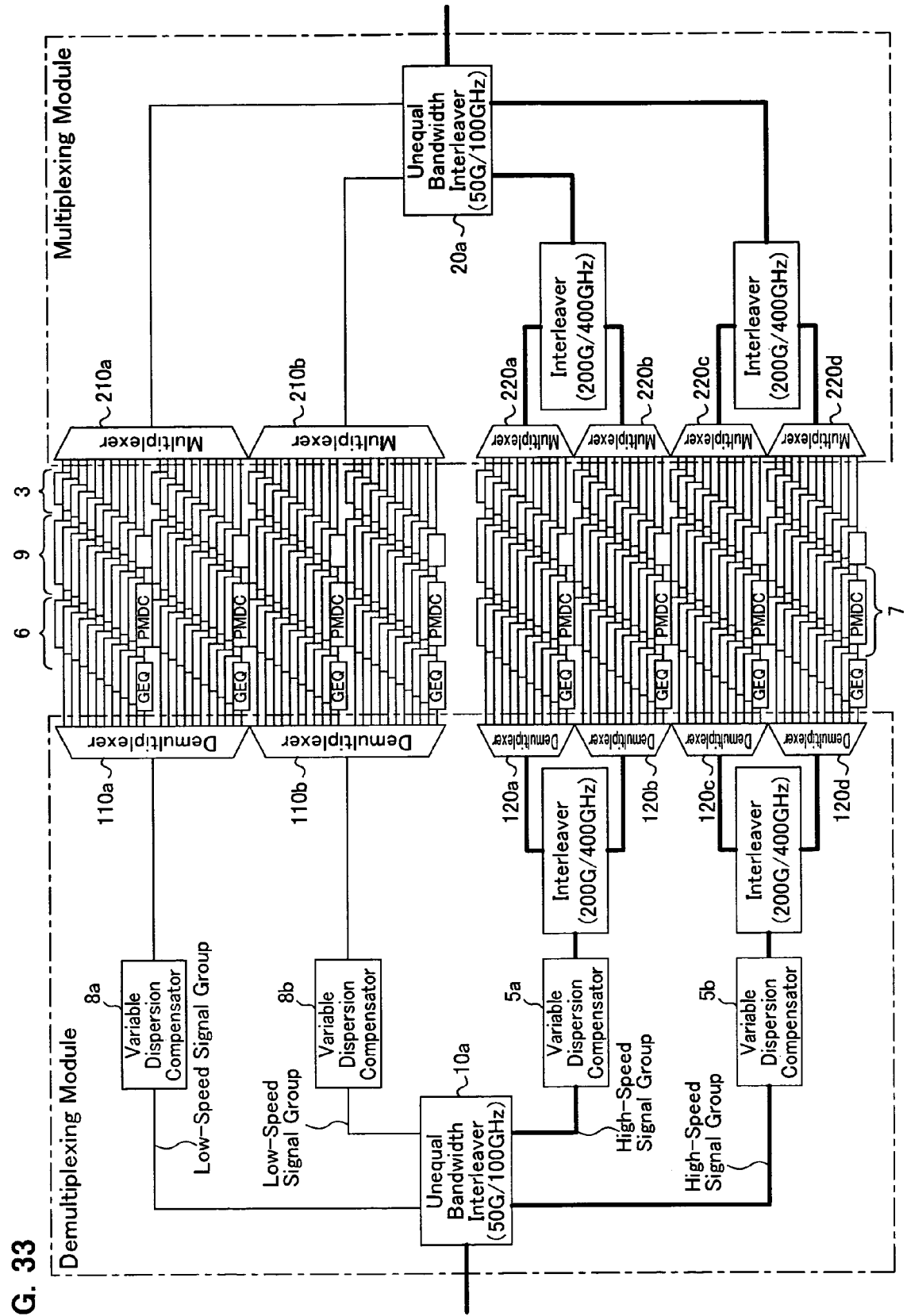
FIG. 33 is a block diagram depicting the configuration of an optical transmission node according to the twelfth embodiment of the present invention.
Figure 34B:
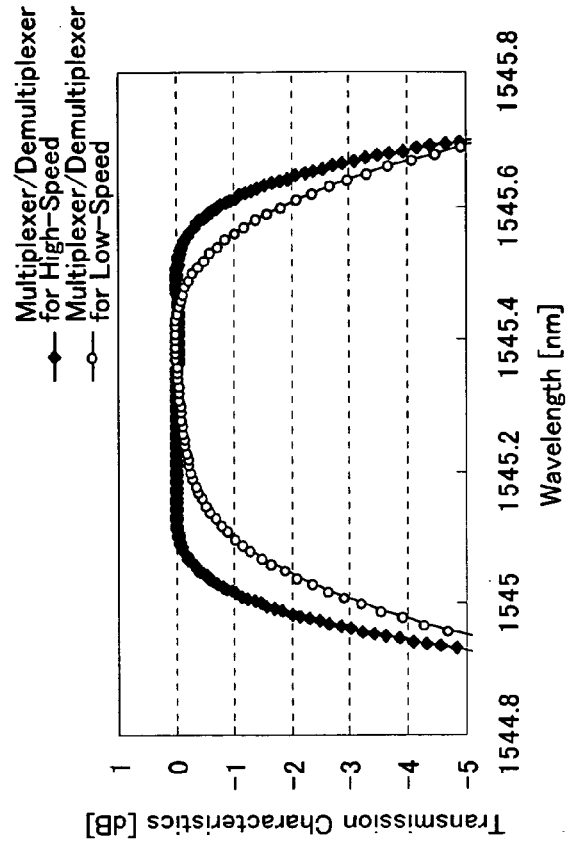
FIG. 34B is a graph depicting the Q factor deterioration with respect to the shift of the central wavelength of an optical multiplexer/demultiplexer for high-speed and the optical multiplexer/demultiplexer for low-speed.
Figure 34A:
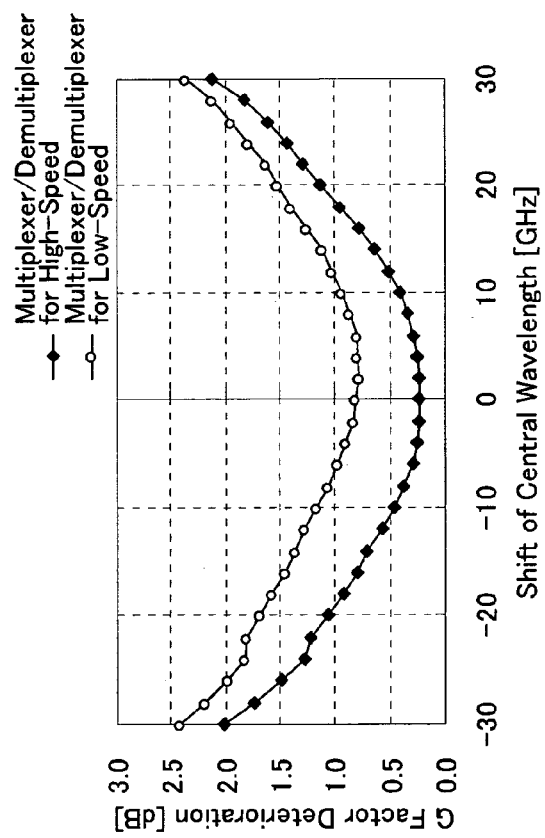
FIG. 34A is a graph depicting the transmission characteristics of an optical multiplexer/demultiplexer for high-speed and an optical multiplexer/demultiplexer for low-speed.

FIG. 31 to FIG. 33 are block diagrams depicting the configuration of the optical transmission node according to the twelfth embodiment of the present invention. In FIG. 31, a variable dispersion compensator 8 and a PMDC 9 are disposed at the low-speed signal side in FIG. 23. In FIG. 32, a variable dispersion compensator 8 and a PMDC 9 are disposed at the low-speed signal side in FIG. 24, and in FIG. 33, variable dispersion compensators 8a and 8b and a PMDC 9 are disposed at the low-speed signal side in FIG. 25. In FIG. 31 to FIG. 33, the variable dispersion compensators 8 or 8a and 8b can be omitted.

According to the present embodiment as well, a PMDC (and variable dispersion compensator) for low-speed signals, which has relatively low specifications and are inexpensive, can be used for the low-speed signal group, and a PMDC (and variable dispersion compensator) for high-speed signals, which has relatively high specifications, can be used for the high-speed signal group. By this, a 10 Gbit/s and 40 Gbit/s mixed transmission system can be implemented keeping cost down, while selecting the optimum dispersion compensation and the polarization mode dispersion compensation for both 10 Gbit/s and 40 Gbit/s.

In the embodiments described thus far, two signal lights, 10 Gbit/s and 40 Gbit/s, were used for description, but the present invention is not limited to these bit rates, and can be applied to other bit rates.

In addition to bit rates, the spectrum widths of signal lights with each wavelength are different when the modulation system (e.g. RZ, NRZ, CSRZ) is different, so in this case as well, the present invention can be applied by alternately allocating signals with a small spectrum width and signals with a large spectrum width to an even channel and odd channel.

The above variable dispersion compensator may be a fixed dispersion compensator or a variable or fixed dispersion slope compensator.

The present invention can be applied to WDM transmission systems, in particular to a transmission terminal, relay node, reception terminal and compensation node of the WDM transmission system.

The present invention can provide a wavelength division multiplexing transmission system where different bit rate signal lights are mixed, while keeping a cost increase down, caused by high function devices. Also the present invention can provide a wavelength division multiplexing transmission system where different bit rate signal lights are mixed, while keeping a cost increase down, caused by high function devices and various compensation devices. Also the present invention can provide a wavelength division multiplexing transmission system where different bit rate signal lights are mixed, to which wavelength and polarization mode dispersion compensation methods, optimized for the respective bit rate, can be applied.

What is claimed is:

1. A wavelength division multiplexing transmission system for transmitting wavelength division multiplexing signals comprising: at least one of a demultiplexing module unit and a multiplexing module unit, said demultiplexing module unit further comprises:

a first interleave filter unit demultiplexing said wavelength division multiplexing signal into a signal light of a first channel group, that is one of an even channel group and an odd channel group and a signal light of a second channel group, that is the other thereof, and outputting the demultiplexed signal lights, wherein a first signal light of which the signal bandwidth is relatively large can be allocated to each channel of said first channel group, and a second signal light of which the signal bandwidth is relatively small is allocated to each channel of said second channel group;

a first demultiplexing unit demultiplexing the signal light of said first channel group from said first interleave filter unit and outputting these signal lights, and said multiplexing module unit further comprises:

a first multiplexing unit multiplexing a plurality of said first signal lights or said second signal lights that are input, into a signal light of said first channel group and outputting the signal, and a second interleave filter unit inputting a signal light of said first channel group from said first multiplexing unit, and a signal light where a plurality of said second signal lights are disposed in said second channel group, multiplexing these two input signal lights to generate said wavelength division multiplexed signal, and outputting the multiplexed signal, wherein the first interleave filter unit includes a first port for outputting a signal light of the first channel group and a second port for outputting a signal light of the second channel group, and the first and second ports are set such that the bandwidth of a transmission band where light transmits and the bandwidth of a non-transmission band where light does not transmit are different, the transmission band of the first port substantially matches with the signal band of the first signal light and the transmission band of the second port substantially matches with the signal band of the second signal light, and wherein said first signal light is disposed in each channel constituting said first channel group, and said first demultiplexing unit further comprises:

a first interleaver demultiplexing the signal lights of said first channel group from said first port of said first interleave filter unit into a signal light of an even channel group constituting said first channel group and a signal light of an odd channel group constituting said first channel group and outputting the signal lights;

a second interleaver demultiplexing the signal light of said even channel group from said first interleaver into a signal light of an even channel group and a signal light of an odd channel group and outputting the signal lights;

a third interleaver demultiplexing the signal light of said odd channel group from said first interleaver into a signal light of an even channel group and a signal light of an odd channel group and outputting the signal lights; and four demultiplexers demultiplexing the signal lights of an even channel group and an odd channel group from said second interleaver and the signal lights of an even channel group and an odd channel group from said third interleaver into signal lights with each wavelength, respectively.

2. The wavelength division multiplexing transmission system according to claim 1, wherein said demultiplexing module unit further comprises a second demultiplexing unit demultiplexing the signal lights of said second channel group from said first interleave filter unit into signal lights with each wavelength and outputting the signal lights.

3. The wavelength division multiplexing transmission system according to claim 1, wherein said multiplexing module unit further comprises a second multiplexing unit for multiplexing a plurality of a said second signal lights that are input, and generating and outputting the signal light in said second channel.

4. The wavelength division multiplexing transmission system according to claim 1, wherein said first signal light is disposed in each channel constituting said first channel group, and said demultiplexing module unit further comprises a variable or fixed dispersion compensator or a variable or fixed dispersion slope compensator between said first port of said first interleave filter unit and said first demultiplexing unit.

5. The wavelength division multiplexing transmission system according to claim 1, wherein said demultiplexing module unit further comprises a variable or fixed dispersion compensator or a variable or fixed dispersion slope compensator between said first interleaver and said second interleaver, and between said first interleaver and said third interleaver, respectively.

6. The wavelength division multiplexing transmission system according to claim 1, wherein a first signal light is disposed in one of the even channel group and the odd channel group constituting said first channel group, and a second signal light is disposed in the other thereof, and said first demultiplexing unit further comprises:

a first interleaver demultiplexing the signal light in said first channel group from the first port of said first interleave filter unit into a signal light of an even channel group of said first channel group and a signal light of said odd channel group of said first channel group;

a second interleaver further demultiplexing the signal light in the channel group in which said first signal light is disposed out of said even channel group or said odd channel group from said first interleaver into a signal light of an even channel group and a signal light of an odd channel group and outputting the signal lights; and two demultiplexers demultiplexing the signal lights of an even channel group and an odd channel group from said second interleaver into signal lights with each wavelength, respectively.

7. The wavelength division multiplexing transmission system according to claim 6, wherein said demultiplexing module unit further comprises a demultiplexer demultiplexing signal lights of a channel group where said second signal light is disposed, out of said even channel group or odd channel group from said first interleavers, into signal lights with each wavelength.

8. The wavelength division multiplexing transmission system according to claim 6, wherein said demultiplexing module unit further comprises a variable or fixed dispersion compensator or a variable or fixed dispersion slope compensator between said first interleaver and said second interleaver.

9. The wavelength division multiplexing transmission system according to claim 1, wherein said second interleave filter unit further comprises a first port for inputting a signal light of said first channel group and a second port for inputting a signal light of said second channel group, and said first port and said second port are set such that the bandwidth of a transmission band where light transmits and the bandwidth of a non-transmission band where light does not transmit are different, the transmission band of said first port substantially matches with the signal band of said first signal light and the transmission band of said second port substantially matches with the signal band of said second signal light.

10. The wavelength division multiplexing transmission system according to claim 9, wherein said first signal light is disposed in each channel constituting said first channel group, and said first multiplexing unit further comprises:

a fourth interleaver inputting a signal light of an even channel group constituting said first channel group and a signal light of an odd channel group constituting said first channel group, multiplexing both of these signal lights to generate a signal light in said first channel group and outputting the signal light to said first port of said interleave filter unit;

a fifth interleaver inputting a signal light of an even channel group and a signal light of an odd channel group which further constitute the even channel group of said first channel group, multiplexing both of these signal lights to generate a signal light of the even channel group of said first channel group, and outputting the signal light to said fourth interleaver;

a sixth interleaver inputting a signal light of an even channel group and a signal light of an odd channel group which further constitute the odd channel group of said first channel group, multiplexing both of these signal lights to generate a signal light of the odd channel group of said first channel group, and outputting the signal light to said fourth interleaver;

two multiplexers multiplexing a plurality of first signal lights and generating signal lights of the even channel group and odd channel group to be input to said fifth interleaver by multiplexing respectively; and two multiplexers multiplexing a plurality of first signal lights and generating signal lights of the even channel group and odd channel group to be input to said sixth interleaver by multiplexing respectively.

11. The wavelength division multiplexing transmission system according to claim 1, wherein a first signal light is disposed in one of the even channel group and odd channel group constituting said first channel group and a second signal light is disposed in the other thereof, and said first multiplexing unit further comprises:

a fourth interleaver inputting a signal light of said even channel group and a signal light of said odd channel of said first channel group, multiplexing both of these signal lights and generating a signal light of said first channel group, and outputting the signal light to said first port of said first interleave filter unit;

a fifth interleaver inputting a signal light of an even channel group and a signal light of an odd channel group which further constitute a channel group where said first signal light is disposed, out of said even channel group and said odd channel group of said first channel group, multiplexing both of these signal lights, and outputting the signal light to said fourth interleaver; and two multiplexers multiplexing a plurality of the first signal lights and generating signal lights of said even channel group and odd channel group to be input to said fifth interleaver respectively.

12. The wavelength division multiplexing transmission system according to claim 11, wherein said multiplexing module unit further comprises a multiplexer multiplexing a plurality of the second signal lights, generating a signal light of a channel group where said second signal light is disposed, out of said even channel group and odd channel group of said first channel group, and outputting the signal light to said fourth interleaver.

13. The wavelength division multiplexing transmission system according to claim 1, wherein said demultiplexing module unit further comprises a variable or fixed dispersion compensator or a variable or fixed dispersion slope compensator at the output side of the signal light of said second channel group of said first interleave filter unit.

14. The wavelength division multiplexing transmission system according to claim 1, wherein
said first interleave filter unit further comprises:
a first port for outputting a signal light of an even channel group of said first channel group;
a second port for outputting a signal light of an odd channel group of said first channel group;
a third port for outputting a signal light of an even channel group of said second channel group; and
a fourth port for outputting a signal light in an odd channel group of said second channel group; and
said first port to fourth port are respectively set such that the bandwidth of the transmission band where light transmits and the non-transmission band where light does not transmit are different, and
the transmission band of said first port substantially matches with the signal band of said first signal light disposed in said even channel group of said first channel group, the transmission band of said second port substantially matches with the signal band of said first signal light disposed in said odd channel group of said first channel group, the transmission band of said third port substantially matches with the signal band of said second signal light disposed in the even channel group of said second channel group, and the transmission band of said fourth port substantially matches with the signal band of said second signal light disposed in the odd channel group of said second channel group.

15. The wavelength division multiplexing transmission system according to claim 14, wherein said demultiplexing module further comprises a variable or fixed dispersion compensator or a variable or fixed dispersion slope compensator connected to said third port and fourth port of said first interleave filter unit respectively.

16. The wavelength division multiplexing transmission system according to claim 14, wherein said first signal is disposed in each channel constituting said first channel group, and said demultiplexing module further comprises a variable or fixed dispersion compensator or a variable or fixed dispersion slope compensator between said first port and said first demultiplexing unit and between said second port and said first demultiplexing unit of said first interleave filter unit respectively.

17. The wavelength division multiplexing transmission system according to claim 14, wherein:

said first signal light is disposed in each channel constituting said first channel group, and
said first demultiplexing unit further comprises:
a first interleaver further demultiplexing the signal light from said first port of said first interleave filter unit into a signal light of an even channel group and a signal light of an odd channel group, and outputting the signal lights;
a second interleaver further demultiplexing the signal light from said second port of said first interleave filter unit into a signal light of an even channel group and a signal light of an odd channel group, and outputting the signal lights; and
four demultiplexers demultiplexing the signal lights of the even channel group and odd channel group from said first interleaver and the signal lights of the even channel group and odd channel group from said second interleaver into signal lights with each wavelength respectively.

18. The wavelength division multiplexing transmission system according to claim 14, wherein:
a first signal light is disposed in one of the even channel group and odd channel group of said first channel group, and the second signal light is disposed in the other thereof, and
said first demultiplexing unit further comprises:
a first interleaver further demultiplexing a signal light from a port for outputting the signal light in the channel group where said first signal light is disposed, out of said first port or said second port of said first interleave filter unit, into a signal light of an even channel group and a signal light of an odd channel group, and outputting the signal lights; and
two demultiplexers demultiplexing the signal lights of said even channel group and said odd channel group from said first interleaver into signal lights with each wavelength respectively.

19. The wavelength division multiplexing transmission system according to claim 18, wherein said first demultiplexing unit further comprises a demultiplexer for demultiplexing a signal light from a port for outputting a signal light of a channel group where said second signal light is disposed, out of said first port or said second port of said first interleave filter unit into signal lights with each wavelength respectively.

20. The wavelength division multiplexing transmission system according to claim 18, wherein said multiplexing module unit further comprises a variable or fixed dispersion compensator or a variable or fixed dispersion slope compensator between said first interleave filter unit and said first interleaver.

21. The wavelength division multiplexing transmission system according to claim 1, wherein:
said second interleave filter unit further comprises a first port for inputting a signal light of an even channel group of said first channel group, a second port for inputting a signal light of an odd channel group of said first channel group, a third port for inputting a signal light of an even channel group of said second channel group, and a fourth port for inputting a signal light in an odd channel group of said second channel group, and
said first port to fourth port are respectively set such that the bandwidth of the transmission band where light transmits and the non-transmission band where light does not transmit are different, and
the transmission band of said first port substantially matches with the signal band of said first signal light disposed in said even channel group of said first channel group, the transmission band of said second port substantially matches with the signal band of said first signal light disposed in said odd channel group of said first channel group, the transmission band of said third port substantially matches with the signal band of said second signal light disposed in the even channel group of said second channel group, and the transmission band of said fourth port substantially matches with the signal band of said second signal light disposed in the odd channel group of said second channel group.

22. The wavelength division multiplexing transmission system according to claim 21, wherein:
said first signal light is disposed in each channel constituting said first channel group, and
said first multiplexing unit further comprises:
a fourth interleaver inputting a respective signal light of an even channel group and an odd channel group further constituting said even channel group of said first channel group, multiplexing both of these signal lights to generate a signal light of said even channel group of said first channel group, and outputting the signal light to said first port;
a fifth interleaver inputting a respective signal light of an even channel group and an odd channel group further constituting said odd channel group of said first channel group, multiplexing both of these signal lights to generate a signal light of said odd channel group of said first channel group, and outputting the signal light to said second port; and
four multiplexers generating a signal light of an even channel group further constituting said even channel group of said first channel group, a signal light of an odd channel group further constituting said even channel group of said first channel group, a signal light of an even channel group constituting said odd channel group of said first channel group, and a signal light of an odd channel group constituting said odd channel group of said first channel group respectively, by multiplexing a plurality of first signal lights with each wavelength.

23. The wavelength division multiplexing transmission system according to claim 21, further comprising:
a first multiplexer generating a signal light of an even channel group of said second channel group to be input to said third port of said second interleave filter unit by multiplexing a plurality of second signal lights and outputting the signal light to said third port; and
a second multiplexer generating a signal light of an odd channel group of said second channel group to be input to said fourth port of said second interleave filter unit by multiplexing a plurality of second signal lights, and outputting the signal light to said fourth port.

24. The wavelength division multiplexing transmission system according to claim 21, wherein:
a first signal light is disposed in one of an even channel group and odd channel group of said first channel group and a second signal light is disposed in the other thereof, and
said first multiplexing unit further comprises:
a fifth interleaver inputting a signal light of an even channel group and a signal light of an odd channel group which further constitute a channel group where said first signal light is disposed, out of said even channel group and said odd channel group of said first channel group, multiplexing both of these signal lights, and outputting the signal light to said second interleave filter unit; and
two multiplexers for multiplexing a plurality of first signal lights and generating signal lights of said even channel group and odd channel group to be input to said fifth interleaver respectively.

25. The wavelength division multiplexing transmission system according to claim 21, wherein:
a first signal light is disposed in one of an even channel group and odd channel group of said first channel group, and a second signal light is disposed in the other thereof, and
said multiplexing module further comprises a multiplexer for generating a signal light of the channel group where said first signal light is disposed, out of said even channel group and said odd channel group of said first channel group by multiplexing a plurality of second signal lights, and outputting the signal light to said second interleave filter unit.

26. The wavelength division multiplexing transmission system according to claim 21, wherein:
said demultiplexing module further comprises two multiplexers generating a signal light of an even channel of said second channel group to be input to said third port of said second interleave filter unit and a signal light of an odd channel group of said second channel group to be input to said fourth port by multiplexing a plurality of second signal lights respectively.

27. The wavelength division multiplexing transmission system according to claim 1, wherein:
said first signal light has a transmission bandwidth F1, and said second signal light has a transmission bandwidth F2, and each channel of said wavelength division multiplexing signal is arranged with the frequency interval F (F≧(F1+F2)/2), and
said first interleave filter unit further comprises:
a first interleaver further comprising a first port to which said wavelength division multiplexing signals are input and for filtering and outputting said wavelength division multiplexing signals based on the transmission characteristics where the transmission band and the non-transmission band with the bandwidth 2F are alternately repeated, and second port for filtering and outputting said wavelength division multiplexing signals based on the opposite transmission characteristics from said first port;
a second interleaver further comprising a third port to which the signal lights from said first port are input and for filtering and outputting the signal lights from said first port based on the transmission characteristics where the transmission band and the non-transmission band with the bandwidth 2F are alternately repeated, and a fourth port for filtering and outputting the signal lights from said first port based on the opposite transmission characteristics from said third port; and
a third interleaver further comprising a fifth port to which the signal lights from said second port are input and for filtering and outputting the signal lights from said second port based on the transmission characteristics where the transmission band and the non-transmission band with the bandwidth 2F are alternately repeated, and a sixth port for filtering and outputting the signal lights from said second port based on the opposite transmission characteristics from said fifth port, wherein
the central frequency of the transmission bands of said first, second and third interleavers are shifted from the frequency of each channel of said wavelength division multiplexing signal so that the overlapping portion of the transmission bands of said first and third ports include the signal band of the signal light of the odd channel of said first channel group, the overlapping portion of the transmission bands of said first and fourth ports include the signal band of the signal light of the odd channel group of said second channel group, the overlapping portion of the transmission bands of said second and fifth ports include the signal band of the signal light of the even channel group of said second channel group, and the overlapping portion of the transmission bands of said second and sixth ports include the signal band of the signal light of the even channel group of said first channel group.

28. The wavelength division multiplexing transmission system according to claim 1, wherein:
said first signal light has a transmission bandwidth F1 and said second signal light has a transmission bandwidth F2, and each channel of said wavelength division multiplexing signal is arrayed with the frequency interval F (F≧(F1+F2)/2), and
said first interleave filter unit further comprises:
a coupler to which said wavelength division multiplexing signals are input and for outputting said wavelength division multiplexing signals from two ports;
a first interleaver further comprising a first port for to which said wavelength division multiplexing signals from said coupler are input and for filtering and outputting said wavelength division multiplexing signals based on the transmission characteristics where the transmission band with the bandwidth F1, of which the center is the central frequency of the signal band of the signal light of an odd channel group or even channel group of said first channel group, is repeated with the period F4, and a second port for filtering and outputting said wavelength division multiplexing signals based on the transmission characteristics where the transmission band with the bandwidth F1, which is shifted by the frequency 2F from the transmission band of said first port, is repeated with the period 4F; and
a second interleaver further comprising a third port to which said wavelength division multiplexing signals from said coupler are input and for filtering and outputting said wavelength division multiplexing signals based on the transmission characteristics where the transmission band with bandwidth F2, of which the center is the central frequency of the signal band of the signal light of an odd channel group or even channel group of said second channel group, is repeated with the period 4F, and a fourth port for filtering and outputting said wavelength division multiplexing signals based on the transmission characteristics where the transmission band with the bandwidth F2, which is shifted by the frequency 2F from the transmission band of said third port, is repeated with the period 4F.

29. A relay node for transmitting wavelength division multiplexing signals comprising:
a demultiplexing module unit and a multiplexing module unit, wherein:
said demultiplexing module unit comprises:
a first interleave filter unit demultiplexing said wavelength division multiplexing signal into a signal light of a first channel group, that is one of an even channel group and an odd channel group and a signal light of a second channel group, that is the other thereof, and outputting the demultiplexed signal lights,
wherein a first signal light of which the signal bandwidth is relatively large can be allocated to each channel of said first channel group, and a second signal light of which the signal bandwidth is relatively small is allocated to each channel of said second channel group;
a first demultiplexing unit demultiplexing the signal light of said first channel group from said first interleave filter unit, and outputting these signals, and said multiplexing module unit comprises:
a first multiplexing unit multiplexing a plurality of said first signal lights or said second signal lights that are input, into a signal light of said first channel group and outputting the signal, and
a second interleave filter unit inputting a signal light of said first channel group from said first multiplexing unit and a signal light where a plurality of said second signal lights are disposed in the said second channel group, multiplexing these two input signal lights to generate said wavelength division multiplexed signal, and outputting the signal,
wherein the first interleave filter unit includes a first port outputting a signal light of the first channel group and a second port outputting a signal light of the second channel group, and
the first and second ports are set such that the bandwidth of a transmission band where light transmits and the bandwidth of a non-transmission band where light does not transmit are different, the transmission band of the first port substantially matches the signal band of the first signal light and the transmission band of the second port substantially matches the signal band of the second signal light, and
wherein said first signal light is disposed in each channel constituting said first channel group, and
said first demultiplexing unit further comprises:
a first interleaver demultiplexing the signal lights of said first channel group from said first port of said first interleave filter unit into a signal light of an even channel group constituting said first channel group and a signal light of an odd channel group constituting said first channel group and outputting the signal lights;
a second interleaver demultiplexing the signal light of said even channel group from said first interleaver into a signal light of an even channel group and a signal light of an odd channel group and outputting the signal lights;
a third interleaver demultiplexing the signal light of said odd channel group from said first interleaver into a signal light of an even channel group and a signal light of an odd channel group and outputting the signal lights; and
four demultiplexers demultiplexing the signal lights of an even channel group and an odd channel group from said second interleaver and the signal lights of an even channel group and an odd channel group from said third interleaver into signal lights with each wavelength, respectively.

30. The relay node according to claim 29, wherein:
said first demultiplexing unit demultiplexes signal lights of said first channel group into signal lights with each wavelength,
said first multiplexing unit multiplexes signal lights with each wavelength from said first demultiplexing unit, and
at least one add/drop module for adding or dropping a signal light for at least one of the signal lights with each wavelength in said first channel group is further disposed between said first demultiplexing unit and said first multiplexing unit.

31. The relay node according to claim 29, wherein:

said first demultiplexing unit demultiplexes signal lights of said first channel group into signal lights with each wavelength, said first multiplexing unit multiplexes signal lights with each wavelength from said first demultiplexing unit, and at least one gain equalizer for performing equalization processing for at least one of the signal lights with each wavelength of said first channel group is further disposed between said first demultiplexing unit and said first multiplexing unit.

32. The relay node according to claim 29, wherein:

said first demultiplexing unit demultiplexes signal lights of said first channel group into signal lights with each wavelength, said first multiplexing unit multiplexes signal lights with each wavelength from said first demultiplexing unit, and at least one polarization mode dispersion compensator for performing polarization mode dispersion compensation for at least one of the signal lights with each wavelength of said first channel group is further disposed between said first demultiplexing unit and said first multiplexing unit.

33. The relay node according to claim 29, wherein:

said demultiplexing module unit further comprises a demultiplexer for demultiplexing the signal light of said second channel group from said first interleave filter unit into signal lights with each wavelength, and said multiplexing module unit further comprises a multiplexer for multiplexing the signal lights with each wavelength from said demultiplexer of said demultiplexing module unit, and outputting the signal light to said second interleave filter unit.

34. The relay node according to claim 33, further comprising at least one add/drop module for adding or dropping a signal light for at least one of the signal lights with each wavelength of said second channel group between said demultiplexer and said multiplexer.

35. The relay node according to claim 33, further comprising at least one gain equalizer for performing equalization processing for at least one of the signal lights with each wavelength of said second channel group between said demultiplexer and said multiplexer.

36. The relay node according to claim 33, further comprising at least one polarization mode dispersion compensator for performing polarization mode dispersion compensation for at least one of the signal lights with each wavelength of said second channel group between said demultiplexer and said multiplexer.

* * * * *

UNITED STATES PATENT AND TRADEMARK OFFICE
CERTIFICATE OF CORRECTION

PATENT NO. : 7,480,459 B2  Page 1 of 1
APPLICATION NO. : 10/883033
DATED : January 20, 2009
INVENTOR(S) : Kentaro Nakamura et al.

It is certified that error appears in the above-identified patent and that said Letters Patent is hereby corrected as shown below:

Title Page, item (56), Column 2 (Other Publications), Line 8, change "ACtion" to --Action--.

Signed and Sealed this

Thirty-first Day of March, 2009

JOHN DOLL
*Acting Director of the United States Patent and Trademark Office*